(12) United States Patent
Kim et al.

(10) Patent No.: US 11,102,732 B2
(45) Date of Patent: Aug. 24, 2021

(54) METHOD AND DEVICE FOR EFFICIENT COMMUNICATION IN NEXT GENERATION MOBILE COMMUNICATION SYSTEM

(71) Applicant: Samsung Electronics Co., Ltd., Suwon-si (KR)

(72) Inventors: Donggun Kim, Seoul (KR); Soenghun Kim, Suwon-si (KR); Alexander Sayenko, Seoul (KR); Sangbum Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/631,912

(22) PCT Filed: May 29, 2018

(86) PCT No.: PCT/KR2018/006099
§ 371 (c)(1),
(2) Date: Jan. 17, 2020

(87) PCT Pub. No.: WO2019/017583
PCT Pub. Date: Jan. 24, 2019

(65) Prior Publication Data
US 2020/0229111 A1    Jul. 16, 2020

(30) Foreign Application Priority Data

Jul. 18, 2017  (KR) .................. 10-2017-0090934

(51) Int. Cl.
*H04W 52/36* (2009.01)
*H04W 76/27* (2018.01)
(Continued)

(52) U.S. Cl.
CPC ......... *H04W 52/365* (2013.01); *H04W 28/06* (2013.01); *H04W 52/242* (2013.01);
(Continued)

(58) Field of Classification Search
CPC ........... H04W 8/08; H04W 4/10; H04W 8/20; H04W 8/26; H04W 48/18; H04W 84/08; H04W 84/16; H04W 92/02
(Continued)

(56) References Cited

U.S. PATENT DOCUMENTS

2012/0281650 A1* 11/2012 Ouchi ................... H04W 52/04
                                                              370/329
2014/0329553 A1    11/2014 Nakashima et al.
(Continued)

FOREIGN PATENT DOCUMENTS

| KR | 10-2015-0110425 A | 10/2015 |
| KR | 10-2016-0133418 A | 11/2016 |
| KR | 10-2018-0134725 A | 12/2018 |

OTHER PUBLICATIONS

Supplementary European Search Report in connection with European Application No. 18835878.2 dated May 25, 2020, 7 pages.
(Continued)

*Primary Examiner* — Nghi H Ly

(57) ABSTRACT

The present disclosure relates to a communication technique for convergence of a 5G communication system for supporting a higher data transmission rate beyond a 4G system with an IoT technology, and a system therefor. The present disclosure may be applied to an intelligent service (for example, smart home, smart building, smart city, smart car or connected car, health care, digital education, retail business, security and safety-related service, etc.) on the basis of a 5G communication technology and an IoT-related technology. The present disclosure relates to a method of a
(Continued)

terminal, the method comprising the steps of: determining a path loss reference beam on the basis of whether information indicating the path loss reference beam is received; obtaining a path loss on the basis of the path loss reference beam; obtaining a power headroom (PH) on the basis of the path loss; and transmitting a power headroom report (PHR) including the PH.

8 Claims, 39 Drawing Sheets

(51) Int. Cl.
　　　　*H04W 28/06*　　　(2009.01)
　　　　*H04W 52/24*　　　(2009.01)
　　　　*H04W 72/14*　　　(2009.01)
　　　　*H04W 74/00*　　　(2009.01)
　　　　*H04W 74/08*　　　(2009.01)
(52) U.S. Cl.
　　　　CPC ......... *H04W 72/14* (2013.01); *H04W 74/006* (2013.01); *H04W 74/0833* (2013.01); *H04W 76/27* (2018.02)
(58) Field of Classification Search
　　　　USPC ................ 370/329, 328, 338, 341, 345, 350
　　　　See application file for complete search history.

(56) References Cited

U.S. PATENT DOCUMENTS

| | | |
|---|---|---|
| 2015/0264655 A1 | 9/2015 | Lee et al. |
| 2015/0271811 A1 | 9/2015 | Kim et al. |
| 2016/0050049 A1* | 2/2016 | Yang ..................... H04L 1/1845 370/329 |
| 2016/0112960 A1* | 4/2016 | Park ..................... H04L 5/0048 370/329 |
| 2016/0142897 A1* | 5/2016 | Sorrentino ............ H04W 8/005 370/329 |
| 2017/0195998 A1 | 7/2017 | Zhang et al. |

OTHER PUBLICATIONS

Huawei, et al., "Consideration of PHR," R2-1707002 Update to R2-1704612, 3GPP TSG-RAN WG2 Meeting NR#2, Qingdao, China, Jun. 27-29, 2017, 6 pages.

International Search Report and Written Opinion of the International Searching Authority for International Application No. PCT/KR2018/006099 dated Oct. 30, 2018, 13 pages.

Samsung, "PHR triggering event for beam change," R2-1707359 (Updated Resubmission of R2-1705605), 3GPP TSG-RAN WG2 NR Ad hoc #2, Qingdao, China, Jun. 27-29, 2017, 3 pages.

* cited by examiner

METHOD AND DEVICE FOR EFFICIENT COMMUNICATION IN NEXT GENERATION MOBILE COMMUNICATION SYSTEM

CROSS-REFERENCE TO RELATED APPLICATIONS

This application is a 371 National Stage of International Application No. PCT/KR2018/006099, filed May 29, 2018, which claims priority to Korean Patent Application No. 10-2017-0090934, filed Jul. 18, 2017, the disclosures of which are herein incorporated by reference in their entirety.

BACKGROUND

1. Field

The disclosure relates to the operation of a terminal and a base station in a mobile communication system. The disclosure relates to a random-access method in a next-generation mobile communication system. The disclosure relates to determination of transmission power and a power headroom report (PHR) in a next-generation mobile communication system. The disclosure relates to a method and an apparatus for efficiently splitting data in a next-generation mobile communication system. Further, the disclosure relates to a method and an apparatus by which a radio resource control (RRC)-inactive mode terminal transmits data in a next-generation mobile communication system.

2. Description of Related Art

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system. In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large-scale antenna technologies are being discussed as means to mitigate a propagation path loss in the ultrahigh-frequency band and increase a propagation transmission distance. Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network. In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has been evolved to an Internet of Things (IoT) network in which distributed components such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields such as those of a smart home, a smart building, a smart city, a smart car, a connected car, a smart grid, health care, a smart home appliance, or high-tech medical services through the convergence of the conventional Information Technology (IT) and various industries.

Accordingly, various attempts to apply the 5G communication to the IoT network are made. For example, the technology such as a sensor network, machine-to-machine (M2M), and machine-type communication (MTC) is implemented by beamforming, MIMO, and array antenna schemes. The application of a cloud RAN as the big data processing technology may be an example of convergence of the 5G technology and the IoT technology.

In general, mobile communication systems have been developed to provide communication while enabling the mobility of users. With the rapid development of technology, mobile communication systems have reached a stage of providing high-speed data communication services as well as voice communication. In a wireless mobile communication system, in many cases a terminal intermittently receives service rather than continuously receiving service for a long time. Accordingly, if the terminal constantly receives and identifies a signal from a BS, the power of the terminal is rapidly consumed. It is very important to reduce power consumption. Therefore, the terminal may switch from an RRC-connected mode to an RRC-idle mode, which is a standby mode. However, many signaling procedures are needed when the terminal switches back to the RRC-connected mode from the idle mode. Accordingly, in a next-generation mobile communication system, an RRC inactive mode or a lightly connected mode, in which the number of signaling procedures is reduced, rapid connection is possible, and power consumption by the terminal is reduced, as in the idle mode, may be defined. However, a method of efficiently switching to the RRC inactive mode (or the lightly connected mode) from the RRC-connected mode or switching to the RRC-connected mode is required. Further, a method of transmitting data in the RRC inactive mode may be a new method of reducing a data transmission delay.

In addition, in the next-generation mobile communication system, new radio link control (RLC) unacknowledged mode (UM) segmentation is required in order to reduce overhead and unnecessary processing by the terminal.

SUMMARY

An aspect of the disclosure is to provide a random-access method in a next-generation mobile communication system.

Another aspect of the disclosure is to provide a method of determining transmission power and providing a power headroom report (PHR) in a next-generation mobile communication system.

Another aspect of the disclosure is to propose new RLC UM segmentation for reducing overhead and unnecessary processing of the terminal in a next-generation mobile communication system.

Another aspect of the disclosure is to provide an efficient method of switching to an RRC inactive mode (or a lightly connected mode) from an RRC-connected mode or switching to n RRC-connected mode from an RRC inactive mode (or a lightly connected mode). Another aspect of the disclosure is to provide a new method of reducing a data transmission delay by transmitting data in an RRC inactive mode.

In accordance with an aspect of the disclosure, a method of a user equipment (UE) is provided. The method includes: determining a pathloss reference beam, based on whether information indicating the pathloss reference beam is received; obtaining a pathloss, based on the pathloss reference beam; obtaining a power headroom (PH), based on the pathloss; and transmitting a power headroom report (PHR) including the PH.

In accordance with another aspect of the disclosure, a user equipment (UE) is provided. The UE includes: a transceiver; and a controller configured to perform control to determine a pathloss reference beam, based on whether information indicating the pathloss reference beam is received, obtain a pathloss, based on the pathloss reference beam, obtain a power headroom (PH), based on the pathloss; and transmit a power headroom report (PHR) including the PH.

In accordance with another aspect of the disclosure, a method of a base station is provided. The method includes: receiving a power headroom report (PHR) including a power headroom (PH) from a user equipment (UE); and identifying the PH of the UE based on the PHR, wherein the PH is determined based on a pathloss of a pathloss reference beam, and the pathloss reference beam is determined based on whether information indicating the pathloss reference beam is transmitted to the UE from the base station.

In accordance with another aspect of the disclosure, a base provided. The base station includes: a transceiver; and a controller configured to perform control to receive a power headroom report (PHR) including a power headroom (PH) from a user equipment (UE) and identify the PH of the UE, based on the PHR, wherein the PH is determined based on a pathloss of a pathloss reference beam, and the pathloss reference beam is determined based on whether information indicating the pathloss reference beam is transmitted to the UE from the base station.

Various embodiments of the disclosure may provide a random-access method in a next-generation mobile communication system.

Various embodiments of the disclosure may provide a method of determining transmission power and providing a power headroom report (PHR) in a next-generation mobile communication system.

According to an embodiment of the disclosure, it is possible to reduce data transmission overhead and efficiently use radio resources by proposing an efficient RLC UM segmentation operation in a next-generation mobile communication system, thereby minimizing unnecessary processing by the UE.

According to another embodiment of the disclosure, it is possible to reduce a data transmission delay by proposing a method of allowing a UE in an RRC-inactive mode to transmit data in a next-generation mobile communication system.

DETAILED DESCRIPTION

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification.

In describing the disclosure below, a detailed description of related known configurations or functions incorporated herein will be omitted when it is determined that the detailed description thereof may unnecessarily obscure the subject matter of the disclosure. Hereinafter, embodiments of the disclosure will be described with reference to the accompanying drawings.

In the following description, terms for identifying an access node, terms referring to network entities, terms referring to messages, terms referring to interfaces between network entities, and terms referring to various pieces of identification information are used for convenience of description. Therefore, the disclosure may not be limited by the terminologies provided below, and other terms that indicate subjects having equivalent technical meanings may be used.

For convenience of description, the disclosure uses terms and names defined in the 3rd-generation partnership project long term evolution (3GPP LTE). However, the disclosure is not limited to the terms and names, and may be equally applied to a system following another standard. For convenience of description, the terms "NB", "eNB", and "base station" may be interchangeably used. For example, an eNB may also be referred to as a gNB or a base station. Further, for convenience of description, the terms "UE" and "terminal" may be interchangeably used.

Embodiment 1

Figure 1A:
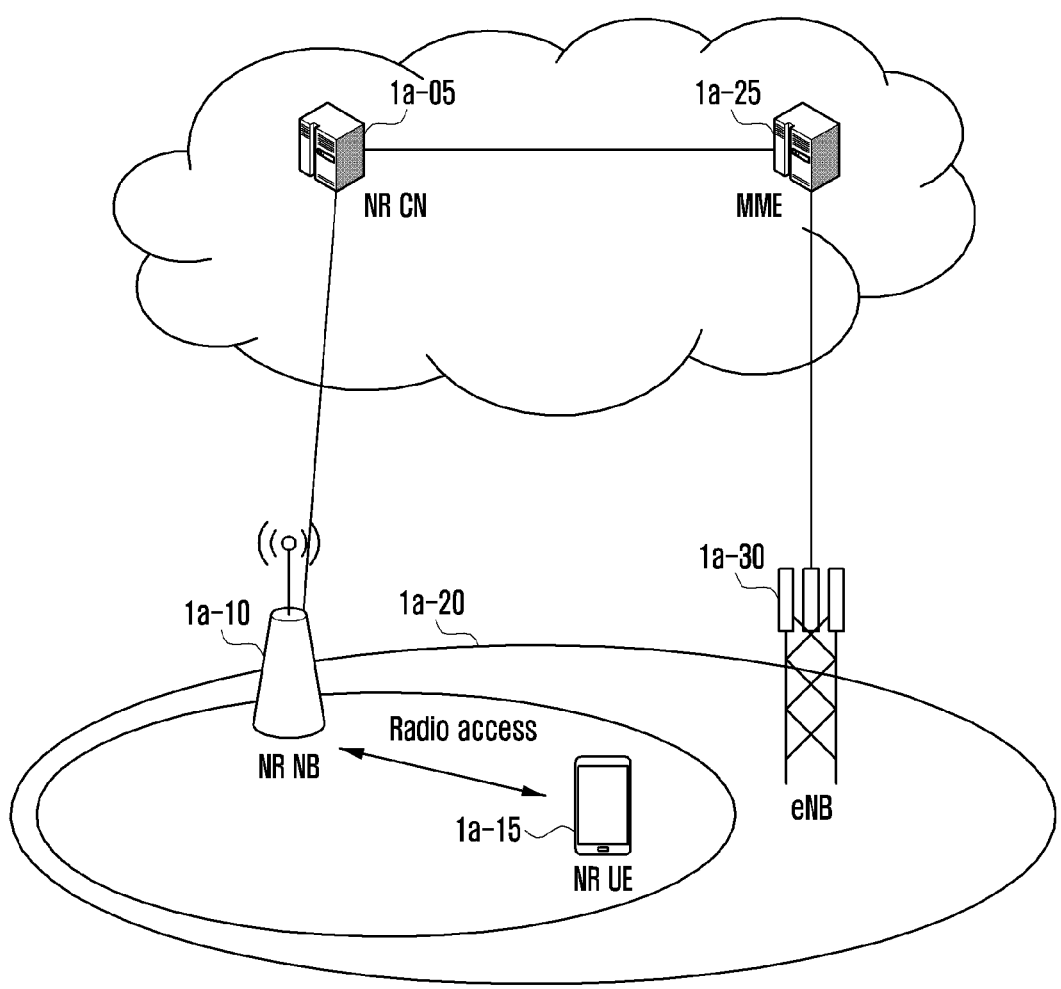
FIG. 1A illustrates the structure of a next-generation mobile communication system according to an embodiment of the disclosure.
Figure 1B:
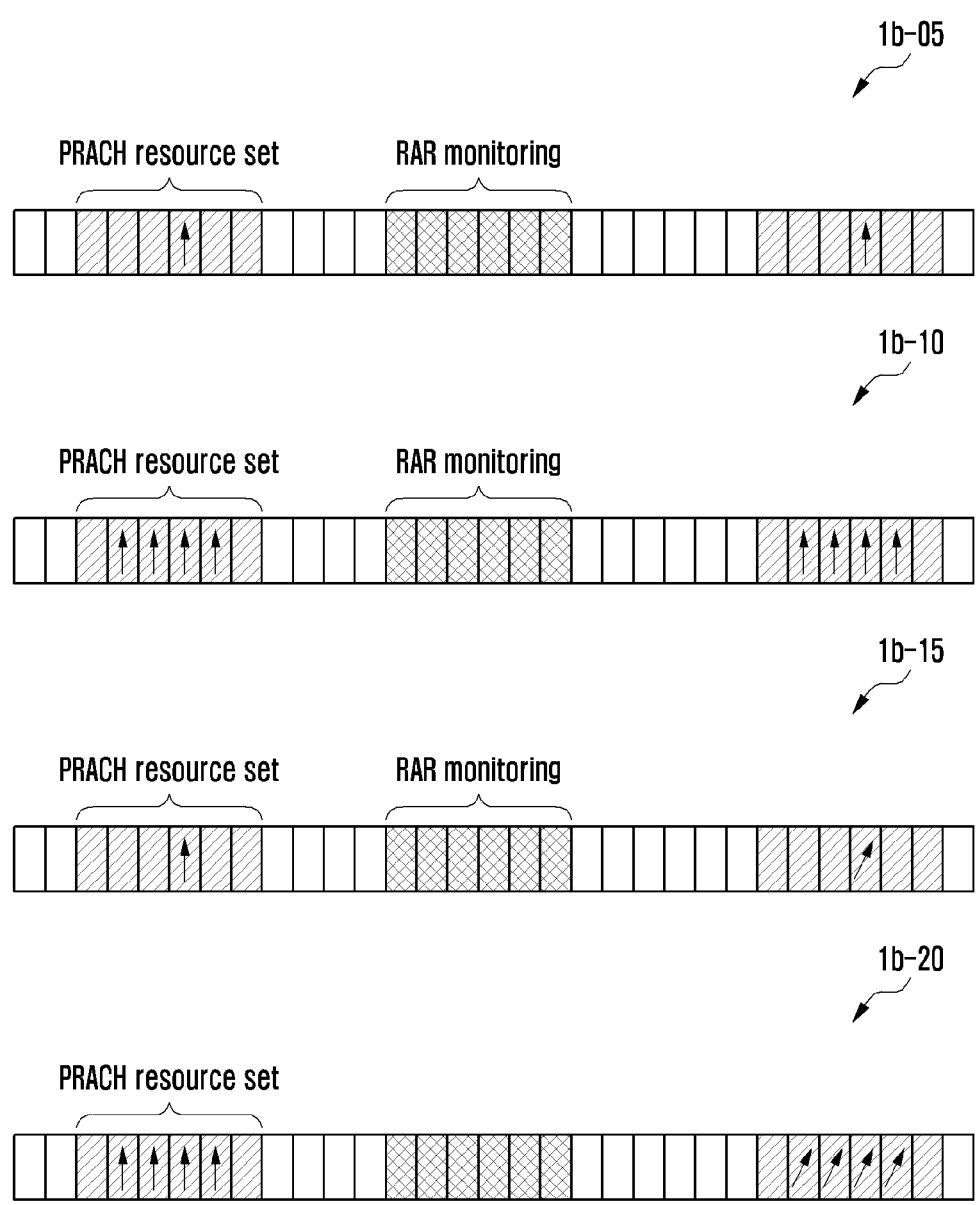
FIG. 1B illustrates preamble transmission and response reception based on beam correspondence according to an embodiment of the disclosure.

FIG. 1A illustrates the structure of a next-generation mobile communication system according to an embodiment of the disclosure.

Referring to FIG. 1A, a radio access network of the next-generation mobile communication system includes a next-generation base station 1a-10 (hereinafter, referred to as a new radio node B (NR NB) or a base station) and a new radio core network (NR CN) 1a-05, as illustrated in FIG. 1A. A user terminal 1a-15 (hereinafter, referred to as a new radio user equipment (NR UE) or a terminal) accesses an external network through the NR NB 1a-10 and the NR CN 1a-05.

In FIG. 1A, the NR NB 1a-10 corresponds to an evolved Node B (eNB) in a conventional UE system. The NR NB 1a-10 may be connected to the NR LTE 1a-15 and may provide better service than a conventional node B. Since all user traffic is served through a shared channel in the next-generation mobile communication system, a device for collecting and scheduling status information of buffer statuses, available transmission power statuses, and channel statuses of UEs is required, which corresponds to the NR NB 1a-10. One NR NB generally controls a plurality of cells. The NR NB may have a bandwidth wider than the conventional maximum bandwidth in order to implement super-high-speed data transmission compared to conventional LTE, may apply orthogonal frequency-division multiplexing (OFDM) through radio-access technology, and may further apply beamforming technology. Further, an adaptive modulation and coding (AMC) scheme of determining a modulation scheme and a channel-coding rate is applied depending on the channel status of the UE. The NR CN 1a-05 performs a function of supporting mobility, configuring a bearer, and configuring QoS. The NR CN 1a-05 is a device that performs not only a function of managing the mobility of the UE but also various control functions, and is connected to a plurality of NR NBs. Further, the next-generation mobile communication system may be linked to the conventional LTE system, and the NR CN 1a-05 is connected to a mobility management entity (MIME) 1a-25 through a network interface. The MME 1a-25 is connected to an eNB 1a-30, which is a conventional base station.

The disclosure relates to a method and an apparatus for differentially performing a random-access process according to beam correspondence.

"Beam correspondence" is a term indicating whether configuration of reception/transmission beams in different directions can be determined using the configuration of transmission/reception beams in one direction. If the UE is capable of configuring uplink transmission beams using the configuration of downlink reception beams, it means that beam correspondence exists from the viewpoint of the UE (UE beam correspondence exists). If the base station is capable of determining the configuration of uplink reception beams using the configuration of downlink transmission beams, it means that beam correspondence exists from the viewpoint of the base station (base station beam correspondence exists).

The configuration of beams may be the angle/directivity/width of beams. When performing random access in a predetermined NR cell, the UE takes account of whether beam correspondence exists in the corresponding cell. The UE and the base station are required to detect the following information before transmitting and receiving up/downlink data.

UE: configures optimal downlink (DL) Rx beams and optimal UL Tx beams

Base station: configures optimal DL Tx beams and optimal UL Rx beams

The UE performs a random-access process before initiating uplink/downlink data transmission/reception, and if the random-access process is completed, the UE and the base station detect all of the above information.

The UE measures a predetermined common signal by applying DL beam sweeping to a DL signal of the corresponding NR cell before performing random access and determines an optimal pair of a DL TX beam and a DL Rx beam (hereinafter, beam pair link (BPL)). The optimal DL BPL is a combination of a DL Tx beam and a DL Rx beam that realizes the highest/best/most excellent received signal intensity/duality with respect to a predetermined DL common signal.

The UE transmits a preamble through physical random access channel (PRACH) resources associated with the optimal DL Tx beam, and the base station determines which DL Tx beam is the optimal beam through the PRACH resources through which the preamble is received.

Accordingly, the following should actually be detected by the UE and the base station through the random-access process.

UE: configures optimal UL Tx beam

Base station: configures optimal UL Rx beam

If beam correspondence of the UE exists, the terminal may determine the configuration of the optimal UL Tx beam through the configuration of the optimal DL Rx beam. Accordingly, in order to detect the configuration of the UL Tx beam, there is no need to perform UL Tx beam sweeping.

If beam correspondence of the base station exists, the base station may determine the configuration of the optimal UL Rx beam through the configuration of the optimal DL Tx beam. Accordingly, in order to detect the configuration of the UL Rx beam, there is no need to perform UL Rx beam sweeping.

If beam correspondence of the UE does not exist, it is required to perform UL Tx beam sweeping to determine the configuration of the UL Tx beam. If beam correspondence of the base station does not exist, it is required to perform UL Rx beam sweeping to determine the configuration of the UL Rx beam.

For UL Rx beam sweeping by the base station, the terminal should perform UL Tx beam repetition for transmitting the UL Tx beam several times by applying the same UL Tx beam configuration.

As described above and shown in the following table, the UL beam sweeping or the UL beam repetition may or may not be needed depending on whether beam correspondence of the UE and the base station exists.

| beam correspondence | UL Tx beam sweeping | UL Tx beam repetition |
|---|---|---|
| UE = Yes, NW = Yes | No | No |
| UE = Yes, NW = No | Yes | No |
| UE = No, NW = Yes | No | Yes |
| UE = No, NW = No | Yes | Yes |

In the disclosure, four random-access procedures are defined. Each of the random-access procedures will be briefly described below.

The overall random-access procedure includes preamble transmission random-access response (RAR) reception, message 3 transmission, and message 4 reception.

First random-access procedure 1b-05: indicates a random-access procedure that is applied when beam correspondence of both the UE and the base station exists. The first random-access procedures is a procedure to which neither UL Tx beam sweeping nor UL Tx beam repetition are applied when a preamble is transmitted. The terminal transmits a PRACH preamble through selected PRACH resources (PRACH resources associated with the best DL Tx beam), monitors whether a response message thereto is received, and if a response message is not received, retransmits the PRACH preamble. At this time, the UE transmits the preamble using the UL Tx beam configuration determined according to the best DL Rx beam configuration.

Second random-access procedure 1b-10: indicates a random-access procedure that is applied when beam correspondence of the UE exists but beam correspondence of the base station does not exist. When transmitting a preamble, the UE repeatedly transmits the PRACH preamble by applying the same UL Tx beam configuration through N selected PRACH resources. After completing repetitive transmission, the UE monitors whether a response message thereto is received, and if a response message is not received, reinitiates repetitive transmission of the PRACH preamble. If a response message is received, the UE transmits Msg 3 through the uplink transmission resources indicated by the response message. At this time, the UE may transmit Msg 3 including information specifying the best DL Tx beam. The information may be information indicating which PRACH resources are resources corresponding to the best DL Tx beam among the N PRACH resources. If there is no space to include the information in Msg 3, the UE rapidly transmits the information to the base station after the random-access process is completed.

Third random-access procedure 1b-15: indicates the random-access procedure that is applied when beam correspondence of the UE does not exist but beam correspondence of the base station exists. When transmitting a preamble, the UE performs UL Tx beam sweeping while varying the UL Tx beam configuration in every PRACH resource set. If the terminal transmits one PRACH preamble, monitors whether a response message thereto is received for a predetermined period, and then does not receive a response message, the terminal retransmits the PRACH preamble with a different UL Tx beam configuration. The terminal considers, as the optimal LT Tx beam configuration, the UL Tx beam configuration that was used for transmission of the preamble to which a valid response message was received and applies the UL Tx beam configuration when subsequently transmitting a physical uplink shared channel (PUSCH) and a physical uplink control channel (PUCCH). The PUSCH transmission includes Msg 3 transmission.

Fourth random-access procedure 1b-20: indicates a random-access procedure that is applied when beam correspondence does not exist for the UE or for the base station. The UE attempts to receive a response message after applying one UL Tx beam configuration in one PRACH resource set to repeatedly transmit the PRACH preamble. If a response message is not received, the UE attempts to receive a response message after applying another UL Tx beam configuration in the subsequent PRACH resource set and repeatedly transmitting the PRACH preamble. The UE repeats the process until a valid response message is received and applies the UL Tx beam configuration for which a valid response message was received when subsequently transmitting the PUSCH and the PUCCH. The PUSCH transmission includes Msg 3 transmission. Like the second random-access procedure, the terminal inserts information specifying the best DL Tx beam into Msg 3 or the PUSCH that was first transmitted after the random-access process is completed.

In this specification, information specifying the DL Tx beam may be, for example, a beam index allocated for each DL Tx beam or information specifying a synchronization signal (SS) block (since the SS block has directivity and is transmitted in the form of beam sweeping, an SS block transmitted at a predetermined time point corresponds to predetermined directivity).

Whether beam correspondence of the UE exists and whether correspondence of the base station exists are determined as follows.

Beam correspondence of the UE in a service cell of a predetermined frequency band exists when the following conditions are satisfied.

1) A radio frequency (RF) and antenna structure of the UE support beam correspondence in the corresponding frequency band 2) Central frequencies of uplink and downlink are the same as each other in the corresponding frequency band (the case of time-division duplexing (TDD) or in frame structure 3) or a frequency interval is equal to or smaller than a predetermined reference (the case in FDD).

Beam correspondence of the base station in a service cell of a predetermined frequency band exists when the following conditions are satisfied.

1) An RF and antenna structure of the base station support beam correspondence in the corresponding frequency band 2) Same as the case of the UE The UE should determine whether to apply UE beam correspondence and base station beam correspondence in order to determine which random-access procedure is performed in a predetermined serving cell, and to this end, the base station broadcasts information indicating whether to apply beam correspondence in predetermined system information. The predetermined system information may be, for example, minimum system information (SI).

Information indicating whether to apply beam correspondence includes two pieces of information below.

1) Whether base station beam correspondence is supported: indicator/information indicating whether base station beam correspondence is supported from the aspect of the capacity of the base station 2) Whether frequency/frequency band beam correspondence is supported: indicator/information indicating whether beam correspondence is supported in a frequency or a frequency band of the corresponding cell The second information may be determined by the UE and the base station themselves in consideration of the frequency band, instead of being explicitly broadcasted. For example, the UE stores information indicating whether beam correspondence is supported for each NR frequency band supported by the UE and determines whether to apply UE beam correspondence in the corresponding cell with reference to the frequency band of the serving cell to which random access is performed.

The UE determines a random-access procedure below to be performed in consideration of the above information and information indicating whether UE beam correspondence is supported.

The terminal that does not support UE beam correspondence applies the third procedure if the value of a base-station beam correspondence support indicator is "yes" and applies the fourth procedure if the value of the base-station beam correspondence support indicator is "no".

The terminal that supports UE beam correspondence applies the first procedure if the value of the base-station beam correspondence support indicator is "yes" and applies the second procedure if the value of the base-station beam correspondence support indicator is "no".

Figure 1C:
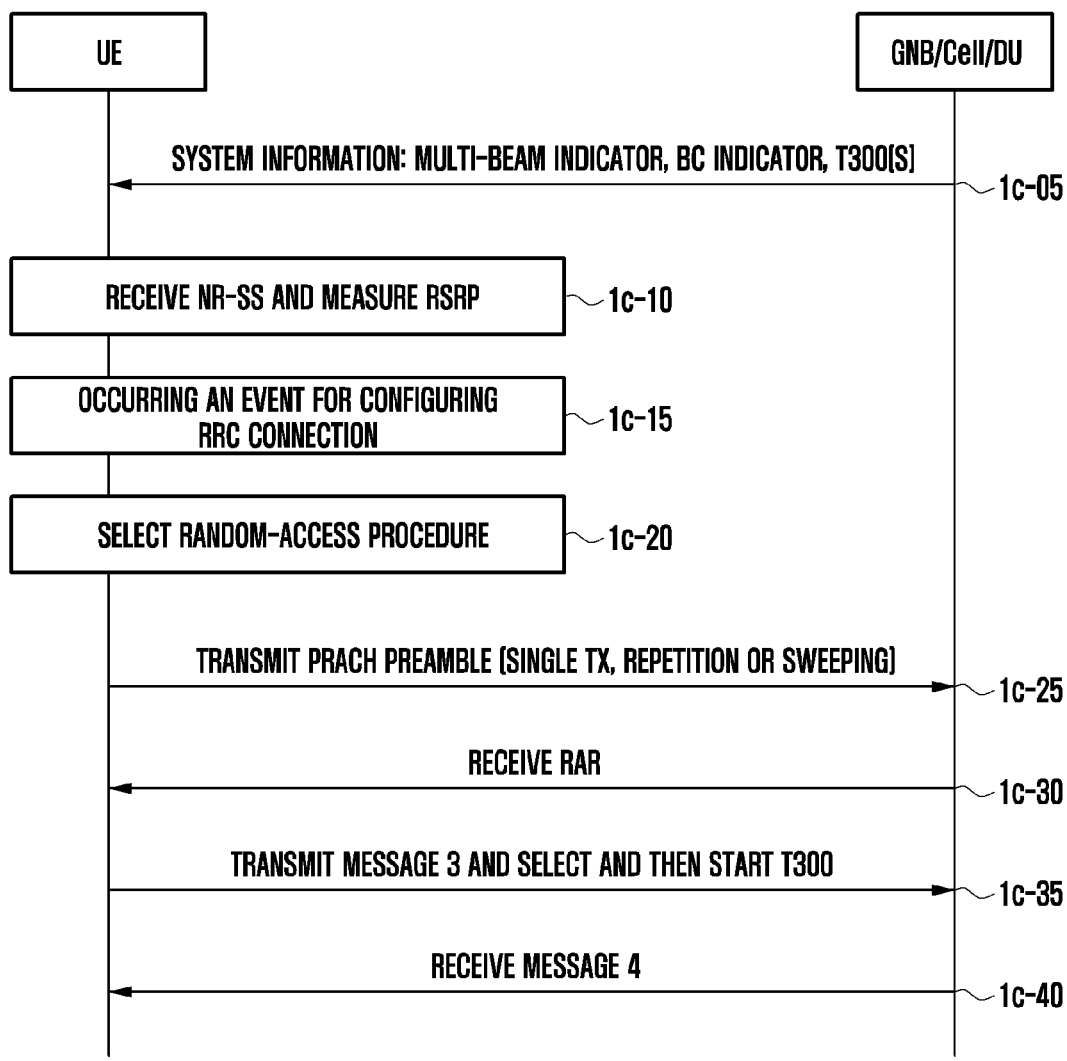
FIG. 1C illustrates the operation of a UE and a base station according to an embodiment of the disclosure.

FIG. 1C illustrates the overall operation of the UE and the base station according to an embodiment of the disclosure.

In step 1c-05, the UE selects or reselects a predetermined NR serving cell and obtains system information.

The system information includes minimum SI and other SI. The minimum SI may include information related to random access, for example, random-access resources and base-station beam correspondence information. The minimum IS may include information specifying whether the corresponding cell is a multi-beam cell or a single-beam cell.

In step 1c-10, the UE receives a predetermined common signal of the NR serving cell and measures reception intensity/quality (reference signal received power (RSRP)/reference signal received quality (RSRQ)).

If the corresponding cell is a single-beam cell, the UE measures reception intensity/quality using an omnidirectional beam without applying downlink reception beam sweeping. Further, the UE measures a pathloss on the basis of the measured reception intensity. The pathloss is a value obtained by subtracting reception intensity from transmission output of the predetermined common signal, and the transmission output of the common signal is broadcasted through the minimum SI.

If the corresponding cell is a multi-beam cell, the UE determines an optimal pair of DL Tx/Rx beams by applying downlink reception beam sweeping. Further, the UE measures a pathloss on the basis of the reception intensity measured in the optimal DL BPL.

In step 1c-15, an event indicating that the UE should configure the RRC connection occurs.

For example, the event corresponds to the case in which the UE receives paging, the case in which there is a need to transmit a higher-layer signaling message, or the case in which the UE has data to be transmitted.

In step 1c-20, the UE determines a random-access procedure to be performed.

If the corresponding cell is a single-beam cell, the UE selects the first random-access procedure and selects one of the first random-access procedure, the second random-access procedure, the third random-access procedure, and the fourth random-access procedure in consideration of whether beam correspondence is applied as described above.

In step 1c-25, the UE transmits a PRACH preamble.

According to the selected random-access procedure, the UE may transmit the PRACH preamble only once or repeatedly before attempting to receive an RAR. Further, according to the selected random-access procedure, the UE may or may not perform UL beam sweeping while changing the UL Tx beam configuration of the PRACH preamble.

The UE uses one of the following two methods to determine transmission output of the PRACH preamble.

Transmission Output Determination Method 1

Method 1 is a method of applying transmission output determined in consideration of pathloss and, if no RAR is received, increasing transmission output. Preamble transmission output is controlled according to a transmission output control command indicated by the RAR when message 3 is transmitted. The format of the transmission output control command includes a first format for receiving a bidirectional command indicating a decrease or an increase in transmission output.

Transmission Output Determination Method 2

Method 2 is a method of applying predefined predetermined transmission output without consideration of pathloss. The preamble is transmitted without any change in transmission output even though no RAR is received. Preamble transmission output is controlled according to a transmission output control command indicated by the RAR when message 3 is transmitted. The format of the transmission output control command includes a second format for receiving a unidirectional command indicating only a decrease in transmission output.

The UE determines preamble transmission output by applying a first scheme to the single-beam system.

The UE selectively applies one of a first scheme and a second scheme to the multi-beam system according to the selected random-access procedure. The UE determines preamble transmission output by applying the first scheme if the first random-access procedure or the third random-access procedure is used and determines preamble transmission output by applying the second scheme if the second random-access procedure or the fourth random-access procedure is used (since it is difficult to apply power ramping up).

If the multi-beam system uses the first scheme, the UE uses a pathloss obtained by applying the reception intensity measured in the optimal DL, Tx/Rx beam pair (optimal DL BLP).

In step 1c-30, the UE monitors a predetermined time interval to receive the RAR.

If a valid RAR is received in the predetermined time interval, the UE analyzes the information included in the RAR and prepares to transmit message 3. The information included in the RAR includes uplink transmission timing control information (uplink timing advance command) of the UE, information on transmission resources to be used for transmitting message 3, and information on the transmission format (MCS or transport block size) to be applied to the transmission of message 3.

In step 1c-35, the UE transmits message 3.

At this time, if a common control channel (CCCH) service data unit (SDU) such as an RRC connection request or an RRC connection reestablishment request is transmitted through message 3, the UE starts a predetermined tinier (T300 or T301). The timer serves to oversee the procedure related to the RRC connection, and determines that the RRC connection setup fails if the procedure is not completed before the timer expires. The UE selectively applies the value of the timer T300/T301 in consideration of the selected type of random-access procedure. This is because the procedure is completed once the UE completes reception of message 4, and the time required for receiving message 4 may vary depending on the random-access procedure. For example, two values of T300 are broadcasted through system information, and the UE may use the shorter value for the first random-access procedure and the longer value for the remaining random-access procedure. Alternatively, the UE may use a shorter value for the first random-access procedure and the third random-access procedure to which no UL Tx beam sweeping is applied, and may use a longer value for the second random-access procedure and the fourth random-access procedure. Alternatively, all timer values to be applied to the first random-access procedure, the second random-access procedure, the third random-access procedure, and the fourth random-access procedure may be individually broadcasted, and the UE may apply different values to the respective procedures.

The UE, using the second random-access procedure or the fourth random-access procedure to which UL Tx beam repetition transmission is applied, generates and transmits information indicating the best DL Tx beam to the base station. The information may be, for example, an SS block index or an integer indicating a preamble corresponding to the best DL Tx beam among N preambles that the UE repeatedly transmits. The UE may transmit the information along with a CCCH SDU when message 3 is transmitted.

In step 1c-40, the UE receives message 4.

Message 4 may be an RRC connection setup message or an RRC control message containing signaling radio bearer (SRB) configuration information and medium access control (MAC) configuration information. Upon successfully receiving message 4, the UE stops the timer and ends the process.

Figure 1D:
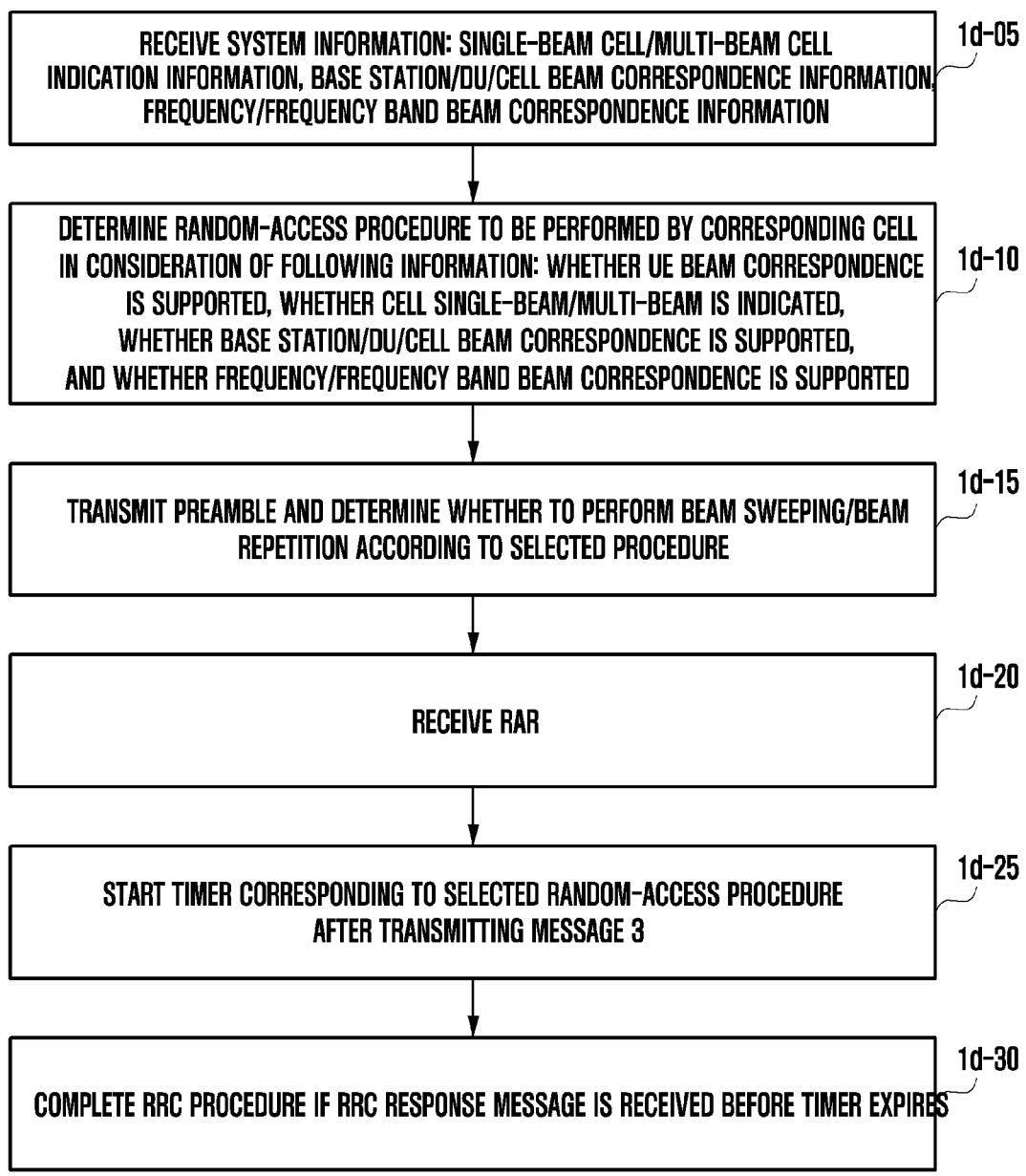
FIG. 1D illustrates the operation of the UE according to an embodiment of the disclosure.

FIG. 1D illustrates the operation of the UE according to an embodiment of the disclosure.

In step 1d-05, the UE receives system information in a predetermined cell. The system information includes the following information.

Single-beam/multi-beam indication information, beam correspondence information of a base station/cell/distributed unit, and beam correspondence information of a frequency (or frequency band)

In step 1d-10, the UE determines the type of the random-access procedure to be performed in the corresponding cell in consideration of the following information.

The type of the random-access procedure is determined on the basis of whether beam correspondence of the UE is supported in the corresponding frequency (band), whether single-beam or multi-beam of the corresponding cell/base station is indicated, whether beam correspondence of the corresponding cell/base station is supported, and beam correspondence of the corresponding frequency (band) exists (determined by the base station according to UL and DL frequency distance)

In step 1d-15, the UE determines whether to perform beam sweeping/beam repetition according to the type of the selected random-access procedure and transmits a preamble.

In step 1d-20, the UE monitors an RAR window and receives an RAR.

In step 1d-25, the UE transmits message 3 including an RRC control message according to a UL grant indicated by the RAR and starts a timer corresponding to the type of the selected random-access procedure.

If the UE receives an RRC response message before the timer expires, the UE ends the corresponding RRC procedure at step 1d-30. If no RRC response message is received before the timer expires, the UE takes necessary measures of reselecting another cell.

Figure 1E:
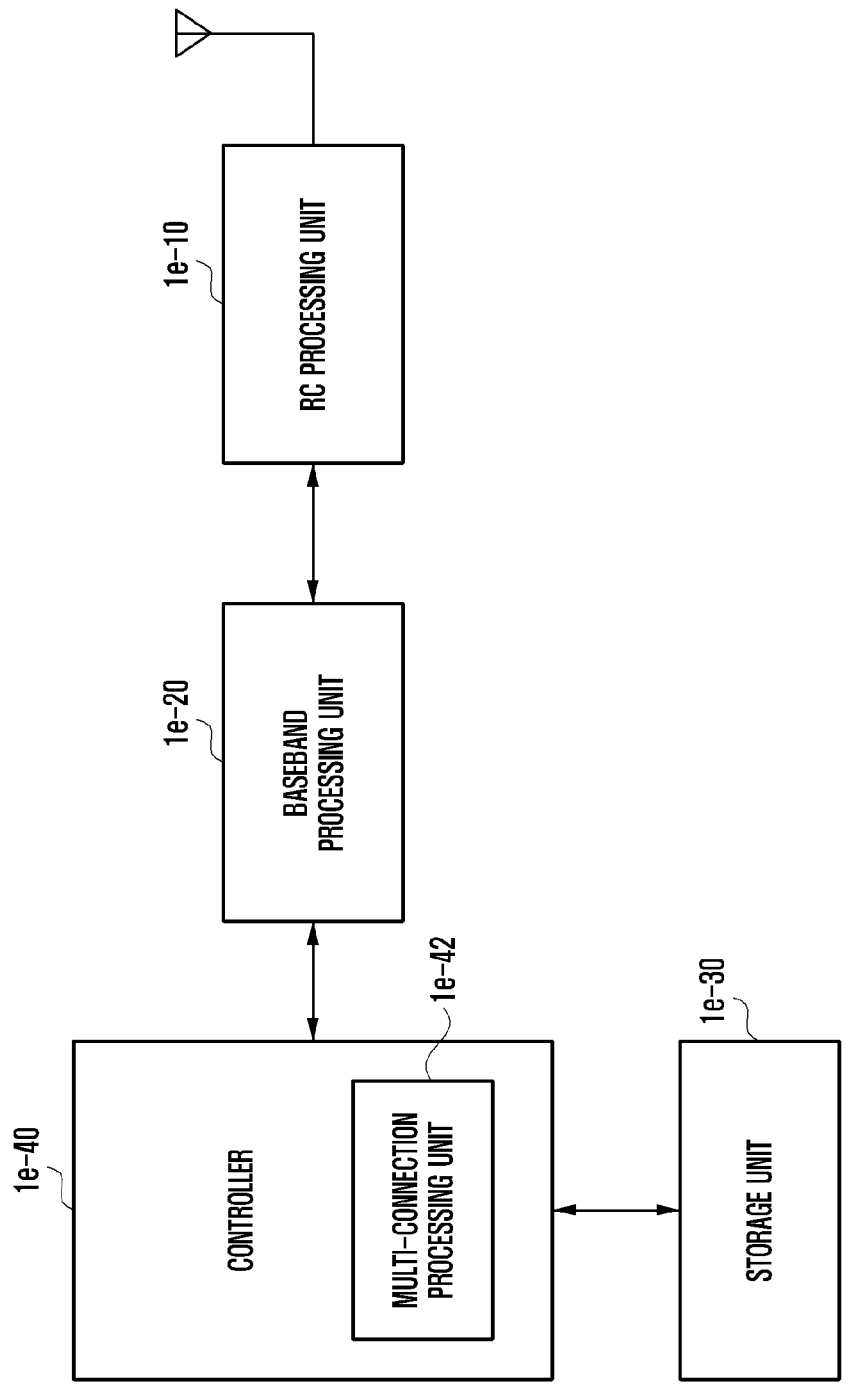
FIG. 1E illustrates the configuration of the UE according to an embodiment of the disclosure.

FIG. 1E illustrates the configuration of the UE according to an embodiment of the disclosure.

Referring to FIG. 1 the UE includes a radio-frequency (RF) processing unit 1e-10, a baseband processing unit 1e-20, a storage unit 1e-30, and a controller 1e-40. The controller 1e-40 may further include a multi-connection processing unit 1e-42.

The RF processing unit 1e-10 performs a function for transmitting and receiving a signal through a radio channel, such as band conversion and amplification of a signal. That is, the RF processing unit 1e-10 up-converts a baseband signal provided from the baseband processing unit 1e-20 into an RF band signal, transmits the RF band signal through an antenna, and then down-converts the RF band signal received through the antenna into a baseband signal. For example, the RF processing unit 1e-10 may include a transmission filter, a reception filter, an amplifier, a mixer, an oscillator, a digital-to-analog convertor (DAC), an analog-to-digital convertor (ADC), and the like. Although FIG. 1e illustrates only one antenna, the UE may include a plurality of antennas. Further, the RF processing unit 1e-10 may include a plurality of RF chains. Moreover, the RF processing unit 1e-10 may perform beamforming. For the beamforming, the RF processing unit 1e-10 may control the phase and the size of each of the signals transmitted/received through a plurality of antennas or antenna elements. The RF processing unit may perform MIMO and receive a plurality of layers when performing the MIMO operation.

The baseband processing unit 1e-20 performs a function for conversion between a baseband signal and a bitstream according to a physical-layer standard of the system. For example, when data is transmitted, the baseband processing unit 1e-20 generates complex symbols by encoding and modulating a transmission bitstream. Further, when data is received, the baseband processor 1e-20 reconstructs a reception bitstream by demodulating and decoding a baseband signal provided from the RF processing unit 1e-10. For example, in an orthogonal frequency-division multiplexing (OFDM) scheme, when data is transmitted, the baseband processing unit 1e-20 generates complex symbols by encoding and modulating a transmission bitstream, mapping the complex symbols to subcarriers, and then configures OFDM symbols through an IFFT (inverse fast Fourier transform) operation and a CP (cyclic prefix) insertion. Further, when data is received, the baseband processing unit 1e-20 divides the baseband signal provided from the RF processor 1e-10 in units of OFDM symbols, reconstructs the signals mapped to the subcarriers through an FFT (fast Fourier transform) operation, and then reconstructs a reception bitstream through demodulation and decoding.

The baseband processing unit 1e-20 and the RF processing unit 1e-10 transmit and receive signals as described above. Accordingly, the baseband processing unit 1e-20 and the RF processing unit 1e-10 may be referred to as a transmitter, a receiver, a transceiver, or a communication unit. At least one of the baseband processing unit 1e-20 and the RF processing unit 1e-10 may include a plurality of communication modules for supporting a plurality of different radio access technologies. Further, at least one of the baseband processing unit 1e-20 and the RF processing unit 1e-10 may include different communication modules for processing signals in different frequency bands. For example, the different radio access technologies may include a wireless LAN (for example, IEEE 802.11) and a cellular network (for example, LTE). Further, the different frequency bands may include a super-high frequency (SHF) (for example, 2.NRHz, NRhz) band and a millimeter (mm)-wave (for example, 60 GHz) band.

The storage unit 1e-30 stores data such as a basic program, an application, and setting information for the operation of the UE. Particularly, the storage unit 1e-30 may store information related to a second access node for performing wireless communication through a second radio-access technology. Further, the storage unit 1e-30 provides stored data in response to a request from the controller 1e-40.

The controller 1e-40 controls the overall operation of the UE. For example, the controller 1e-40 transmits and receives a signal by controlling the baseband processing unit 1e-20 and the RF processing unit 1e-10. The controller 1e-40 records data in the storage unit 1e-30 and reads the data. To this end, the controller 1e-40 may include at least one processor. For example, the controller 1e-40 may include a communication processor (CP) that performs control for communication and an application processor (AP) that controls a higher layer such as an application.

The controller 1e-40 serves to control the operation of the UE described in FIGS. 1C and 1D.

Figure 1F:
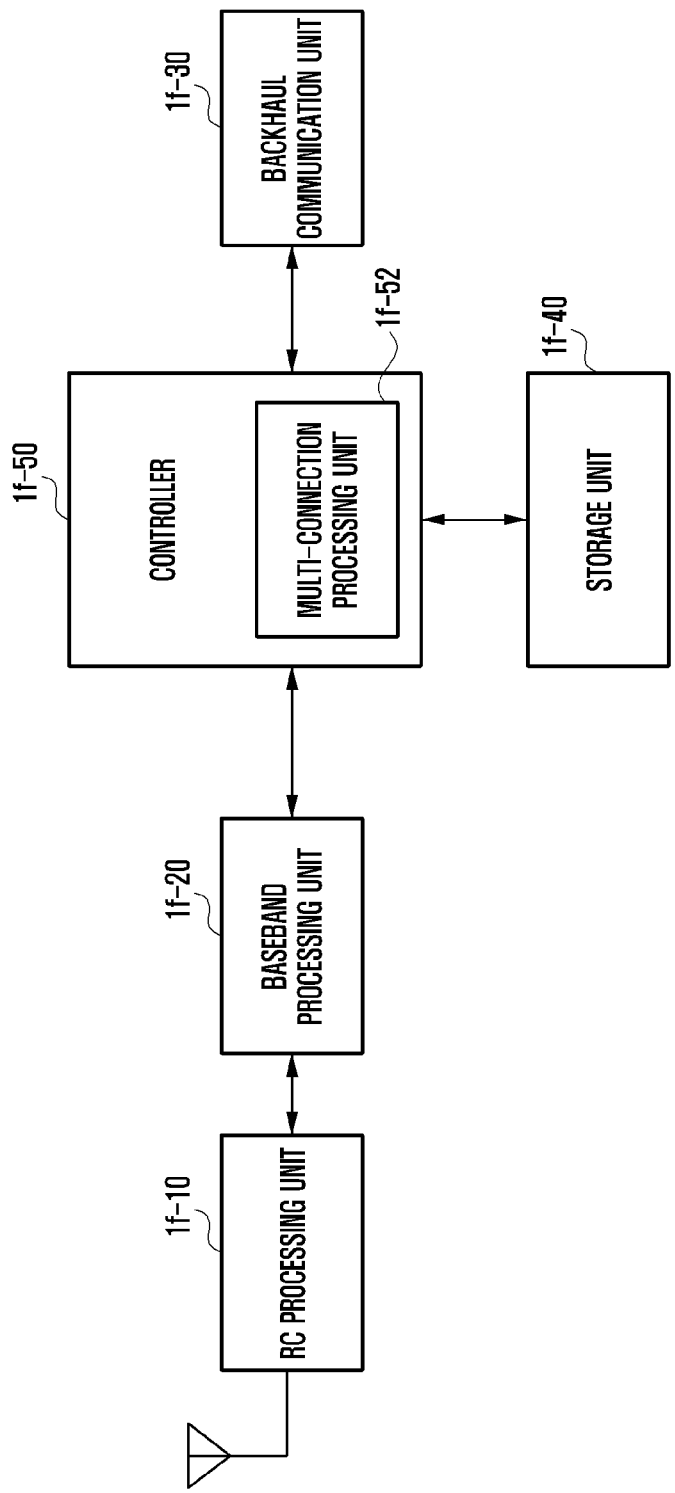
FIG. 1F illustrates the configuration of the base station according to an embodiment of the disclosure.

FIG. 1F illustrates the configuration of the base station according to an embodiment of the disclosure.

As illustrated in FIG. 1F, the base station includes an RF processing unit 1f-10, a baseband processing unit 1f-20, a backhaul communication unit 1f-30, a storage unit 1f-40, and a controller 1f-50. The controller 1f-50 may further include a multi-connection processing unit 1f-52.

The RF processing unit 1f-10 performs a function for transmitting and receiving a signal through a wireless channel, such as band conversion and amplification of a signal. That is, the RF processing unit 1f-10 up-converts a baseband signal provided from the baseband processing unit 1f-20 into an RF band signal and then transmits the converted signal through an antenna, and down-converts an RF band signal received through the antenna into a baseband signal. For example, the RF processing unit 1f-10 may include a transmission filter, a reception filter, an amplifier, a mixer, an oscillator, a DAC, and an ADC. Although FIG. 1F illustrates only one antenna, the first access node may include a plurality of antennas. The RF processing unit 1f-10 may include a plurality of RF chains. Further, the RF processing unit 1f-10 may perform beamforming. For the beamforming, the RF processing unit 1f-10 may control the phase and the size of each of the signals transmitted and received through a plurality of antennas or antenna elements. The RF processing unit may perform a downlink MIMO operation by transmitting one or more layers.

The baseband processing unit if 20 performs a function of conversion between a baseband signal and a bitstream according to a physical-layer standard of the first radio-access technology. For example, when data is transmitted, the baseband processing unit 1f-20 generates complex symbols by encoding and modulating a transmission bitstream. When data is received, the baseband processing unit 1f-20 reconstructs a reception bitstream by demodulating and decoding a baseband signal provided from the RF processing unit 1f-10. For example, in an OFDM scheme, when data is transmitted, the baseband processing unit 1f-20 may generate complex symbols by encoding and modulating the transmission bitstream, map the complex symbols to subcarriers, and then configure OFDM symbols through an IFFT operation and CP insertion. In addition, when data is received, the baseband processing unit 1f-20 divides a baseband signal provided from the RF processing unit 1f-10 in units of OFDM symbols, recovers signals mapped with subcarriers through an FFT operation, and then recovers a reception bitstream through demodulation and decoding. The baseband processing unit 1f-20 and the RF processing unit 1f-10 transmit and receive signals as described above. Accordingly, the baseband processing unit 1f-20 and the RF processing unit 1f-10 may be referred to as a transmitter, a receiver, a transceiver, a communication unit, or a wireless communication unit.

The backhaul communication unit 1f-30 provides an interface for communicating with other nodes within the network. That is, the backhaul communication unit 1f-30 converts a bitstream transmitted to another node, for example, the SeNB or a core network, from the MeNB into a physical signal and converts a physical signal received from the other node into a bitstream.

The storage unit 1f-40 stores data such as a basic program, an application, and configuration information for the operation of the MeNB. Particularly, the storage unit 1f-40 may store information on bearers allocated to the accessed UE and the measurement result reported from the accessed UE. The storage unit 1f-40 may store information which is a reference for determining whether or not to provide multiple connections to the UE. The storage unit 1f-40 provides stored data in response to a request from the controller 1f-50.

The controller 1f-50 controls the overall operation of the MeNB. For example, the controller 1f-50 transmits and receives a signal through the baseband processing unit 1f-20 and the RF processing unit 1f-10 or through the backhaul communication unit 1f-30. The controller 1f-50 records data in the storage unit 1f-40 and reads the data. To this end, the controller 1f-50 may include at least one processor. The controller controls the operation of the base station illustrated in FIG. 1C.

Embodiment 2

Figure 2A:
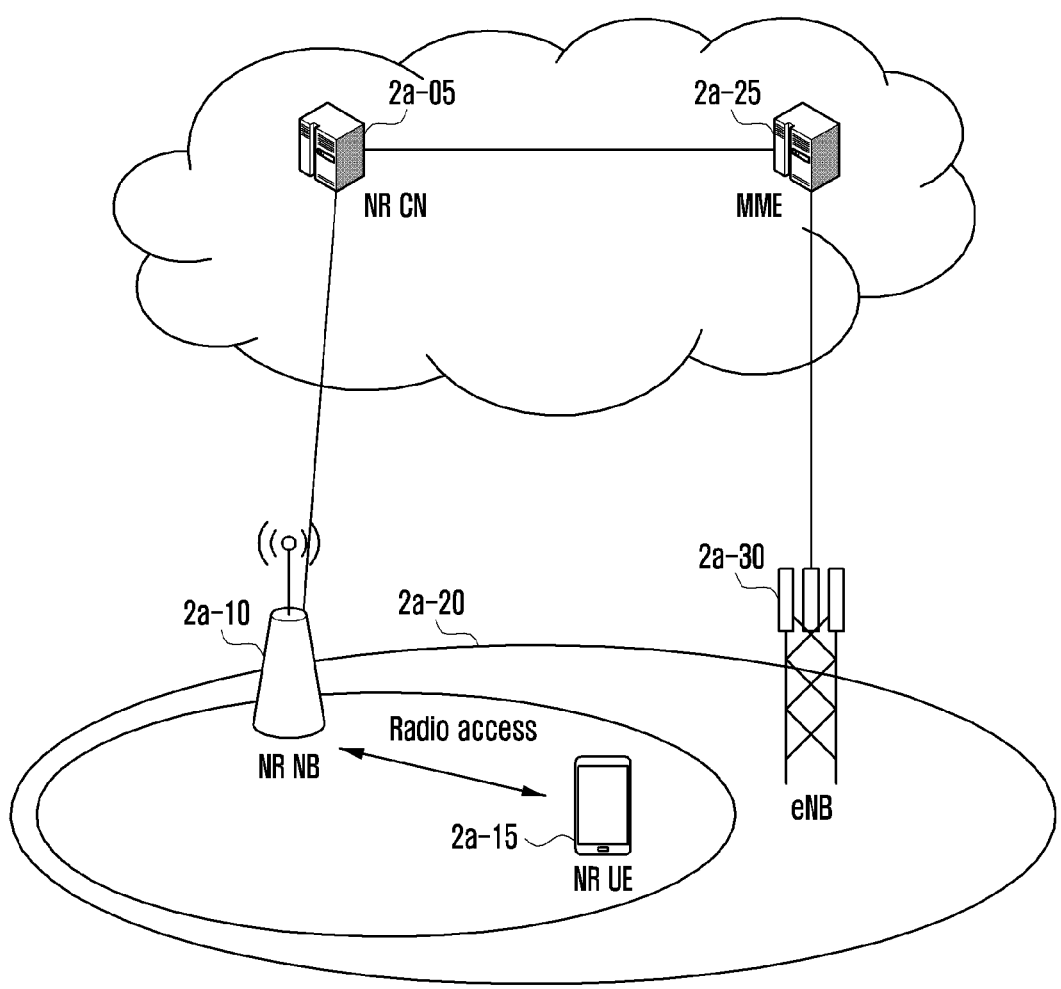
FIG. 2A illustrates the structure of a next-generation mobile communication system according to an embodiment of the disclosure.

FIG. 2A illustrates the structure of a next-generation mobile communication system according to an embodiment of the disclosure.

Referring to FIG. 2A, a radio access network of the next-generation mobile communication system includes a next-generation base station 2a-10 (hereinafter, referred to as a new radio node B (NR NB) or a base station) and a new radio core network (NR CN) 2a-05 as illustrated in FIG. 2A. A user terminal 2a-15 (hereinafter, referred to as a new radio user equipment (NR UE) or a terminal) accesses an external network through the NR NB 2a-10 and the NR CN 2a-05.

In FIG. 2A, the NR NB 2a-10 corresponds to an evolved Node B (eNB) of the conventional LTE system. The NR NB 2a-10 may be connected to the NR LTE 2a-15 and may provide better service than a conventional node B. Since all user traffic is served through a shared channel in the next-generation mobile communication system, a device for collecting and scheduling status information of buffer statuses, available transmission power statuses, and channel statuses of UEs is required, which corresponds to the NR NB 2a-10. One NR NB generally controls a plurality of cells. The NR NB may have a bandwidth wider than the conventional maximum bandwidth in order to implement super-high-speed data transmission compared to conventional may apply orthogonal frequency-division multiplexing (OFDM) through radio-access technology, and may further apply beamforming technology. Further, an adaptive modulation and coding (AMC) scheme of determining a modulation scheme and a channel-coding rate is applied depending on the channel status of the UE. The NR CN 2a-05 performs a function of supporting mobility, configuring a bearer, and configuring QoS, The NR CN 2a-05 is a device that performs not only a function of managing the mobility of the UE but also various control functions, and is connected to a plurality of NR NBs. Further, the next-generation mobile communication system may be linked to the conventional LTE system, and the NR CN 2a-05 may be connected to an MME 2a-25 through a network interface. The MME 2a-25 is connected to an eNB 2a-30, which is a conventional base station.

Uplink transmission of the UE causes uplink interference, and thus uplink transmission output should be limited to an appropriate level. To this end, the UE determines uplink transmission output according to a predetermined rule, and the base station performs uplink scheduling in consideration of a transmission output margin (power headroom) of the UE.

The Embodiment 2 of the disclosure proposes a method and an apparatus for determining uplink transmission output and a power headroom (PH) using a pathloss reference beam.

Figure 2B:
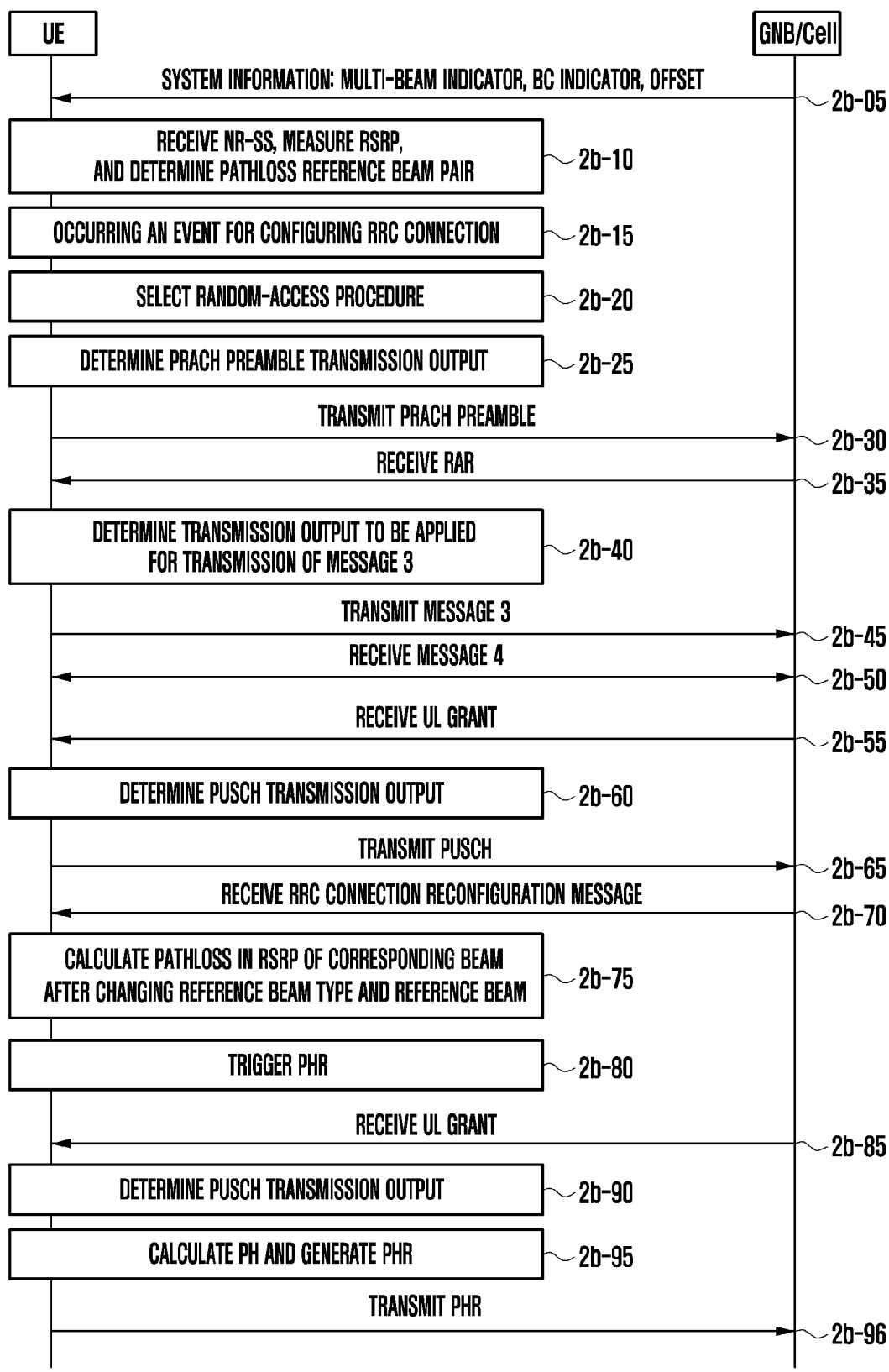
FIG. 2B illustrates the overall operation of the UE and the base station according to an embodiment of the disclosure.

FIG. 2B illustrates the overall operation of the UE and the base station according to an embodiment of the disclosure.

In step 2b-05, the UE obtains system information.

The system information includes information indicating whether a single beam or multiple beams are supported, information indicating whether beam correspondence exists, information specifying random-access resources, NR-SS block transmission output information, and various offset information required for uplink transmission output.

In step 2b-10, the UE determines an NR-SS corresponding to the pathloss reference beam among a plurality of NR-SSs (or NR-SS blocks) and periodically measures the RSRP of the pathloss reference beam. The RSRP of the pathloss reference beam is used to determine uplink transmission output and calculate the PH in the future. If the corresponding cell is a single-beam cell, only one NR-SS exists, and thus there is no separate pathloss reference beam and the RSRP of the corresponding cell is the pathloss reference RSRP. If the corresponding cell is a multi-beam cell, the UE uses RSRP of a pair of pathloss reference beams as a pathloss reference RSRP among RSRPs of a plurality of beams and uses a downlink transmission beam of the pair of pathloss reference beams as a pathloss reference downlink beam.

The pair of pathloss reference beams is a pair of downlink transmission and reception beams (beam reference link (BPL)) for providing the lowest pathloss or the best RSRP. The pathloss reference downlink transmission beam may be a downlink beam of a pair of beams for providing the best RSRP or a downlink beam explicitly indicated by the base station.

If the need to configure the RRC connection occurs in step 2b-15, the UE selects a random-access procedure to be performed in step 2b-20.

The UE determines the transmission output to be applied when a PRACH preamble is transmitted in step 2b-25.

The UE calculates a reference beam pathloss by applying RSRP measured in the pathloss reference beam as shown below.

Reference beam pathloss=NR-SS transmission output−pathloss reference beam RSRP

NR-SS transmission output is broadcasted through system information.

Preamble transmission output is calculated as shown below.

Preamble transmission output=pathloss reference beam pathloss+received target_power+offset_UL_rx_beam_1+offset_UL_tx_beam_1 received_target_power is a value broadcasted through minimum system information, and may be understood as the minimum RSRP value that the base station can receive.

offset_UL_rx_beam_1 is an offset value applied according to the degree of uplink reception beam directivity to be applied when the base station receives a preamble or message 3 (or the number of beams required for covering a beam width, an internal angle of the beam, or full ranges) and may be broadcasted through minimum system information. The offset may use a higher value as the directivity of the reception beam is weaker (or as the beam width is wider), and use a lower value as the directivity of the reception beam is stronger.

offset_LL_tx_beam_1 is an offset value applied according to the degree of uplink transmission beam directivity to be applied when the UE transmits a preamble or message 3, and may be broadcasted through minimum system information. Instead of separately broadcasting offset_UL_rx_beam1 and offset_UL_tx_beam_1, a value corresponding to the sum thereof may be broadcasted.

The degree of uplink transmission beam directivity to be applied when the preamble and message 3 are transmitted may be broadcasted through minimum system information. The information may be, for example, information indicating the number of uplink beam sweepings by the UE or logical identifier information specifying a degree of directivity (for example, logical identifier 1: beam width/internal angle=30 degrees; number of beams=12, logical identifier 2: beam width/internal angle=60 degrees; number of beams 6).

In step 2b-30, the UE transmits a PRACH preamble.

The UE applies the degree of directivity indicated by minimum SI and applies the transmission output calculated in step 2b-25 to transmit the preamble. If the UE cannot apply the degree of directivity indicated by the minimum SI, the UE applies the degree of directivity that is the closest thereto.

In step 2b-35, the UE receives an RAR. If a valid RAR is received in a predetermined time interval, the UE analyzes information included in the RAR and prepares to transmit message 3. The information included in the RAR includes uplink transmission timing control information (an uplink timing advance command) of the UE, information on transmission resources to be used for transmitting message 3, information on a transmission format (modulation and coding scheme (MCS) or transport block size) to be applied to the transmission of message 3, and the transmission output control command to be applied when message 3 is transmitted.

The UE determines the transmission output to be applied when message 3 is transmitted, as described below in step 2b-40.

> Message transmission output=reference beam pathless+offset_UL_$rx$_beam_1+offset_UL_$tx$_beam_1+Msg3 offset+transmission output control command Msg 3 offset is an offset that must be applied when message 3 is applied, and is a value determined according to the size of message 3. For the Msg 3 offset, a plurality of values may be broadcasted through minimum SI or other SI for the size of each message 3, and the UE applies an offset value corresponding to the size of message 3 to be transmitted. A value received by the RAR is applied to the transmission output control command.

The UE transmits message 3 in step 2b-45.

At this time, the UE applies the degree of directivity indicated by the minimum SI (beam width, beam sharpness, or the number of times potential beam sweeping is performed).

In step 2b-50, the UE receives message 4. Message 4 may include a control message for configuring the RRC connection, and the control message may include information for configuring a power headroom report (PHR) and information specifying a pathloss reference downlink beam. If the information specifying the reference downlink beam is not included, the UE directly uses the currently used reference downlink beam (that is, the NR-SS beam/block).

If the reference downlink beam is changed, the UE calculates the uplink transmission output and the PH through a pathloss of a new reference downlink beam.

The information for configuring the PHR may be, for example, information specifying a PHR-triggering condition and a PHR format. The PHR-triggering condition may include a pathloss change reference value of the reference downlink beam (hereinafter, referred to as a pathloss change reference value) and a timer for periodic transmission. The information specifying the PHR format may include, for example, information indicating whether a type 2 PH is included.

In step 2b-55, the UE receives a UL grant from the base station. The UL grant contains information on transmission resources for uplink transmission of the UE, a transmission format, a transmission output control command, and a transmission type. The transmission type serves to distinguish transmissions having different attributes, like enhanced mobile broadband (eMBB) and ultra-reliable low-latency communications (URLLC), and the UE may apply different uplink transmission output determination schemes to uplink transmission for eMBB and uplink transmission for URLLC. Transmission type information may specify the numerology/transmission time interval to be applied to PUSCH transmission. For example, URLLC may be transmitted through a short transmission time interval (TTI) in order to satisfy ultra-low latency. A long TTI/low reliable transmission output may be applied if the transmission type has a predetermined value and a short TTI/highly reliable transmission output may be applied if the transmission type has another predetermined value.

In step 2b-60, the UE calculates PUSCH transmission output.

> PUSCH transmission output=second reference beam pathloss+offset_UL_$rx$_beam+offset_UL_$tx$_beam_2+transmission format (TF) offset+offset_numerology_TTI_length_type+PUSCH transmission output control command The second reference beam is a reference beam configured for PUSCH transmission.

offset_UL_rx_beam_2 is an offset value that is applied according to the degree of uplink reception beam directivity to be applied when the base station receives the PUSCH of the corresponding UE and is made known through a dedicated RRC control message, such as an RRC connection setup message or an RRC connection reconfiguration message. The offset may use a higher value as the directivity of the reception beam is weaker (or as the beam width is wider) and may use a lower value as directivity of the reception beam is stronger.

offset_UL_tx_beam_2 is an offset value that is applied according to a degree of uplink transmission beam directivity to be applied when the UE transmits the PUSCH, and is made known through a dedicated RRC control message such as an RRC connection setup message or an RRC connection reconfiguration message. Instead of separately broadcasting offset_UL_rx_beam_2 and offset_UL_tx_beam_2, a value corresponding to the sum thereof may be provided.

TF specific offset is a value determined according to a transmission format (MCS or the number of PRBs) applied to PUSCH transmission.

offset_numerology_TTI_Length_type is an offset added according to the transmission type, and may be understood as an offset for applying higher transmission output when a short transmission time interval/highly reliable transmission is performed. In other words, for the offset, a predetermined value may be applied through the RRC control message if the transmission type is a predetermined value, and a predetermined value, for example, 0, may be applied if the transmission type is another predetermined value.

For reference, the UE determines transmission output when the PUCCH is transmitted as described below.

PUSCH transmission output=third reference beam pathloss+offset_UL_rx_beam_3+offset_UL_tx_beam_3+PUCCH TF specific offset+PUCCH transmission output control command The third reference beam is a reference beam configured to calculate a pathloss for PUSCH transmission output. If the third reference beam is not separately configured, the UE uses the second reference beam for PUSCH transmission to calculate PUCCH transmission output. The third reference beam may be configured through a dedicated RRC control message.

offset_UL_rx_beam_3 is an offset value applied according to the degree of uplink reception beam directivity to be applied when the base station receives the PUCCH of the corresponding UE, and is made known through a dedicated RRC control message such as an RRC connection setup message or an RRC connection reconfiguration message. Unless the offset is separately signaled, the same value as offset_UL_rx_beam_2 is used.

offset_UL_tx_beam_3 is an offset value that is applied according to the degree of uplink transmission beam directivity to be applied when the UE transmits the PUSCH, and is made known through a dedicated RRC control message such as an RRC connection setup message or an RRC connection reconfiguration message. Unless the offset is separately signaled, the same value as offset_UL_rx_beam_2 is used.

In step 2b-65, the UE performs PUSCH transmission.

In step 2b-70, the UE receives an RRC connection reconfiguration message from the base station.

The RRC connection reconfiguration control message may include information related to a channel state information-reference signal (CSI-RS) and information indicating a change in a reference beam type. While the NR-SS is a beam-related common signal used by a plurality of UEs including an idle mode UE in common, the CSI-RS is a UE-specific beam-related reference signal configured through a dedicated RRC message. The CSI-RS may have a narrower beam range (or sharper beam directivity) than the NR-SS considering the location/performance of the UE. Through the RRC connection reconfiguration message, the base station may notify the UE of time/frequency resources through which the CSI-RS is transmitted.

The CS-RS may be transmitted in a beam-sweeping manner, and the UE may determine an optimal pair of CSI-RS transmission beam/reception beam by performing downlink reception beam sweeping. If the UE already uses a sufficiently narrow reception beam configuration when a common beam (NR-SS) is received, the UE may receive a CSI-RS beam by applying the reception beam configuration used in the common beam before the reception-beam-sweeping process.

The UE initiating a random-access process in a predetermined cell and performing the RRC connection uses the NR-SS corresponding to the type of the reference beam. If the BS instructs the UE to change the reference beam type to the CSI-RS through the dedicated RRC message, the UE changes the reference beam type from the NR-SS to the CSI-RS.

Alternatively, if the CSI-RS is configured, the UE may implicitly change the reference beam type from the NR-SS to the CSI-RS. If the CSI-RS is released, the UE may change the reference beam type from the NR-SS to the CSI-RS.

The reference beam type corresponding to the NR-SS means that the NR-SS is used as the pathloss reference beam (the pathloss is calculated from RSRP measured in the reference NR-SS beam), and the reference beam type corresponding to the CSI-RS means that the CSI-RS is used as the pathloss reference beam (the pathloss is calculated from RSRP measured in the reference CSI-RS beam).

If the reference beam type is changed, the UE determines the beam (or BPL) providing the best RSRP or a specific beam that the base station explicitly specifies, among changed types of beams, and determines the pathloss by applying RSRP measured in the downlink reference beam (the UE measures RSRP by applying a plurality of downlink reception beams to the downlink reference beam, determines the downlink reception beam in which the best RSRP is measured as the pathloss reference downlink reception beam, and calculates the uplink transmission output and the PH using the RSRP measured in the pathloss reference downlink transmission beam and the pathloss reference downlink reception beam).

In step 2b-75, the UE calculates the pathloss using the RSPR measured for a new reference beam, which is a new reference beam type. If the change reference beam type is the CSI-RS, CSI-RS transmission output information is included in the RRC connection reconfiguration message, and the UE calculates the reference pathloss by subtracting RSRP from the CSI-RS transmission output.

The UE determines PUSCH transmission output and PUCCH transmission output using the pathloss calculated through the RSRP of the new reference beam corresponding to the new reference beam type. At this time, the reference beam to be applied for PUSCH transmission output and the reference beam to be output for PUCCH transmission output ay be configured differently according to an indication from the base station. For example, the reference beam to be applied for PUSCH transmission may be a beam selected from among NR-SS beams, whereas the reference beam to be applied for PUCCH transmission may be a beam selected from among CSI-RS beams.

In step 2b-80, the PHR is triggered. For example, PHR triggering may be performed when a reference beam (or a reference beam type) is changed or a pathloss is changed to a predetermined reference or higher.

In step 2b-85, the UE receives a UL grant.

In step 2b-90, the UE calculates transmission output of the PUSCH to be transmitted through the UL grant. If the PUCCH should also be transmitted at the corresponding time point, the UE also calculates the transmission output of the PUCCH.

In step 2b-95, the UE calculates a PH by applying the pathloss measured for the reference downlink beam, and generates a PHR that reports the PH. The PH is a value obtained by subtracting the transmission output required for PUSCH transmission from the maximum transmission output. The maximum transmission output of the UE is a value determined in consideration of the lower value between the maximum transmission output allowed in the corresponding beam or the corresponding cell and the maximum transmission output that the UE can apply, and in further consideration of a power backoff value added to satisfy requirements for spurious emission.

The format of the PHR may vary depending on the number of serving cells configured in the LTE. If uplink carrier aggregation is not configured and thus the PUSCH/PUCCH is transmitted through only one uplink, the UE uses a including only a PH for a serving cell in which the PUSCH/PUCCH is transmitted. At this time, a type 2 PH may be included according to an indication from the base station.

If uplink carrier aggregation is configured and thus the PUSCH is transmitted through a plurality of serving cells, type 2 PH is always included. The UE calculates the PHs of all serving cells that are currently in an active state and in which uplink is configured as well as the serving cell in which the PHR is to be transmitted, and inserts the PHs in the PHR.

The PH of the serving cell in which actual uplink transmission is performed is a difference value between the transmission output required for the uplink transmission and the maximum transmission output.

The PH of the serving cell in which no actual uplink transmission is performed is a difference value between the transmission output required for virtual uplink transmission under predetermined conditions and the maximum transmission output. The transmission output required for virtual uplink transmission is calculated on the basis of the following assumed conditions.

1) Uplink transmission using one PRB, 2) uplink transmission applying the lowest MCS level, 3) uplink transmission applying the degree of directivity indicated by the base station, 3) an offset value corresponding to a predetermined transmission type (for example, long TTI/low reliability), 4) accumulated transmission output control command until the corresponding time point.

The predetermined transmission type may be determined in advance, and the information may be stored in a UE storage device in advance.

In step 2b-96, the UE transmits a MAC packet data unit (PDU) including a PHR MAC CE through the PUSCH.

Figure 2C:
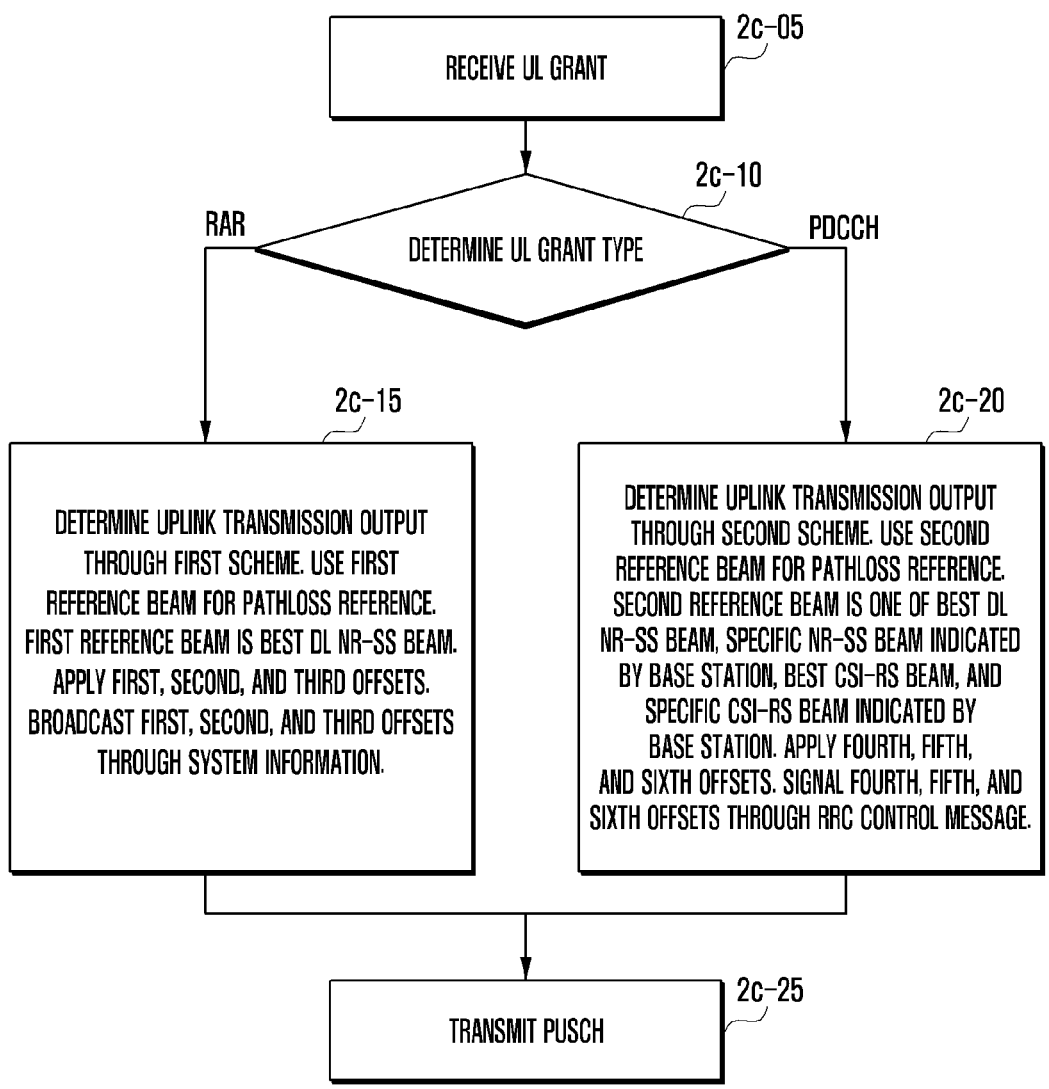
FIG. 2C illustrates the operation of the UE according to an embodiment of the disclosure.

FIG. 2C illustrates the operation of the UE according to an embodiment of the disclosure.

In step 2c-05, the terminal receives a UL grant.

In step 2c-10, the UE determines whether the UL grant is received through an RAR or a PDCCH. The UE proceeds to step 2c-15 if the UL grant is received through the RAR and proceeds to step 2c-20 if the RAR is received through the PDCCH.

in step 2c-15, the UE determines uplink transmission output through a first scheme.

First scheme: uses a first reference beam as a pathloss reference (or calculates uplink transmission output by applying a pathloss measured in the first reference beam). The first reference beam is the best NR-SS beam, A first offset (offset_UL_rx_beam_1), a second offset (offset_UL_tx_beam_1), and a third offset (Msg 3 offset) are applied when the uplink transmission output is calculated. The first offset, the second offset, and the third offset are broadcasted through system information. The first offset and the second offset are offsets associated with a degree of beam directivity. The third offset is an onset associated with the size of the packet to be transmitted.

In step 2c-20, the UE determines uplink transmission output through a second scheme.

Second scheme: uses a second reference beam as a pathloss reference. The second reference beam is one of the best NR-SS beam, a specific NR-SS beam indicated by the base station, the best CSI-RS beam, and a specific CSI-RS beam indicated by the base station. A fourth offset (offset_UL_rx_beam_2), a fifth offset (offset_UL_tx_beam_2), and a sixth offset (offset_numerology_TTI_length_type) may be applied when the uplink transmission output is calculated. The fourth offset, the fifth offset, and the sixth offset may be signaled through an RRC control message. The fourth offset and the fifth offset may be offsets associated with a degree of beam directivity. The sixth offset is an offset associated with a transmission type.

In step 2c-25, the UE transmits the PUSCH using the lower value between the uplink transmission output, determined as described above, and the maximum transmission output as uplink transmission output.

Figure 2D:
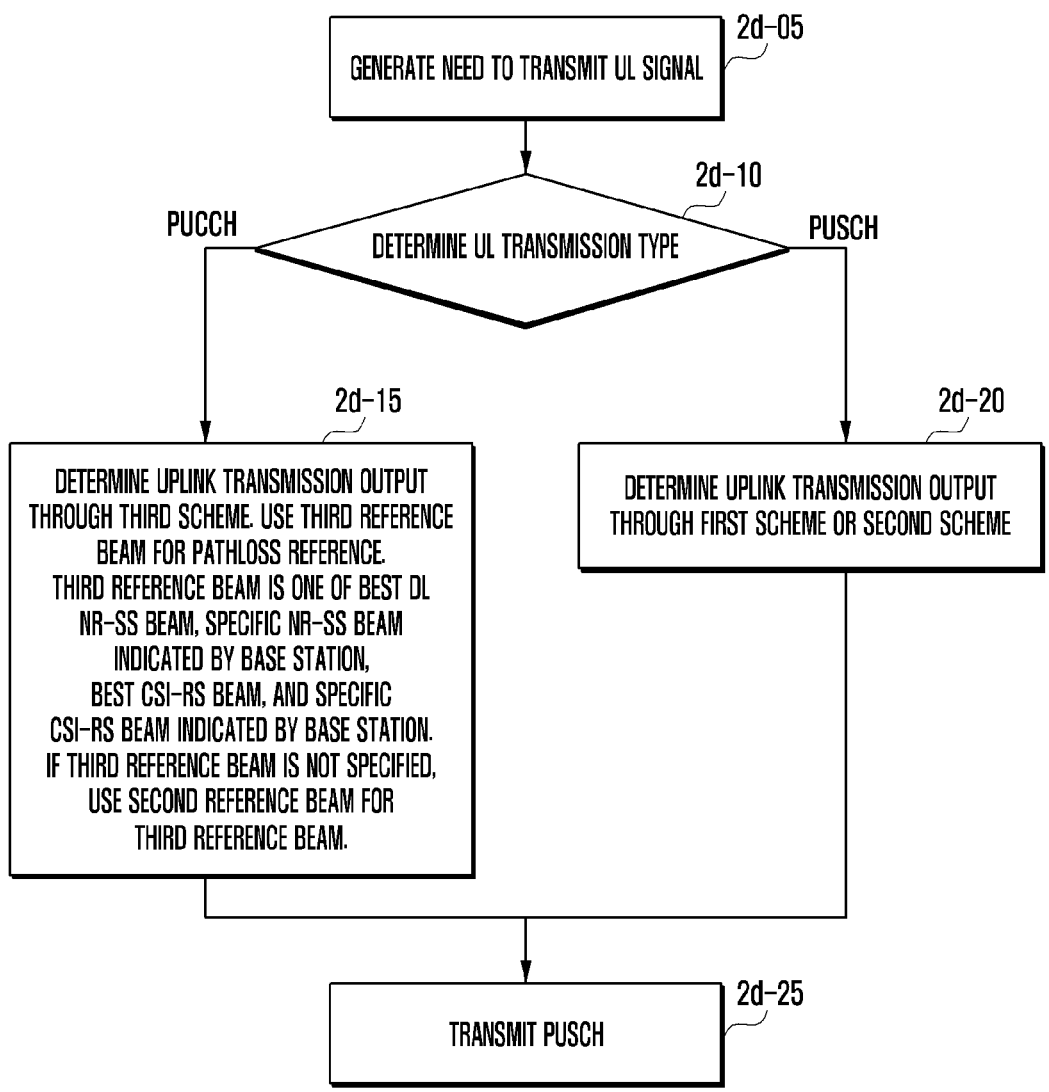
FIG. 2D illustrates the operation of the UE according to another embodiment of the disclosure.

FIG. 2D illustrates the operation of the UE according to another embodiment of the disclosure.

In step 2d-05, the need to transmit a UL signal arises.

In step 2d-10, the UE determines whether the UL signal is a PUCCH or a PUSCH. The UE proceeds to step 2d-15 if the UL signal is a PUCCH and proceeds to step 2d-20 if the signal is a PUSCH.

In step 2d-15, the UE calculates UL transmission output through a third scheme.

Third scheme: uses a third reference beam as a pathless reference. The third reference beam may be the same beam as the second reference beam. A third reference beam different from the second reference beam may be used according to an indication from the base station, and the third reference beam may be one of the best NR-SS beam, a specific NR-SS beam indicated by the base station, the best CSI-RS beam, and a specific SI-RS beam indicated by the base station.

In step 2d-25, the UE uses the lower value between the uplink transmission output determined above and the maximum transmission output as the uplink transmission output to transmit the uplink signal.

Figure 2E:
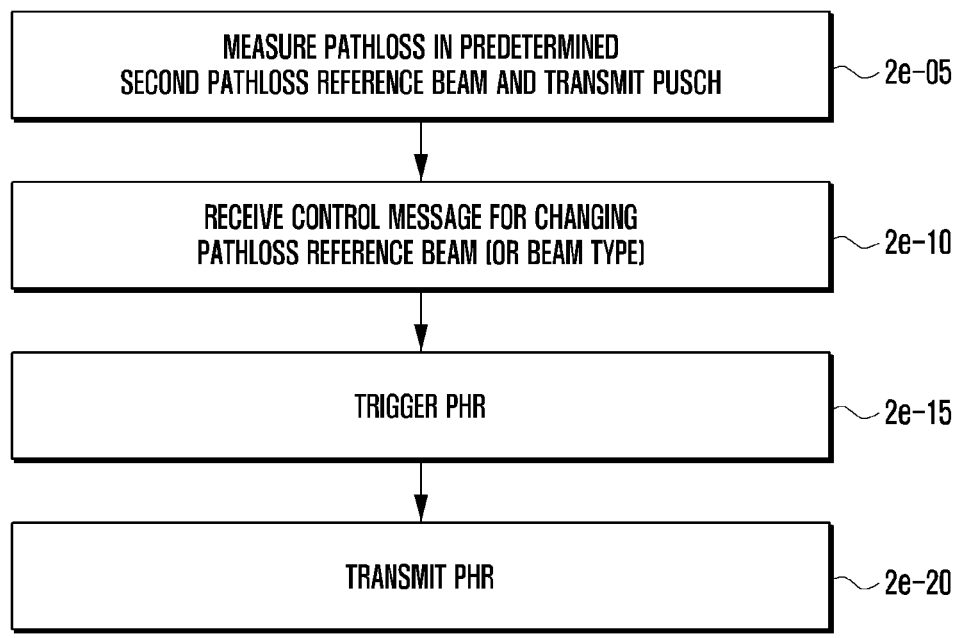
FIG. 2E illustrates the operation of the UE according to another embodiment of the disclosure.

FIG. 2E illustrates the operation of the UE according to another embodiment of the disclosure.

In step 2e-05, the UE performs PUSCH transmission by measuring a pathless in a predetermined second reference beam.

In step 2e-10 the UE receives an RRC control message or a MAC control message for changing a pathloss reference beam (changing from the best beam to a predetermined beam, from a predetermined beam to another predetermined beam, or from a predetermined beam to the best beam) or changing the type of the pathless reference beam (changing from an NR-SS to a CSI-RS or from a CSI-RS to an NR-SS).

A pathless reference beam change MAC CE is specified by a predetermined logical channel identifier (LCID) and includes reference beam type information indicating one of the NR-SS and the CSI-RS and beam index information indicating the reference beam. The two pieces of information contain the size of n-bit reference beam type information, m-bit beam index information, and x-bit reserved bits, and n+m+x is 8. The information is included in one byte.

The beam index is logical information having one value from 0 to 2 m−1, and particularly, one piece of logical information (for example, 0 or 2 m−1) is used to specify the best beam rather than indicating a specific beam.

In step 2e-15, the UE triggers a PHR.

If the UE receives the UL grant, the UE generates a PHR MAC CE including a PH calculated by applying the newly changed reference beam or reference beam type, inserts the PHR MAC CE into a MAC PDU, and transmits the MAC PDU to the base station in step 2e-20.

Figure 2F:
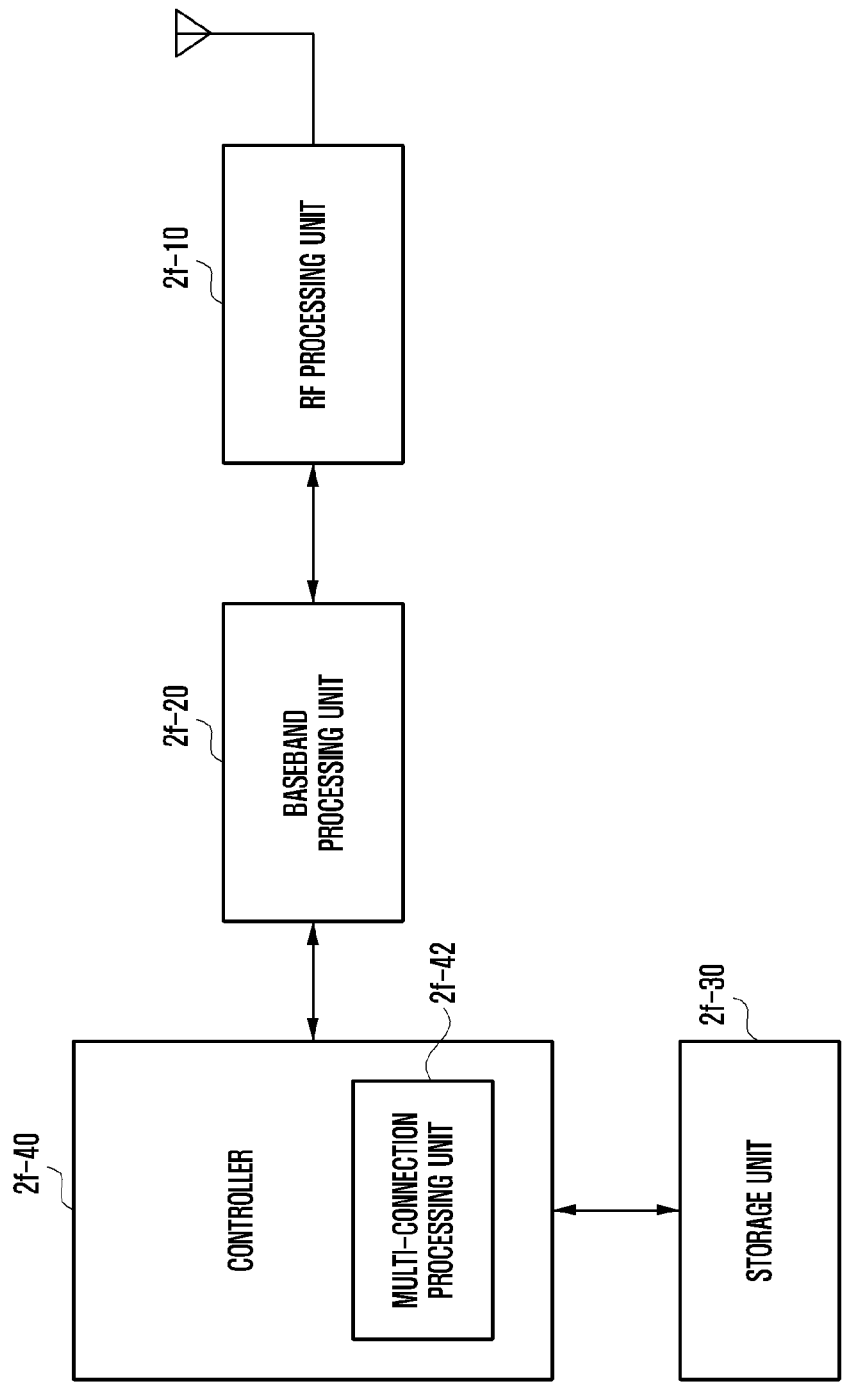
FIG. 2F illustrates the configuration of the UE according to an embodiment of the disclosure.

FIG. 2F illustrates the configuration of the UE according to an embodiment of the disclosure.

Referring to FIG. 2F, the UE includes a radio-frequency (RF) processing unit 2f-10, a baseband processing unit 2f-20, a storage unit 2f-30, and a controller 2f-40. The controller 2f-40 may further include a multi-connection processing unit 2f-42.

The RF processing unit 2f-10 performs a function of transmitting and receiving a signal through a radio channel, such as band conversion and amplification of a signal. That is, the RF processing unit 2f-10 up-converts a baseband signal provided from the baseband processing unit 2f-20 into an RF band signal, transmits the RF band signal through an antenna, and then down-converts the RF band signal received through the antenna into a baseband signal. For example, the RF processing unit 2f-10 may include a transmission filter, a reception filter, an amplifier, a mixer, an oscillator, a digital-to-analog convertor (DAC), an analog-to-digital convertor (ADC), and the like. Although FIG. 2E illustrates only one antenna, the UE may include a plurality of antennas. The RF processing unit 2f-10 may include a plurality of RF chains. Moreover, the RF processing unit 2f-10 may perform beamforming. For the beamforming, the RF processing unit 2f-10 may control the phase and size of each of the signals transmitted/received through a plurality of antennas or antenna elements. The RF processing unit may perform MIMO and receive a plurality of layers when performing the MIMO operation.

The baseband processing unit 2f-20 performs a function for conversion between a baseband signal and a bitstream according to a physical-layer standard of the system. For example, when data is transmitted, the baseband processing unit 2f-20 generates complex symbols by encoding and modulating a transmission bitstream. When data is received, the baseband processing unit 2f-20 reconstructs a reception bitstream by demodulating and decoding a baseband signal provided from the RF processing unit 2f-10. For example, in an orthogonal frequency-division multiplexing (OFDM) scheme, when data is transmitted, the baseband processing unit 2f-20 generates complex symbols by encoding and modulating a transmission bitstream, maps the complex symbols to subcarriers, and then configures OFDM symbols through an IFFT (inverse fast Fourier transform) operation and a CP (cyclic prefix) insertion. Further, when data is received, the baseband processing unit 2f-20 divides the baseband signal provided from the RF processor 2f-10 in units of OFDM symbols, reconstructs the signals mapped to the subcarriers through a fast Fourier transform (FFT) operation, and then reconstructs a reception bitstream through demodulation and decoding.

The baseband processing unit 2f-20 and the RF processing unit 2f-10 transmit and receive signals as described above. Accordingly, the baseband processing unit 2f-20 and the RF processing unit 2f-10 may be referred to as a transmitter, a receiver, a transceiver, or a communication unit. At least one of the baseband processing unit 2f-20 and the RF processing unit 2f-10 may include a plurality of communication modules for supporting a plurality of different radio access technologies. At least one of the baseband processing unit 2f-20 and the RF processing unit 2f-10 may include different communication modules for processing signals in different frequency bands. For example, the different radio access technologies may include a wireless LAN (for example, IEEE 802.11) and a cellular network (for example, LTE). Further, the different frequency bands may include a super-high frequency (SHF) (for example, 2.NRHz, NRhz) band and a millimeter (mm)-wave (for example, 60 GHz) band.

The storage unit 2f-30 stores data such as a basic program, an application, and setting information for the operation of the UE. Particularly, the storage unit 2f-30 may store information related to a second access node for performing wireless communication using a second radio-access technology. The storage unit 2f-30 provides stored data in response to a request from the controller 2f-40.

The controller 2f-40 controls the overall operation of the UE. For example, the controller 2f-40 transmits and receives a signal by controlling the baseband processing unit 2f-20 and the RF processing unit 2f-10. The controller 2f-40 records data in the storage unit 2f-30 and reads the data. To this end, the controller 2f-40 may include at least one processor. For example, the controller 2f-40 may include a communication processor (CP) that performs control for communication, and an application processor (AP) that controls a higher layer such as an application.

The controller 2f-40 serves to control the operation of the UE described in FIGS. 2B, 2C, 2D, and 2E. For example, the controller 2f-40 may perform control to determine a pathloss reference beam on the basis of whether information indicating the pathloss reference beam is received, obtain a pathloss on the basis of the pathloss reference beam, obtain a power headroom (PH) on the basis of the pathloss, and transmit a power headroom report (PHR) including the PH. If the information indicating the pathloss reference beam is not received, the pathloss reference beam may be determined on the basis of a synchronization signal (SS) block. The radio resource control (RRC) connection reconfiguration message including the information indicating the pathloss reference beam is received, and the pathloss reference beam may be determined on the basis of the information indicating the pathloss reference beam. Further, a specific beam determined by the base station among the information indicating the pathloss reference beam included in the RRC connection reconfiguration message may be determined as the pathloss reference beam. The controller 2f-40 may perform control to receive a physical downlink control channel (PDCCH) including an uplink grant for a physical uplink shared channel (PUSCH). The PH may be determined on the basis of the RRC connection reconfiguration message and the PDCCH.

Figure 2G:
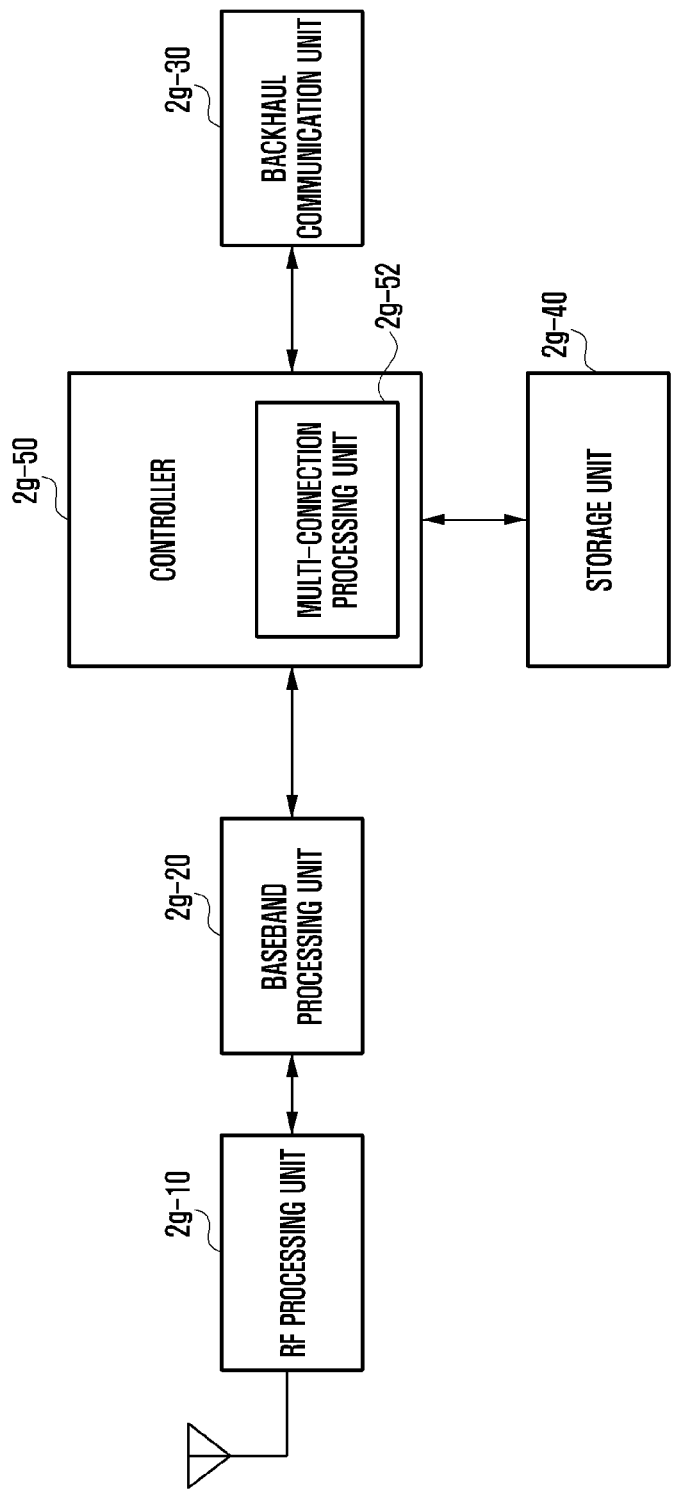
FIG. 2G illustrates the configuration of the base station according to an embodiment of the disclosure.

FIG. 2G illustrates the configuration of the base station according to an embodiment of the disclosure.

As illustrated in FIG. 2G, the base station includes an RF processing unit 2g-10, a baseband processing unit 2g-20, a backhaul communication unit 2g-30, a storage unit 2g-40, and a controller 2g-50. The controller 2g-50 may further include a multi-connection processing unit 2g-52.

The RF processing unit 2g-10 performs a function of transmitting and receiving a signal through a radio channel, such as band conversion and amplification of a signal. That is, the RF processing unit 2g-10 up-converts a baseband signal provided from the baseband processing unit 2g-20 intro an RF band signal, and then transmits the converted signal through an antenna and down-converts an RF band signal received through the antenna into a baseband signal. For example, the RF processing unit 2g-10 may include a transmission filter, a reception filter, an amplifier, a mixer, an oscillator, a DAC, and an ADC. Although FIG. 2G illustrates only one antenna, the first access node may include a plurality of antennas. In addition, the RF processing unit 2g-10 may include a plurality of RF chains. The RF processing unit 2g-10 may perform beamforming. For the beamforming, the RF processing unit 2g-10 may control the phase and size of each of the signals transmitted and received through a plurality of antennas or antenna elements.

The RF processing unit may perform a downlink MIMO operation by transmitting one or more layers.

The baseband processing unit 2g-20 performs a function of performing conversion between a baseband signal and a bitstream according to a physical-layer standard of the first radio-access technology. For example, when data is transmitted, the baseband processing unit 2g-20 generates complex symbols by encoding and modulating a transmission bitstream. Further, when data is received, the baseband processing unit 2g-20 reconstructs a reception bitstream by demodulating and decoding a baseband signal provided from the RF processing unit 2g-10. For example, in an OFDM scheme, when data is transmitted, the baseband processing unit 2g-20 may generate complex symbols by encoding and modulating the transmission bitstream, map the complex symbols to subcarriers, and then configure OFDM symbols through an IFFT operation and CP insertion. In addition, when data is received, the baseband processing unit 2g-20 divides a baseband signal provided from the RF processing unit 2g-10 in units of OFDM symbols, recovers signals mapped with subcarriers through an FFT operation, and then recovers a reception bit string through demodulation and decoding. The baseband processing unit 2g-20 and the RF processing unit 2g-10 transmit and receive a signal as described above. Accordingly, the baseband processing unit 2g-20 and the RF processing unit 2g-10 may be referred to as a transmitter, a receiver, a transceiver, a communication unit, or a wireless communication unit.

The backhaul communication unit 2g-30 provides an interface for communicating with other nodes within the network. That is, the backhaul communication unit 2g-30 converts a bitstream transmitted to another node, for example, the SeNB or a core network, from the MeNB into a physical signal and converts the physical signal received from the other node into a bitstream.

The storage unit stores data such as a basic program, an application, and setting information for the operation of the MeNB. Particularly, the storage unit 2g-40 may store information on a bearer allocated to the accessed UE and a measurement result reported from the accessed UE. Further, the storage unit 2g-40 may store information which is a reference for determining whether to allow or interrupt multiple accesses to the UE. The storage unit 2g-40 provides stored data in response to a request from the controller 2g-50.

The controller 2g-50 controls the overall operation of the MeNB. For example, the controller 2g-50 transmits and receives a signal through the baseband processing unit 2g-20 and the RF processing unit 2g-10 or through the backhaul communication unit 2g-30. Further, the controller 2g-50 records data in the storage unit 2g-40 and reads the data. To this end, the controller 2g-50 may include at least one processor. The controller 2g-50 controls the operation of the base station illustrated in FIG. 2B. The controller 2g-50 may perform control to receive a power headroom report (PHR) including a power headroom (PH) from the UE and identify the PH of the UE on the basis of the PHR. The PH may be determined on the basis of a pathloss of a pathloss reference beam, and the pathloss reference beam may be determined on the basis of whether information indicating the pathloss reference beam is transmitted to the UE from the base station. If information indicating the pathloss reference beam is not transmitted, the pathloss reference beam may be determined on the basis of a synchronization signal (SS) block. If a radio resource control (RRC) connection reconfiguration message including the information indicating the pathloss reference beam is received, the pathloss reference beam may be determined on the basis of the information indicating the pathloss reference beam. A specific beam determined by the base station among the information indicating the pathloss reference beam included in the RRC connection reconfiguration message may be determined as the pathloss reference beam. The controller 2g-50 may perform control to transmit a physical downlink control channel (PDCCH) including an uplink grant for a physical uplink shared channel (PUSCH). The PH may be determined on the basis of the RRC connection reconfiguration message and the PDCCH.

Embodiment 3

Figure 3A:
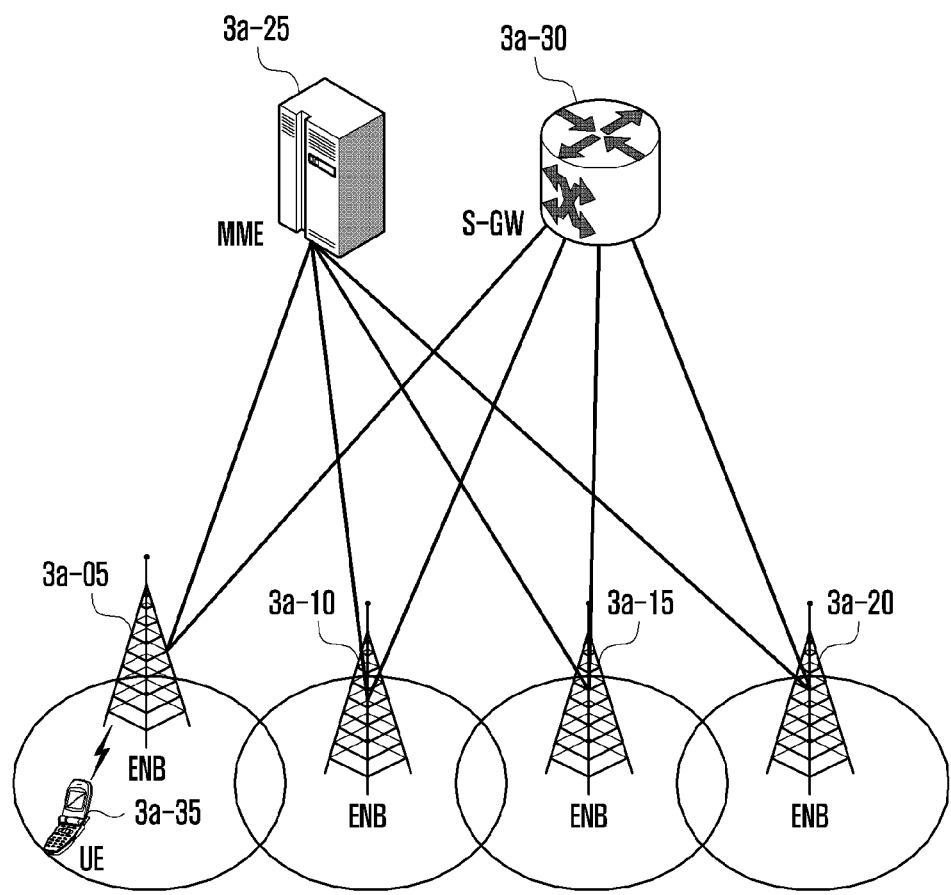
FIG. 3A illustrates the structure of an UE system according to an embodiment of the disclosure.

FIG. 3A illustrates the structure of an UE system according to an embodiment of the disclosure.

Referring to FIG. 3A, a radio access network of the LTE system includes next-generation base stations 3a-05, 3a-10, 3a-15, and 3a-20 (hereinafter, referred to as evolved node Bs (ENBs), Node Bs, or base stations), a mobility management entity (MIME) 3a-25, and a serving gateway (S-GW) 3a-30 as illustrated in FIG. 3A. A User Equipment 3a-35 (hereinafter, referred to as a UE or a terminal) accesses an external network through the ENBs 3a-05, 3a-10, 3a-15, and 3a-20 and the S-GW 3a-30.

In FIG. 3A, the ENBs 3a-05, 3a-10, 3a-15, and 3a-20 correspond to the existing node Bs of the UMTS system. The ENB 3a-05 is connected to the UE 3a-35 through a radio channel, and performs a more complicated role than a conventional node B. In the LTE system, since all user traffic including a real-time service such as a VoIP (Voice over IP) through an Internet protocol is served through a shared channel, an apparatus for collecting and scheduling status information on buffer statuses of UEs, available transmission power status, and channel statuses is required, and the ENBs 3a-05, 3a-10, 3a-15, and 3a-20 serve as this apparatus. One ENB generally controls a plurality of cells. For example, in order to implement a transmission rate of 100 Mbps, the LTE system uses orthogonal frequency-division multiplexing (OFDM) as a radio-access technology in a bandwidth of 20 MHz. Further, an adaptive modulation and coding (AMC) scheme of determining a modulation scheme and a channel-coding rate is applied depending on the channel status of the UE. The S-GW 3a-30 is a device for providing a data bearer, and generates or removes the data bearer under the control of the MME 3a-25. The MME 3a-25 is a device for performing a function of managing the mobility of the UE and various control functions, and is connected to a plurality of base stations.

Figure 3B:
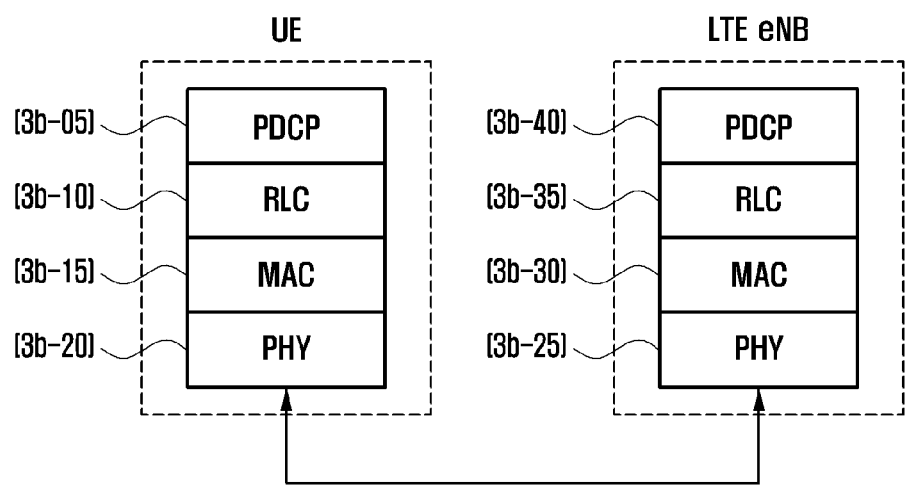
FIG. 3B illustrates a wireless protocol structure in the LTE system according to an embodiment of the disclosure.

FIG. 3B illustrates a wireless protocol structure in the LTE system according to an embodiment of the disclosure.

Referring to FIG. 3B, the UE and the ENB include packet data convergence protocols (PDCPs) 3b-05 and 3b-40, radio link controls (RLCs) 3b-10 and 3b-35, and medium access controls (MACs) 3b-15 and 3b-30, respectively, in the wireless protocol of the LTE system. The packet data convergence protocols (PDCPs) 3b-05 and 3b-40 performs an operation of compressing/reconstructing an IP header. The main functions of the PDCP are described below.

Header compression and decompression function (Header compression and decompression: ROHC only)

User data transmission function (Transfer of user data)

Sequential delivery function (In-sequence delivery of upper layer PDUs at PDCP re-establishment procedure for RLC AM)

Sequence re-arrangement function (For split bearers in DC (only support for RLC AM): PDCP PDU routing for transmission and PDCP PDU reordering for reception)

Duplicate detection function (Duplicate detection of lower layer SDUs at PDCP re-establishment procedure for RLC AM)

Retransmission function (Retransmission of PDCP SDUs at handover and, for split bearers in DC, of PDCP PDUs at PDCP data-recovery procedure, for RLC AM)

Ciphering and deciphering function (Ciphering and deciphering)

Timer-based SDU removal function (Timer-based SDU discard in uplink)

Radio Link Controls (RLCs) 3b-10 and 3b-35 reconfigure the PDCP Packet Data Unit (PDU) to be the proper size and perform an automatic repeat request (ARQ) operation. The main functions of the RLC are described below.

Data transmission function (Transfer of upper layer PDUs)

ARQ function (Error Correction through ARQ (only for AM data transfer))

Concatenation, segmentation, and reassembly function (Concatenation, segmentation and reassembly of RLC SDUs (only for UM and AM data transfer))

Re-segmentation function (Re-segmentation of RLC data PDUs (only for AM data transfer))

Reordering function (Reordering of RLC data PDUs (only for UM and AM data transfer))

Duplication detection function (only for UM and AM data transfer))

Error detection function (Protocol error detection (only for AM data transfer))

RLC SDU deletion function (RLC SDU discard (only for UM and AM data transfer))

RLC re-establishment function (RLC re-establishment)

The MACs 3b-15 and 3b-30 are connected with various RLC layer devices included in one UE, and perform an operation for multiplexing RLC PDUs to the MAC PDU and de-multiplexing the RLC PDUs from the MAC PDU. The main functions of the MAC are described below.

Mapping function (Mapping between logical channels and transport channels)

Multiplexing and demultiplexing function (Multiplexing/demultiplexing of MAC SDUs belonging to one or different logical channels into/from transport blocks (TB) delivered to/from the physical layer on transport channels)

Scheduling information report function (Scheduling information reporting)

Hybrid automatic repeat request (HARQ) function (error correction through HARQ)

Logical channel priority control function (Priority handling between logical channels of one UE)

UE priority control function (Priority handling between UEs by means of dynamic scheduling)

Multimedia Broadcast Multicast Service (MBMS) service identification function (MBMS service identification)

Transport format selection function (Transport format selection)

Padding function (Padding)

The PHY layers 3b-20 and 3b-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 3C:
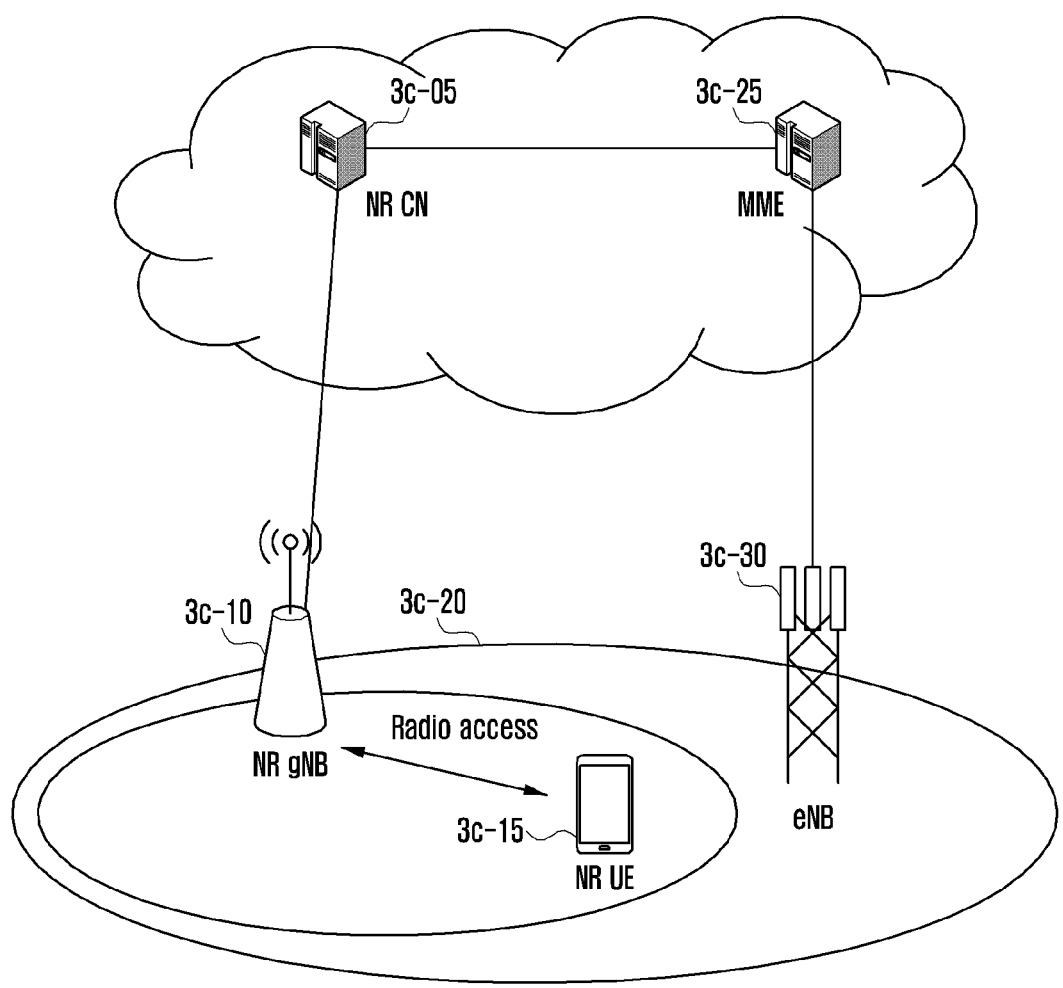
FIG. 3C illustrates the structure of a next-generation mobile communication system according to an embodiment of the disclosure.

FIG. 3C illustrates the structure of a next-generation mobile communication system according to an embodiment of the disclosure.

Referring to FIG. 3C, a radio access network of a next-generation mobile communication system (hereinafter, NR or 5G) includes a new radio node B 3c-10 (hereinafter, referred to as an NR gNB or an NR base station) and a new radio core network (NR CN) 3c-05. A user terminal (hereinafter, referred to as a new radio user equipment (NR UE) or a terminal) 3c-15 accesses an external network through the NR gNB 3c-10 and the NR CN 3c-05.

In FIG. 3C, the NR gNB 3c-10 corresponds to an evolved Node B (eNB) of a conventional LTE system. The NR gNB 3c-10 may be connected to an NR UE 3c-15 through a radio channel, and may provide better service than a conventional node B. Since all user traffic is served through a shared channel in the next-generation mobile communication system, a device for collecting and scheduling status information of buffer statuses, available transmission power statuses, and channel statuses of UEs is required, which corresponds to the NR NB 3c-10. One NR gNB generally controls a plurality of cells. The NR gNB may have a bandwidth wider than the conventional maximum bandwidth in order to implement super-high-speed data transmission compared to conventional LTE, may apply orthogonal frequency-division multiplexing (OFDM) through radio-access technology, and may further apply beamforming technology. Further, an adaptive modulation and coding (AMC) scheme of determining a modulation scheme and a channel-coding rate is applied depending on the channel status of the UE. The NR CN 3c-05 performs a function of supporting mobility, configuring a bearer, and configuring a QoS. The NR CN is a device for performing a function of managing the mobility of the UE and various control functions, and is connected to a plurality of eNBs. Further, the next-generation mobile communication system may be linked to the conventional LTE system, and the NR CN 3c-05 may be connected to an MIME 3c-25 through a network interface. The MME 3c-25 is connected to the eNB 3c-30, which is a conventional base station.

Figure 3D:
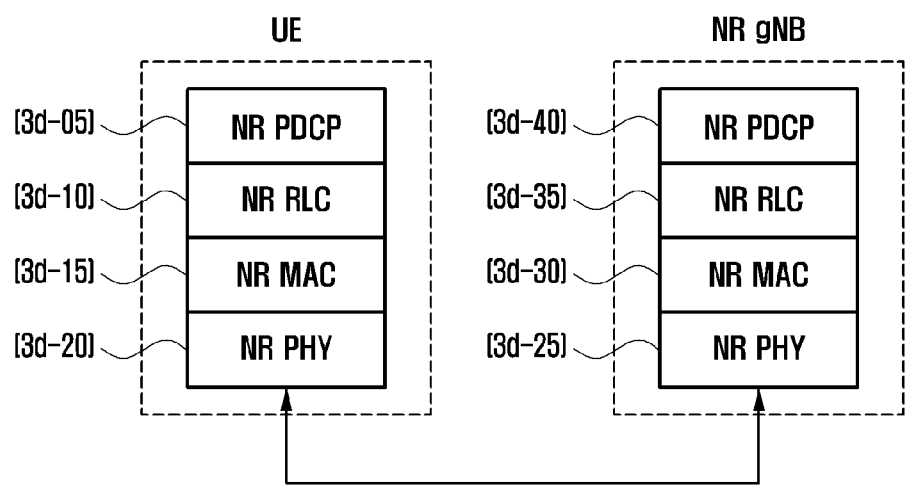
FIG. 3D illustrates a wireless protocol structure of the next-generation mobile communication system according to an embodiment of the disclosure.

FIG. 3D illustrates a wireless protocol structure of the next-generation mobile communication system according to an embodiment of the disclosure.

Referring to FIG. 3D, the wireless protocol of the next-generation mobile communication system includes NR PDCPs 3d-05 and 3d-40, NR RLCs 3d-10 and 3d-35, and NR MACs 3d-15 and 3d-30 in the UE and the NR gNB. The main functions of the NR PDCPs 3d-05 and 3d-40 may include some of the following functions.

Header compression and decompression function (Header compression and decompression: ROHC only)

User data transmission function (Transfer of user data)

Sequential delivery function (In-sequence delivery of upper layer PDUs)

Non-sequential delivery function (Out-of-sequence delivery of upper layer PDUs)

Reordering function (PDCP PDU reordering for reception)

Duplicate detection function (Duplicate detection of lower layer SDUs)

Retransmission function (Retransmission of PDCP SDUs)

Ciphering and deciphering function (Ciphering and deciphering)

Timer-based SDU removal function (Timer-based SDU discard in uplink)

The reordering function of the NR PDCP device is a function of sequentially reordering PDCP PDUs received by a lower layer on the basis of a PDCP Sequence Number (SN), and may include a function of sequentially transferring the reordered data to a higher layer, a function of directly transmitting the reordered data regardless of the order, a function of recording PDCP PDUs lost due to the reordering, a function of reporting statuses of the lost PDCP PDUs to a transmitting side, and a function of making a request for retransmitting the lost PDCP PDUs.

The main functions of the NR RLC 3d-10 or 3d-35 may include some of the following functions.

Data transmission function (Transfer of upper layer PDUs)

Sequential delivery function (In-sequence delivery of upper layer PDUs)

Non-sequential delivery function (Out-of-sequence delivery of upper layer PDUs)

ARQ function (Error correction through ARQ)

Concatenation, segmentation, and reassembly function (Concatenation, segmentation and reassembly of RLC SDUs)

Re-segmentation function (Re-segmentation of RLC data PDUs)

Reordering function (Reordering of RLC data PDUs)

Duplicate detection function (Duplicate detection)

Error detection function (Protocol error detection)

RLC SDU deletion function (RLC SDU discard)

RLC re-establishment function (RLC re-establishment)

The sequential delivery function (In-sequence delivery) of the NR RLC device is a function of sequentially transferring PDCP PDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC Sequence Number (SN) or a PDCP SN, a function of recording PDCP PDUs lost due to the reordering, a function of reporting statuses of the lost PDCP PDUs to a transmitting side, a function of making a request for retransmitting the lost PDCP PDUs, if there is a lost RLC SDU, a function of sequentially transferring only RLC SDUs preceding the lost RLC SDU to the higher layer, if a predetermined timer expires even though there is a lost RLC SDU, a function of sequentially transferring all RLC SDUs received before the timer starts to the higher layer, or if a predetermined timer expires even though there is a lost RLC SDU, a function of sequentially transferring all RLC SDUs received up to that point in time to the higher layer. Further, the NR RLC device may process the RLC PDUs sequentially in the reception order thereof (i.e. according to an arrival order, regardless of a serial number or a sequence number) and may transfer the RLC PDUs to the PDCP device regardless of the sequence thereof (out-of-sequence delivery). In the case of segments, the NR RLC device may receive segments that are stored in the buffer or will be received in the future, reconfigure the segments to be one RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 3d-15 and 3d-30 may be connected to a plurality of NR RLC layer devices configured in one UE or base station, and the main functions of the NR MACs may include some of the following functions.

Mapping function (Mapping between logical channels and transport channels)

Multiplexing and demultiplexing function (Multiplexing/demultiplexing of MAC SDUs)

Scheduling information report function (Scheduling information reporting)

HARQ function (Error correction through HARQ)

Logical channel priority control function (Priority handling between logical channels of one UE)

UE priority control function (Priority handling between UEs by means of dynamic scheduling)

MBMS service identification function (MBMS service identification)

Transport format selection function (Transport format selection)

Padding function (Padding)

The PHY layers 3d-20 and 3d-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 3E:
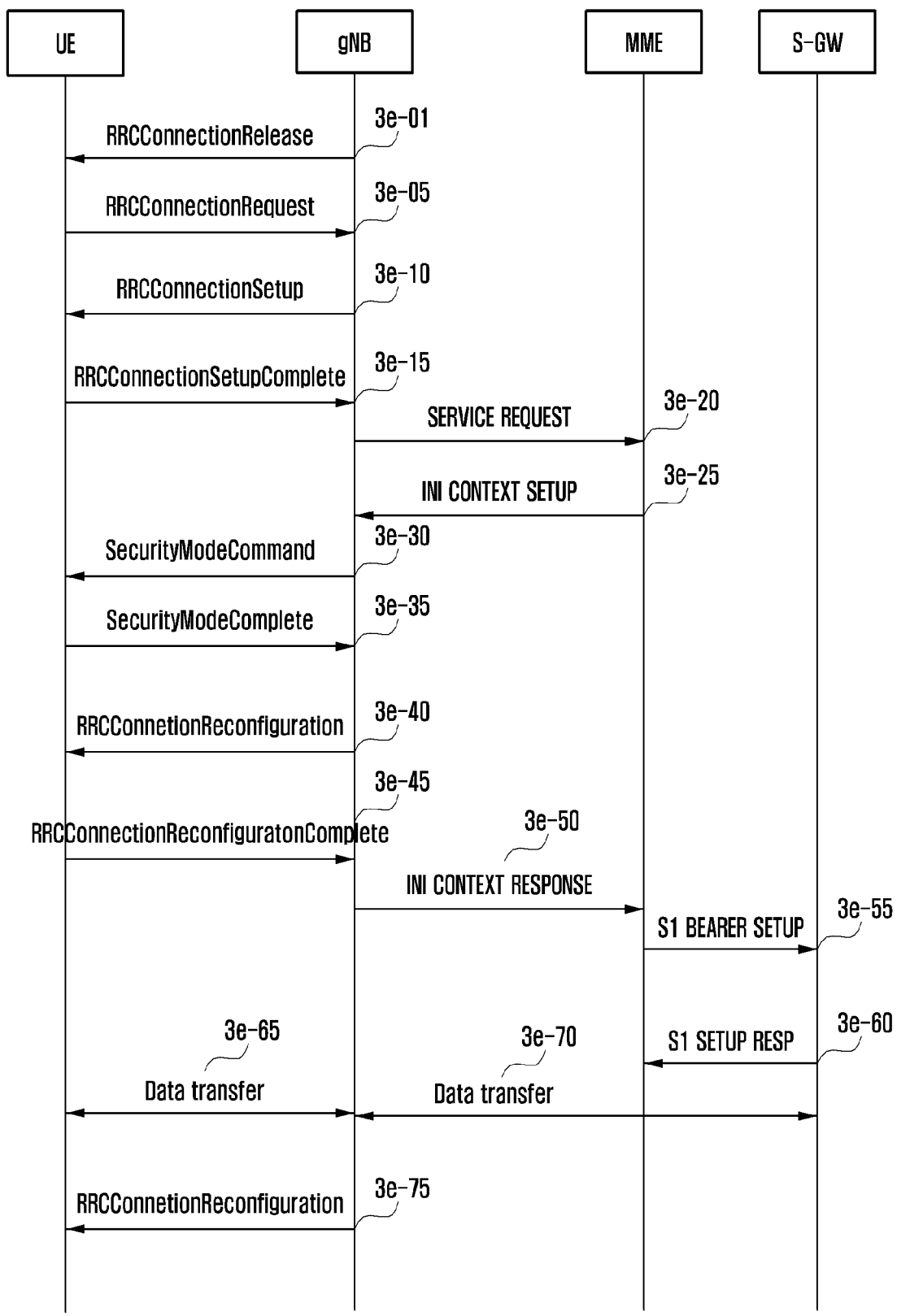
FIG. 3E illustrates a procedure in which the UE switches from an RRC-idle mode to an RRC-connected mode and configures a connection to a network according to the disclosure.

FIG. 3E illustrates a procedure in which the UE switches from an RRC-idle mode to an RRC-connected mode and configures a connection to a network according to the disclosure.

In FIG. 3E, if the UE transmitting and receiving data in the RRC-connected mode performs no data transmission/reception for a predetermined reason or for a predetermined time, the gNB may transmit an RRCConnectionRelease message to the UE, and the UE may switch to the RRC-idle mode in step 3e-01. If the UE of which the connection is not currently configured (hereinafter, referred to as an idle-mode UE) has data to be transmitted, the UE performs an RRC connection establishment process with the gNB. The UE establishes backward transmission synchronization with the gNB through a random-access process and transmits an RRCConnectionRequest message to the gNB in step 3e-05. The message includes a reason (establishmentCause) for establishing the connection with an identifier of the UE. The gNB transmits an RRCConnectionSetup message to allow the UE to establish the RRC connection in step 3e-10. The message may include the length of an RLC sequence number to be used when an RLC AM or a UM is used for each service/bearer/RLC device or each logical channel, the length of an SO field applied when a segmentation operation is performed, a timer value when a receiving side uses a reassembly timer in the RLC UM, an indicator indicating whether to use an RLC sequence number for a complete RLC MU, information for configuring a VT(S) parameter to be used by a transmitting side in the RLC UM, information on an initial value, and information on whether to perform a segment information (SI)-based segmentation operation. Further, the message includes RRC connection setup information.

The RRC connection is also referred to as a Signaling Radio Bearer (SRB), and is used for transmitting and receiving an RRC message, which is a control message between the UE and the gNB. The UE establishing the RRC connection transmits an RRCConnectionSetupComplete message to the gNB in step 3e-15. The message may include a control message corresponding to a service request by which the UE makes a request for establishing a bearer for a predetermined service to the MME. The gNB transmits the SERVICE REQUEST message included in the RRCConnectionSetupComplete message to the MME in step 3e-20, and the MIME determines whether to provide the service requested by the UE. If it is determined to provide the service requested by the UE on the basis of the determination result, the MME transmits an INITIAL CONTEXT SETUP REQUEST message to the gNB in step 3e-25. The message includes Quality of Service (QoS) information to be applied to Data Radio Bearer (DRB) configuration and security-related information to be applied to the DRB (for example, a security key and a security algorithm).

The gNB exchanges a SecurityModeCommand message in step 3e-30 and exchanges a SecurityModeComplete message in step 3e-35 in order to set security with the UE, if security has been completely set, the gNB transmits an RRCConnectionReconfiguration message to the UE in step 3e-40. The message may include the length of an RLC sequence number to be used when an RLC AM or a UM is used for each service/bearer/RLC device or each logical channel, the length of an SO field applied when a segmentation operation is performed, a timer value when a receiving side uses a reassembly timer in the RLC UM, an indicator indicating whether to use an RLC sequence number for a complete RLC PDU, information for configuring a VT(S) parameter to be used by a transmitting side in the RLC UM, information on an initial value, and information on whether to perform a segment information (SI)-based segmentation operation. The message includes configuration information of the DRB for processing user data, and the UE configures the DRB by applying the information and transmits an RRCConnectionReconfigurationComplete message to the gNB in step 3e-45.

The gNB, having finished establishing the DRB with the UE, transmits an initial context setup complete message to the MME in step 3e-50, and the MME, receiving the initial context setup complete message, exchanges an S1 BEARER SETUP message and an S1 BEARER SETUP RESPONSE message in order to establish an S1 bearer with the S-GW in steps 3e-055 and 3e-60. The S1 bearer is a connection for data transmission established between the S-GW and the gNB, and corresponds one-to-one to the DRB. When the process is completed, the UE transmits and receives data to and from the gNB through the S-GW in steps 3e-65 and 3e-70. As described above, the general data transmission process broadly consists of three steps, namely RRC connection setup, security setup, and DRB setup. Further, the gNB may transmit an RRCConnectionReconfiguration message in order to provide a new configuration to the UE or add or change the configuration for a predetermined reason in step 3e-75. The message may include the length of the RLC sequence number to be used when an RLC AM or a UM is used for each service/bearer/RLC device or each logical channel, the length of an SO field applied when a segmentation operation is performed, a timer value when a receiving side uses a reassembly timer in the RLC UM, an indicator indicating whether to use an RLC sequence number for a complete RLC PDU, information for configuring a VT(S) parameter to be used by a transmitting side in the RLC UM, information on an initial value, and information on whether to perform a segment information (SI)-based segmentation operation.

Figure 3F:
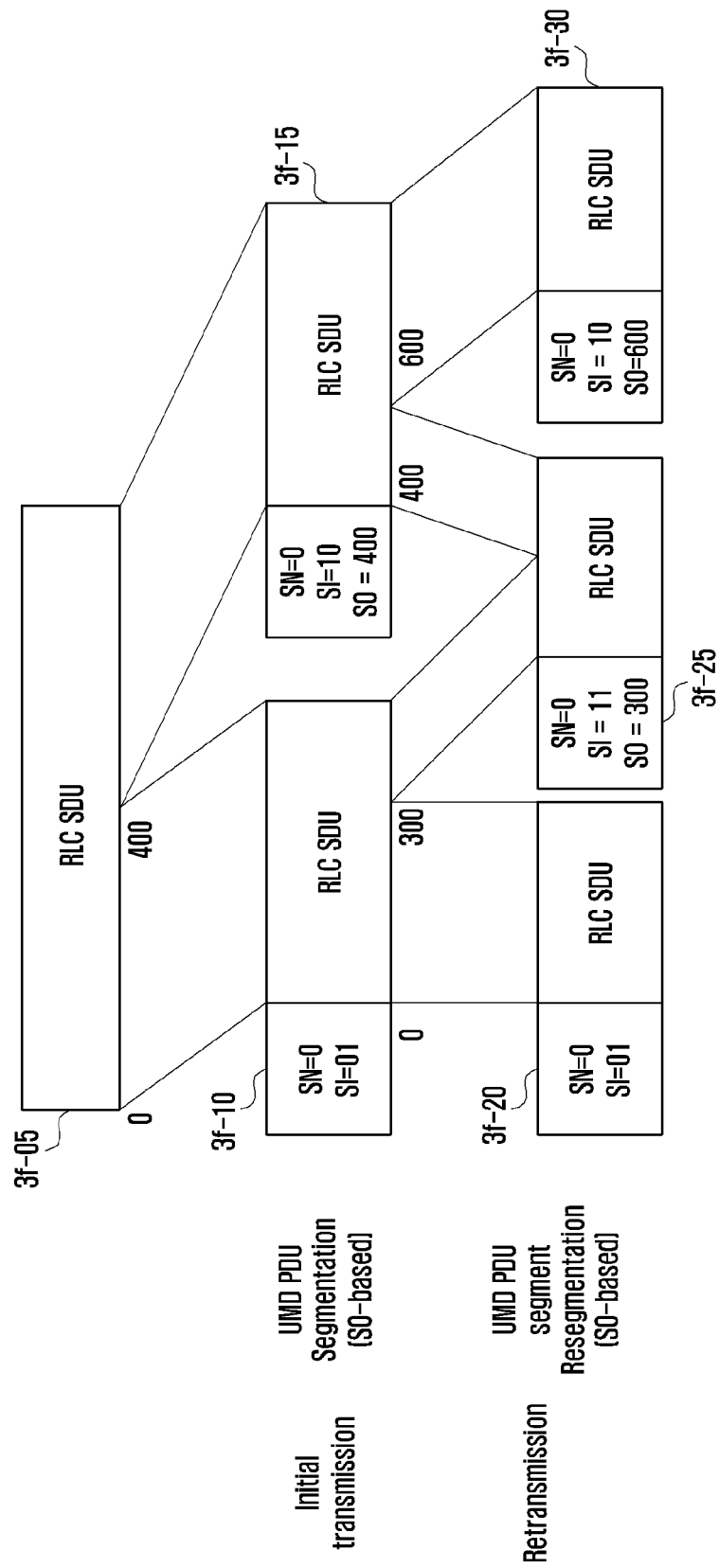
FIG. 3F illustrates a segment offset (SO)-based segmentation operation proposed in an RLC layer RLC acknowledged mode (AM) according to an embodiment of the disclosure.

FIG. 3F illustrates an SO-based segmentation operation proposed in an RLC layer RLC AM according to an embodiment of the disclosure.

In the disclosure, a procedure and a method for performing a segment offset (SO)-based segmentation operation may be applied to a packet received by an RLC layer from a higher layer. In the proposed method, an integrated segmentation operation, in which segmentation is not separately performed for initial transmission and retransmission, may be performed. Further, the RLC layer does not perform concatenation. The proposed method may identify whether an RLC SDU, which is a data part after an RLC header, is a complete RLC SDU, which is not segmented, a segmented first RLC SDU segment, a segmented intermediate RLC SDU segment, or a segmented last RLC DDU segment through the introduction of an SI field in the RLC header. Further, there may be no length field indicating a length in the RLC header.

In FIG. 3F, the RLC layer receives the PDCP PDU 3f-05 (RLC SDU) from the PDCP layer, which is a higher layer. The RLC SDU may be processed to have the size indicated by the MAC layer, and when the RLC SDU is segmented, may configure the RLC PDU including header segmentation information. The RLC PDU includes an RLC header and an RLC payload (RLC SDU). The RLC header may include the character of the RLC PDU (data or control information) and segmentation information, and also a D/C field, a P field, an SI field, an SN field, and an SO field. In the RLC UM that does not support ARQ, there is no P field, and the P field may be replaced with a reserved field.

The data/control (D/C) field is one bit and is used to indicate whether the configured RLC PDU is a control PDU or a data PDU.

| Value | Description |
| --- | --- |
| 0 | Control PDU |
| 1 | Data PDU |

The sequence number (SN) field indicates the sequence of the RLC PDU, and may have a predetermined length. For example, the SN field may have a length of 12 bits or 18 bits.

The segment offset (SO) field may have a size of 2 bytes, may indicate the location of the original RLC SDU at which the RLC SDU segment is segmented, and is used to indicate the first byte of the segmented segment.

When a condition for triggering polling is generated on the transmitting side, the P field may be configured as 1 to make the receiving side provide an RLC status report. That is, ACK/NACK information of the RLC PDUs that have been received up to that time may be transmitted to the transmitting side.

If the RLC layer receives the RLC SUD 3f-05, the RLC layer may directly insert the RLC SN into the RLC SDU, generate the RLC header, and make the RLC PDU. If the segmentation operation is needed for a predetermined reason, the SI field may be updated and the SO field may be added to the RLC header to configure the RLC PDU, as indicated by reference numeral 3f-10 or 3f-15. That is, the SO field may or may not be added to the segment segmented according to a predetermined condition after the segmentation operation. The predetermined condition is determined according to the SI field described below. The predetermined reason of the segmentation operation may be the case in which a currently generated MAC subheader and MAC SDU are larger than transmission resources allocated by the MAC layer, and thus a request for the segmentation operation for a specific MAC SDU (RLC PDU) is made to the RLC layer.

The sequence number (SN) field is a sequence number of the RLC PDU, or a PDCP SN may be reused as necessary or based on a configuration. The segment offset (SO) field is a field having a predetermined length and may indicate to which byte of the original RLC PDU data field (RLC SDU) the first byte of the segmented RLC PDU data field (RLC SDU) in initial transmission corresponds, and also indicate to which byte of the original RLC PDU data field (RLC SDU) the first byte of the re-segmented RLC PDU data field in retransmission corresponds. The length of the SO field may be fixed (for example, 2 bytes), or may be configured through an RRC message (for example, the RRCConnectionSetup message or the RRCConnectionReconfiguration message of step 3e-10, 3e-40, or 3e-75). The segmentation information (SI) field may be defined as follows, or may be referred to by another name.

| Value | Description |
|---|---|
| 00 | A complete RLC PDU |
| 01 | First segment of a RLC PDU |
| 10 | Last segment of a RLC PDU |
| 11 | Middle segment of a RLC PDU |

An SI field corresponding to 00 indicates a complete RLC PDU that has not been segmented, in which case the SO field is not needed in the RLC header. An SI field corresponding to 01 indicates the first RLC PDU segment that was segmented, in which case the SO field is not needed in the RLC header. Because the SO field always indicates 0 in the first segment. An SI field corresponding to 10 indicates the last RLC PDU segment that was segmented, in which case the SO field is needed in the RLC header. An SI field corresponding to 11 indicates the intermediate RLC PDU segment that was segmented, in which case the SO field is needed in the RLC header. The mapping relationship between the 2 bits and the four pieces of information (complete RLC PDU, first segment, last segment, and intermediate segment) has a total of 4×3×2×1=24 cases, and the above description corresponds to one example thereof. The disclosure includes all cases of 24 mappings. If transmission of the RLC PDUs 3f-10 and 3f-15 fails, retransmission may be performed. At this time, if transmission resources are insufficient, the RLC PDUs may be re-segmented as indicated by reference numerals 3f-20, 3f-25, and 3f-30. When the RLC PDUs are re-segmented, SI fields and SO fields of the newly generated RLC PDUs 3f-20, 3f-25, and 3f-30 may be updated. Since the case of reference numeral 3f-20 corresponds to the first segment, the SI field is updated to 01 and the SO field is not needed.

Since the case of reference numeral 3f-25 corresponds to the intermediate segment, the SI field is updated to 11 and the SO field is updated to 300 to indicate to which byte of the original RLC PDU data field (RLC SDU) the first byte of the RLC PDU data field (RLC SDU) corresponds. Since the case of reference numeral 3f-30 corresponds to the last segment, the SI field is updated to 10 and the SO field is updated to 600 to indicate to which byte of the original RLC PDU data field (RLC SDU) the first byte of the RLC PDU data field (RLC SDU) corresponds.

Figure 3G:
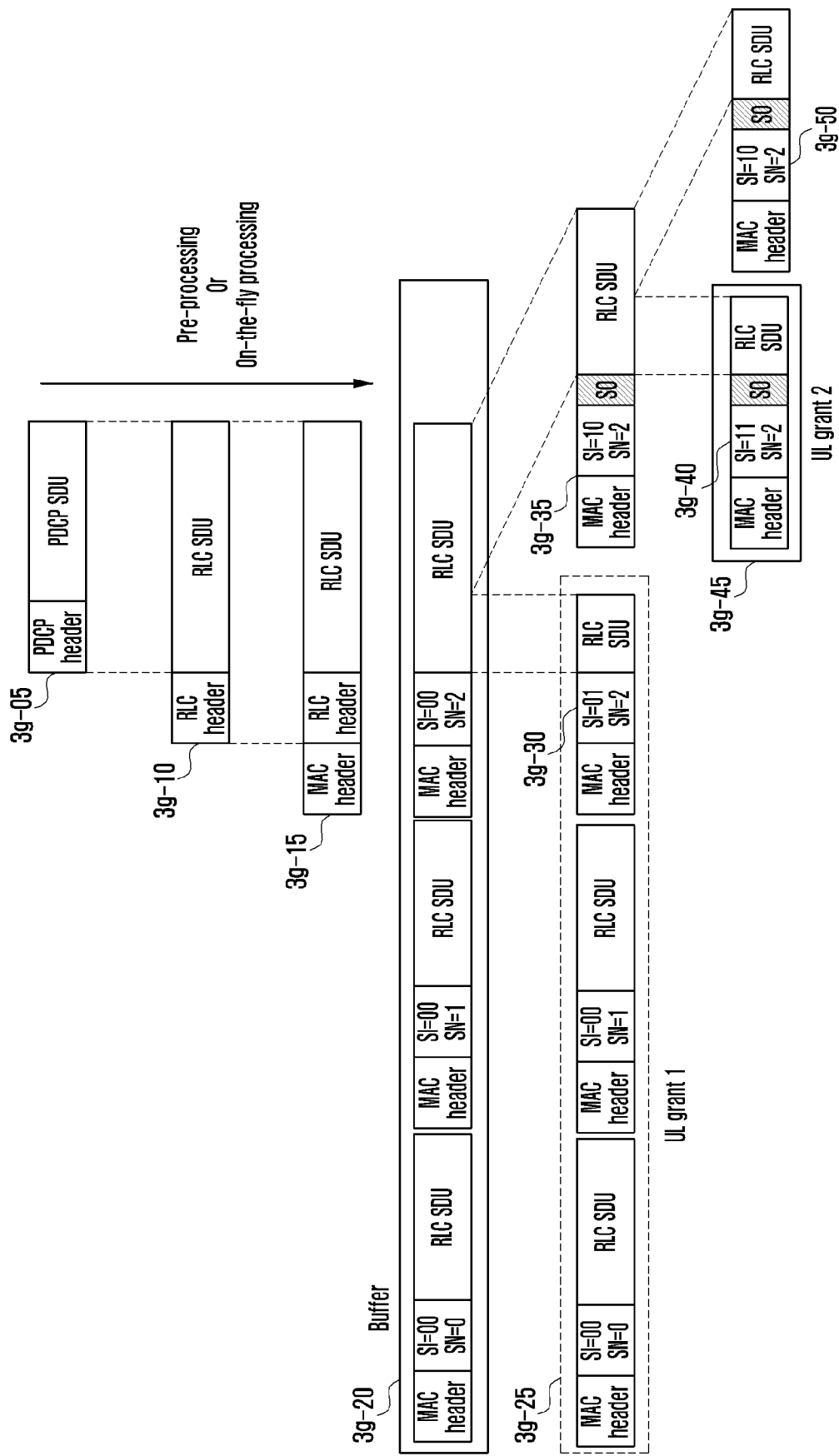
FIG. 3G illustrates a data-processing operation to which an SQ-based segmentation method is applied in an RLC AM according to an embodiment of the disclosure.

FIG. 3G illustrates a data-processing operation applying an SO-based segmentation method in an RLC AM according to an embodiment of the disclosure.

In FIG. 3G, if an internet protocol (IP) packet arrives at the PDCP layer, a PDCP header is added, and a PDCP PDU 3g-05 (or RLC SDU) may be transmitted to the RLC layer. The RLC layer may first generate an RLC header, allocate an RLC sequence number, configure the RLC header to complete an RLC PDU 3g-10, and then transmit the RLC PDU to the MAC layer. The MAC layer may calculate the size of the MAC SDU (or the RLC PDU) to configure an L field, configure a logical channel identifier corresponding thereto, configure a MAC subheader 3g-15, and store the MAC subheader in a buffer 3g-20. Accordingly, as described above, data packets received by the PDCP layer may be stored in the buffer through pre-processing of the data before transmission resources (UL grant) are received from the base station, or data processing (on-the-fly processing) may be performed right after transmission resources are received.

If uplink transmission resources 3g-25 (UL grant 1) are received from the base station but a segmentation operation is needed because uplink transmission resources are insufficient, the UE or the MAC layer of the UE may perform the segmentation operation as indicated by reference numeral 3g-30, configure the SI field in the RLC header of each segment to be suitable for the segment, and then newly configure the RLC header of the segment, as indicated by reference numerals 3g-30 and 3g-35. As illustrated in FIG. 3F, the intermediate segment or the last segment, which is not the first segment, should have the SO field added thereto and indicate an offset thereof, so that the SO field may be added to the RLC header, as indicated by reference numeral 3g-35. The UE or the MAC layer of the UE may transmit the MAC PDU configured to be suitable for uplink transmission resources. If second uplink transmission resources 3g-45 (UL grant 2) are received but a segmentation operation is needed again because uplink transmission resources are insufficient as indicated by reference numerals 3g-40 and 3g-50, the SI field is updated and the SO field is updated or added to be suitable for newly segmented segments, and each RLC header is configured. The UE or the MAC layer of the UE configures and transmits the MAC PDU to be suitable for uplink transmission resources (UL grant 2).

Even though the segmentation operation is performed, the segmented segments have the same RLC sequence numbers as the original RLC PDU in the SO-based segmentation method. Accordingly, segments 3g-30, 3g-35, 3g-40, and 3g-50 segmented from one RLC PDU have the same RLC sequence numbers as the original RLC PDU.

The RLC layer may operate in an RLC acknowledged mode, an RLC unacknowledged mode, and an RLC transparent mode. In the RLC AM, the RLC layer may support an ARQ function, and the transmitting side may receive an RLC status report from the receiving side and retransmit lost RLC PDUs (for which HACK is received) through the status report. When retransmission is performed, a re-segmentation operation may be performed if uplink transmission resources are insufficient. Accordingly, the RLC AM guarantees reliable error-free data transmission and is suitable for a service that requires high reliability. In order to efficiently support the ARQ function, accurate information on the lost RLC PDUs is needed. Accordingly, the SO field may be very useful. That is, the SO field may indicate more detailed information, such as which RLC PDU is lost and which part of the RLC PDU is lost, through the RLC status report. If the transmitting side receives detailed information on the lost RLC PDU through the SO field, retransmission may be performed through the SO-based segmentation operation according to the detailed information.

On the other hand, the RLC UM does not support the ARQ function. Accordingly, the RLC status report is not provided and there is no retransmission function. In the RLC UM, the RLC layer of the transmitting side serves to configure the RLC header for PDCP PDUs (RLC SDUs) received from a higher layer and transmit the RLC header to a higher layer when uplink transmission resources are received or beforehand. Accordingly, it is possible to perform continuous data transmission without a transmission delay, and the RLC UM may thus be useful for sensitive services. Accordingly, in the RLC UM, the ARQ function is not performed and the RLC status report is not provided as described above, and thus detailed information, such as the SO field of the SO-based segmentation method applied to the RLC AM, is not needed.

Therefore, embodiments of the disclosure propose an SI-based segmentation method suitable for the RLC UM. Further, the embodiments propose a header structure of the RLC UM suitable for the SI-based segmentation operation and efficient operation of the transmitting side and the receiving side.

Figure 3H:
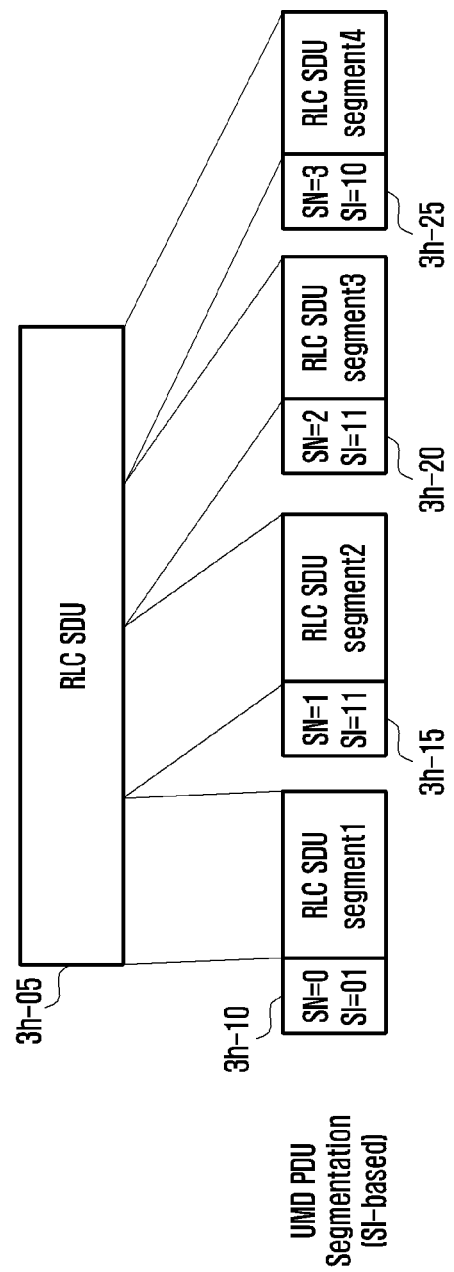
FIG. 3H illustrates a segment information (SI) field-based segmentation method proposed for an RLC UM according to an embodiment of the disclosure.

FIG. 3H illustrates an SI-field-based segmentation method proposed for an RLC UM according to an embodiment of the disclosure.

The proposed SI-field-based segmentation method shown in FIG. 3H does not need the SO field, unlike the proposed SO-field-based and SI-field-based segmentation methods shown in FIG. 3F. That is, the SI-field-based segmentation method has an advantage of very small overhead. That is, since the SO field, corresponding to 2 bytes, is not needed, overhead may be reduced and waste of transmission resources may also be reduced.

There are two differences between the segmentation method shown in FIG. 3F and the SI-field-based segmentation method shown in FIG. 3H.

1. RLC sequence number allocation: in FIG. 3F, even though a plurality of segments is segmented from one RLC PDU through the segmentation operation, the segmented segments have the same RLC sequence number. That is, although one RLC PDU is segmented into four segments, namely segment 1, segment 2, segment 3, and segment 4, through the segmentation operation, the four segments have the same RLC sequence number and may be distinguished by an offset of each segment through the SO field. On the other hand, in the SI-field-based segmentation method shown in FIG. 3H, if one RLC PDU 3h-05 is segmented into four segments, namely 3h-10, 3h-15, 3h-20, and 3h-25, different RLC sequence numbers are allocated to respective segments. That is, RLC sequence numbers 0, 1, 2, and 3 are allocated to the segments, and the segments are identified as a first segment, an intermediate segment, or a last segment through the SI field. Accordingly, the sequence of the segments may be identified using the SI field. If the number of segments is three or more, a plurality of intermediate segments (segments having the same SI field) may be distinguished by the sequence of the RLC sequence number. Accordingly, the receiving side may perform reassembly only through a combination of the RLC sequence number and the SI field (without the SO field).

2. Non-use of the SO field: in FIG. 3F, the same RLC sequence number is allocated to respective segments, and thus the segments are distinguished by the SO field. However, in FIG. 3H, different RLC sequence numbers are allocated to respective segments and the SI field is configured, so that the SO field is not needed.

The segmentation information (SI) field may be defined as follows, or may be referred to by another name.

| Value | Description |
|-------|-------------|
| 00 | A complete RLC PDU |
| 01 | First segment of a RLC PDU |
| 10 | Last segment of a RLC PDU |
| 11 | Middle segment of a RLC PDU |

An SI field corresponding to 00 indicates a complete RLC PDU which is not segmented, an SI field corresponding to 01 indicates a segmented first RLC PDU segment, an SI field corresponding to 10 indicates a segmented last RLC PDU segment, and an SI field corresponding to 11 indicates a segmented intermediate RLC PDU segment. The mapping relationship between the 2 bits and the four pieces of information (complete RLC PDU, first segment, last segment, and intermediate segment) has a total of 4×3×2×1=24 cases, and the above description corresponds to one example thereof. The disclosure includes all cases of 24 mappings.

Figure 3I:
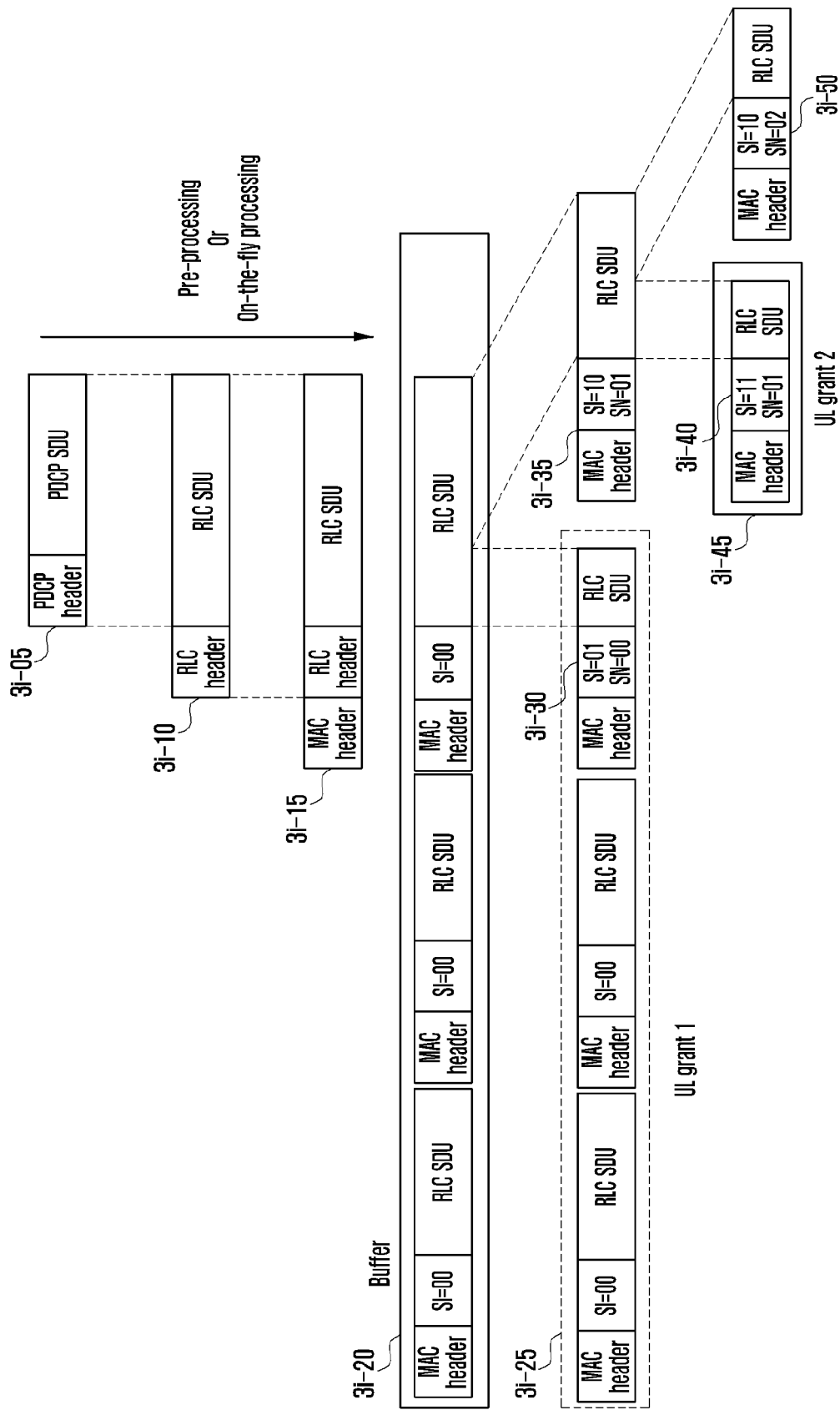
FIG. 3I illustrates a data-processing operation to which an SI-based segmentation method of the RLC UM is applied according to an embodiment of the disclosure.

FIG. 3I illustrates a data-processing operation applying an SI-based segmentation method of the RLC UM according to an embodiment of the disclosure.

In FIG. 3I, if the IP packet arrives at the PDCP layer, the PDCP layer adds a PDCP header and transmits a PDCP PDU 3i-05 (or RLC SDI) to the RLC layer. A characteristic of the RLC UM proposed by the disclosure is not to allocate an RLC sequence number of an RLC PDU for which the segmentation operation is not performed. Accordingly, the RLC layer may not first allocate the RLC sequence number but may configure the RLC header to complete an RLC PDU 3i-10 and then transmit the RLC PDU to the MAC layer. The MAC layer may calculate the size of the MAC SDU (or the RLC PDU) to configure an L field, configure a logical channel identifier corresponding thereto, configure a MAC subheader 3i-15, and store the MAC subheader in a buffer 3i-20. Accordingly, as described above, data packets received by the PDCP layer may be stored in the buffer through pre-processing of the data before transmission resources (UL grant) are received from the base station, or data processing (on-the-fly processing) may be performed right after transmission resources are received.

If uplink transmission resources 3i-25 (UL grant) are received from the base station but the segmentation operation must be performed since the uplink transmission resources are insufficient, the RLC header may be newly configured by allocating different RLC sequence numbers to respective segments in the RLC header and configuring the SI field according to whether the original RLC PDU is a first segment, an intermediate segment, or a last segment, as indicated by reference numerals 3i-30 and 3i-35. The UE or the MAC layer of the UE may transmit the MAC PDU configured to be suitable for uplink transmission resources. If second uplink transmission resources 3i-45 (UL grant 2) are received but the segmentation operation is needed again since the transmission resources are insufficient, the same RLC sequence number as that of the original segment is applied to a first segment re-segmented from the segment and the SI field is updated according to whether the original RLC PDU is a first segment, an intermediate segment, or a last segment, as indicated by reference numeral 3i-40 and 3i-50. As indicated by reference numeral 3i-50, the RLC header may be newly configured by allocating a new RLC sequence number to a newly segmented segment and configuring the SI field of the segment generated through the segmentation operation according to whether the original RLC is a first segment, an intermediate segment, or a last segment.

Accordingly, as described above, it is noted that the transmission/reception operation in the RLC UM proposed by the embodiment of FIG. 3H according to the disclosure works well in the data pre-processing procedure.

Figure 3J:
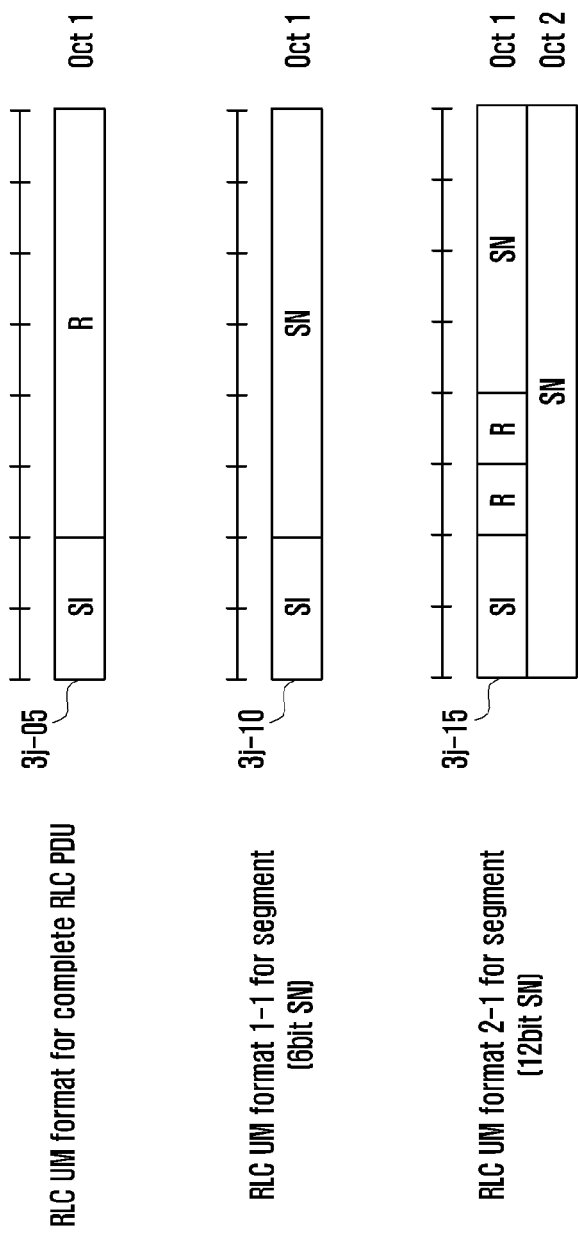
FIG. 3J illustrates an RLC header structure that can be applied in the RLC UM according to an embodiment of the disclosure.

FIG. 3J illustrates an RLC header structure that can be applied in the RLC UM according to an embodiment of the disclosure.

FIG. 3J illustrates the RLC header structure when a sequence number having the length of 6 bits or 12 bits used in the SI-field-based segmentation operation illustrated in FIG. 3H if the RLC UM (that does not support ARQ) is used in the embodiment of the disclosure.

The RLC header structure may include some of the fields illustrated in FIG. 3H or a new field, and may have different structures according to a length of each field, such as different RLC sequence number lengths and the location of each field. R is a reserved bit, and the RLC header structure has no RF field and no E field. The SI field serves to indicate the complete RLC PDU for which the segmentation operation is not performed, and the first segment, the intermediate segment, and the last segment for which the segmentation operation is performed, as illustrated in FIG. 3H.

In the RLC UM proposed by the embodiment of the disclosure, the RLC sequence number is not used for the complete RLC PDU (RLC PDU for which the segmentation operation is not performed) and is not necessary. Actually, there are various reasons for the RLC sequence number. That is, the RLC sequence number is needed for reordering, redundancy check, lost packet detection, ARQ function support, and segmented segment reassembly. However, in the next-generation mobile communication system, the RLC layer does not need to perform reordering, and the PDCP layer may perform redundancy check on behalf of the RLC layer, and lost packet detection and the ARQ function are not supported by the RLC UM. Accordingly, the RLC sequence number is needed only for the segmented RLC PDU segment Therefore, the complete RLC PDU does not need the RLC sequence number.

In the RLC UM of the disclosure, the complete RLC PDU does not use the RLC sequence number and proposes to use a header format 3*j*-05 (if the MAC layer indicates whether there is an RLC SN or an RLC header through a one-bit indicator in the MAC subheader, the header format 3*j*-05 is not used for the complete RLC PDU, and may be omitted. In this case, the receiving side may identify the identifier of the MAC subheader, and if there no RLC header, may recognize the same as the complete RLC PDU). That is, the transmitting side may indicate the SI field of the header 3*j*-05 as 00 and thus indicate that the RLC PDU for which the segmentation operation is not performed is a complete RLC PDU and that there is no RLC sequence number, and the receiving side may identify the SI field of the header, and if the SI field corresponds to 00, recognizes that there is no RLC sequence number. Accordingly, the header structure is not relevant to the length of the RLC sequence number. The one-byte header 3*j*-05 may be used for the complete RLC PDU.

The RLC sequence number may be allocated to the first RLC PDU segment for which the segmentation operation is performed, and a format 3*j*-10 (if the RLC sequence number of 6 bits is used) or format 3*j*-15 (if the RLC sequence number of 12 bits is used) may be used for the RLC header. However, new successive RLC sequence numbers, rather than the same RLC sequence number, may be allocated to the intermediate segment and the last segment generated by the segmentation operation, the S1 field may be configured to be suitable for each segment, and the RLC header format 3*j*-10 (if the RLC sequence number of 6 bits is used) or the RLC header format 3*j*-15 (if the RLC sequence number of 12 bits is used) may be used. As described above, RLC sequence numbers are required for the segments for which the segmentation operation is performed. Because the sequences of the segments can be identified through the RLC sequence numbers, the receiving side may reassemble the segments on the basis of the RLC sequence numbers, generate a complete RLC PDU, process data, and transmit the RLC SDU to a higher layer. Accordingly, the receiving side may reassemble the segmented segments to generate the complete RLC PDU on the basis of the RLC sequence number and the SI field.

Whether to use the RLC sequence number of the complete RLC PDU may be configured for each bearer or each logical channel through the RRC message of step 3*e*-10, 3*e*-40, or 3*e*-75, as illustrated in FIG. 3E.

In the embodiment of the disclosure, the transmitting-side operation for applying the SI-based segmentation method without using the sequence number in the RLC UM is described below.

If it is configured to not use the RLC sequence number, the transmitting side RLC layer device may add an RLC header of 1 byte, having no RLC sequence number, to the RLC SDU for which the segmentation operation is not performed (when the RLC header is configured, the SI field is configured as 00 and the operation for configuring the RLC header is performed) as indicated by reference numeral 3*j*-05 and transmit the RLC SDU to a lower layer. However, if the segmentation operation is performed for the RLC SDU even though it configured not to use the RLC sequence number in order to reduce overhead, the RLC sequence number is added and the SI field should be configured as illustrated in FIG. 3H. The reason to configure the RLC header by allocating new successive RLC sequence numbers to respective segments and configuring the SI field for the segmented RLC SDUs is to allow the receiving side to receive the segmented RLC SDU segments, reassemble the segments, and reconstruct the complete RLC SDU. Accordingly, if the segmentation operation is performed even though configuration has been set to avoid using the RLC sequence number in the RLC UM, the RLC header 3*j*-10 or 3*j*-15 should be applied.

That is, different headers may be configured according to whether the segmentation operation is performed for the RLC SDU. The transmitting side adds the 1-byte RLC header 3*j*-05, having no RLC sequence number, to the RLC SDU for which the segmentation operation is not performed and transmits the RLC SDU to the lower layer, but, for the RLC SDU for which the segmentation operation is performed, updates the SI field corresponding to the type of the segmented segment: (first, intermediate, or last segment), sequentially adds successive different RLC sequence numbers to the respective segments, configures the RLC header, and transmits the RLC SDU to the lower layer.

According to an embodiment of the disclosure, a receiving-side operation for applying the SI-based segmentation method without using the sequence number in the RLC UM is described below.

The receiving-side RLC layer device receives an RLC PDU, identifies an SI field in an RLC header, and identify whether the received RLC PDU is an RLC PDU for which the segmentation operation is not performed (complete RLC PDU) or an RLC PDU for which the segmentation operation is performed (segment). If the RLC PDU is an RLC SDU for which the segmentation operation is not performed, the RLC header may be removed and the RLC SDU may be transmitted to a higher layer. If the RLC PDU is an RLC SDU for which the segmentation operation is performed, the receiving side identifies the SI field to check whether the segment is a first segment, an intermediate segment, or a last segment, and stores and organizes the segments according to the RLC sequence number in consideration of the RLC sequence number. If a reassembly function is triggered by a window or a timer, the receiving side reassembles the segments to generate a complete RLC SDU and transmits the RLC SDU to a higher layer. If the segments cannot be reassembled, the segments are discarded (or if the timer expires, packets left in the buffer may be immediately discarded).

The operation of the receiving side in the RLC UM may be performed on the basis of a window or a timer.

According to an embodiment of the disclosure, the transmitting-side and receiving-side RLC layer device operation corresponding to Embodiment 3-1 is described below. In Embodiment 3-1, the transmitting side has no window and the receiving side operates on the basis of the window.

The transmitting-side RLC UM device may manage a parameter of VT(S) (may be reused for another parameter or referred to by another name). The parameter VT(S) is an RLC sequence number value assigned to each segment undergoing the segmentation operation, and segments segmented from one RLC PDU have different RLC sequence numbers, that is, different VT(S). The receiving side may configure a timer configured by the base station and a timer value. The VT(S) may be initially configured as 0.

If the transmitting side has data in the RLC UM, the transmitting side may configure an RLC UM PDU and also a MAC SDU and a MAC subheader. Thereafter, upon identifying transmission resources or receiving transmission resources, the transmitting side determines whether to segment and transmit RLC UM PDUs according to the size of the transmission resources. In the case of the complete RLC PDU for which the segmentation transmission is not performed, the transmitting side configures a 1-byte RLC header having no RLC sequence number 1g-05 and maintains the VT(S). That is, no RLC sequence number is allocated. If it is determined to perform segmentation transmission for any RLC PDU, the header including the RLC sequence number (the header 3j-05) is configured. When the segmentation transmission is performed, a new RLC sequence number (new VT(S)) is allocated to each segment, and VT(S) increases by 1. That is, VT(S) increases by 1 whenever the new RLC sequence number (new VT(S)) is allocated to each segment. If the segmentation operation is performed for the subsequent RLC PDU, the RLC sequence number is continuously sequentially increased and allocated. If the VT(S) reaches a maximum value (2^(RLC sequence number length)−1), the VS(S) is reset to 0 and the process is repeated.

If the receiving-side RLC layer device operates on the basis of the window, the receiving side may operate an RLC reception window, and the window may be operated in a range half the size of the RLC sequence number. The lower edge of the window may be configured as a sequence number obtained by subtracting the size of the RLC window from an upper edge, and the upper edge may be configured as the highest RLC sequence number received by the receiving-side RLC. Accordingly, if the received RLC sequence number is higher than RLC sequence numbers within the window, the window moves according thereto. If the sequence number of the received RLC PDU is higher than the received window upper edge, the window moves forwards. On the other hand, if the sequence number of the received RLC PDU is smaller than the received window lower edge, the receiving-side RLC layer may discard the sequence number, and may check whether an RLC PDU having a duplicate RLC sequence number within the window is received and discard the duplicate RLC PDU. If the RLC PDU segment having the RLC sequence number within the window arrives, the receiving side stores the RLC PDU segment, and if the lower edge of the window passes the RLC sequence number corresponding to the RLC PDU segment, performs a reassembly procedure to generate the complete RLC PDU and transmits the RLC PDU to the higher layer. If the RLC PDU cannot be generated, the RLC PDU segments may be discarded. The receiving-side RLC layer identifies the SI field and directly transmits the RLC PDU for which the segmentation operation is not performed to the higher layer. The SI field indicates the RLC PDU for which the segmentation operation is performed, the receiving-side RLC layer stores the RLC PDU, and, if the reassembly procedure is triggered by the window as described above (if the lower edge moves to a value larger than the RLC sequence number of the segments), transmits the RLC PDU to the higher layer or discards the same.

According to an embodiment of the disclosure, the transmitting-side and receiving-side RLC layer device operation in the RLC UM corresponding to Embodiment 3-2 is described below. I Embodiment 3-2, the transmitting side has no window and the receiving side operates on the basis of the window and the timer.

The transmitting-side RLC UM device may manage a parameter of VT(S) (may be reused for another parameter or referred to by another name). The parameter VT(S) is an RLC sequence number value assigned to each segment undergoing the segmentation operation, and segments segmented from one RLC PDU have different RLC sequence numbers, that is, different VT(S). The receiving side may configure a timer configured by the base station and a timer value. The VT(S) may be initially configured as 0.

If the transmitting side has data in the RLC UM, the transmitting side may configure an RLC PDU and also a MAC SDU and a MAC subheader. Thereafter, upon identifying transmission resources or receiving transmission resources, the transmitting side determines whether to segment and transmit RLC UM PDUs according to the size of the transmission resources. In the case of the complete RLC PDU for which the segmentation transmission is not performed, the transmitting side configures a 1-byte RLC header having no RLC sequence number 1g-05 and maintains the VT(S). That is, no RLC sequence number is allocated. If it is determined to perform segmentation transmission for any RLC PDU, the header including the RLC sequence number is configured (the header 3j-05). When segmentation transmission is performed, a new RLC sequence number (new VT(S)) is allocated to each segment, and VT(S) increases by 1. That is, VT(S) increases by 1 whenever the new RLC sequence number (new VT(S)) is allocated to each segment. If the segmentation operation is performed for the subsequent RLC PDU, the RLC sequence number is continuously sequentially increased and allocated. If the VT(S) reaches a maximum value (2^(RLC sequence number length)−1), the VS(S) is reset to 0 and the process is repeated.

If the receiving-side RLC layer device operates on the basis of the window, the receiving side may operate an RLC reception window, and the window may be operated in a range half the size of the RLC sequence number. The lower edge of the window may be configured as a sequence number obtained by subtracting the size of the RLC window from the upper edge thereof, and the upper edge may be configured as the highest RLC sequence number received by the receiving-side RLC. Accordingly, if the received RLC sequence number is higher than RLC sequence numbers within the window, the window moves according thereto. If the sequence number of the received RLC PDU is higher than the received window upper edge, the window moves forwards. On the other hand, if the sequence number of the received RLC PDU is smaller than the received window lower edge, the receiving-side RLC layer may discard the sequence number, and may check whether a duplicate RLC PDU is received for the RLC sequence number within the window and discard the duplicate RLC PDU.

Within the window, one timer may be started. The time point at which the timer is started may correspond to one or a plurality of the following cases.

1. The case in which (a timer is not currently started and) a lost packet is detected through a window operation, that is, a gap between RLC sequence numbers is identified 2. The case in which (a timer is not currently started and) a predetermined segment arrives through the received RLC UM PDU 3. The case in which (a timer is not currently started and) a predetermined segment arrives within one RLC sequence number through the received RLC UM PDU 4. The case in which (a timer is not currently started and) segments are not sequentially received within one RLC sequence number through the received RLC UM PDU and segment loss is detected or a gap is identified between segments within one RLC sequence number 5. The case in which (a timer is not currently started and) the complete RLC PDU cannot be configured even though a second segment or a segment thereafter arrives except for the case in which a first segment arrives within one RLC sequence number through the received RLC UM PDU (since it is not preferable to start the timer even though the second segment is not transmitted by the transmitting side)

6. The case in which (a timer is not currently started and) a segment other than the first segment arrives within one RLC sequence number through the received RLC UM PDU If the timer has already been started even though the timer-triggering condition is satisfied, the corresponding segment is simply stored in the buffer (if the complete RLC PDU cannot be reassembled although sequential segments (or lost segments) arrive, the timer may be updated and started again).

If the RLC PDU segment having the RLC sequence number within the window arrives, the receiving side stores the RLC PDU segment, and if the lower edge of the window passes the RLC sequence number corresponding to the RLC PDU segment or the configured timer expires, performs a reassembly procedure to generate the complete RLC PDU and transmits the RLC to the higher layer. If a complete RLC PDU cannot be generated, the RLC PDU segments are discarded. If all the RLC PDU segments sequentially arrive without loss or if lost RLC PDU segments arrive and all segments are ready to reassemble, the segments may be immediately reassembled and transmitted to the higher layer. That is, if there is a lost segment and thus reassembly cannot be completed, the segments may be discarded after the timer expires. The receiving-side RLC layer identifies the SI field and directly transmits the RLC PDU for which the segmentation operation is not performed to the higher layer. The SI field indicates the RLC PDU for which the segmentation operation is performed, the receiving-side RLC layer stores the RLC PDU and, if the reassembly procedure is triggered by the window or the timer as described above (if the lower edge moves to a value larger than the RLC sequence number of the segments) or if all RLC PDU segments to be reassembled arrive, transmits the RLC PDU segments to the higher layer or discards the same.

In the operation based on the timer, the receiving-side RLC layer starts the timer in the RLC UM. The number of started timers may be one or plural.

According to an embodiment, the operation of the transmitting side and the receiving side of the RLC UM RLC layer device corresponding to Embodiment 3-3 is described below. In Embodiment 3-3, the operation of the receiving side is performed on the basis of one timer (reassembly timer).

In the case in which only a single timer is started, the transmitting side and the receiving side configure an entity for the RLC UM. The transmitting-side RLC UM device may manage a parameter of VT(S) (may be reused for another parameter or referred to by another name). The parameter VT(S) is an RLC sequence number value assigned to each segment undergoing the segmentation operation, and segments segmented from one RLC PDU have different RLC sequence numbers, that is, different VT(S). The receiving side may configure a timer configured by the base station and a timer value. The VT(S) may be initially configured as 0.

If the transmitting side has data in the RLC UM, the transmitting side may configure an RLC UM PDU and also a MAC SDU and a MAC subheader. Thereafter, upon identifying transmission resources or receiving transmission resources, the transmitting side determines whether to segment and transmit RLC UM PDUs according to the size of the transmission resources. In the case of the complete RLC PDU for which the segmentation transmission is not performed, the transmitting side configures a 1-byte RLC header having no RLC sequence number 1g-05 and maintains the VT(S). That is, no RLC sequence number is allocated. If it is determined to perform segmentation transmission for any RLC PDU, the header including the RLC sequence number is configured (the header 3j-05). When segmentation transmission is performed, a new RLC sequence number (new VT(S)) is allocated to each segment, and VT(S) increases by 1. That is, VT(S) increases by 1 whenever the new RLC sequence number (new VT(S)) is allocated to each segment. If the segmentation operation is performed for the subsequent RLC PDU, the RLC sequence number is continuously sequentially increased and allocated. If the VT(S) reaches a maximum value ($2^{\wedge}$(RLC sequence number length)$-1$), the VS(S) is reset to 0 and the process is repeated.

The receiving side may receive an RLC UM PDU, and the receiving-side RLC layer may identify an SI field. In the case of an RLC PDU for which the segmentation operation is not performed, the receiving-side RLC layer may process RLC layer data (remove a header) and directly transmit the RLC PDU to a higher layer. If the SI field indicates an RLC PDU for which the segmentation operation is performed, the receiving-side RLC layer may store the RLC PDU and start the timer. If one complete RLC PDU can be configured through reassembly of the received segment and segments stored in the buffer, RLC layer data may be processed (the header may be removed) and the RLC PDU may be directly transmitted to the higher layer. If one complete RLC PDU cannot be configured through reassembly of the received segment and segments stored in the buffer, the segments may be stored in the buffer, a subsequently received RLC PDU may be identified, and the segments may be stored until reassembly is attempted. The time point at which the timer is started may be one or a plurality of the following cases. If all of the RLC PDU segments sequentially arrive without loss or if lost RLC PDU segments arrive and all segments are ready to be reassembled, the segments may be immediately reassembled and transmitted to the higher layer. That is, if there is a lost segment and thus the reassembly cannot be completed, the segments may be discarded after the timer expires.

1. The case in which (a timer is not currently started and) a lost packet is detected 2. The case in which (a timer is not currently started and) a predetermined segment arrives through the received RLC UM PDU 3. The case in which (a timer is not currently started and) a predetermined segment arrives within one RLC sequence number through the received RLC UM PDU 4. The case in which (a timer is not currently started and) segments are not sequentially received within one RLC sequence number through the received RLC UM PDU and segment loss is detected or a gap is identified between segments within one RLC sequence number 5. The case in which (a timer is not currently started and) the complete RLC PDU cannot be configured even though a second segment or a segment thereafter arrives except for the case in which a first segment arrives within one RLC sequence number through the received RLC UM PDU (since it is not preferable to start the timer even though the second segment is not transmitted by the transmitting side)

6. The case in which (a timer is not currently started and) a segment other than the first segment arrives within one RLC sequence number through the received RLC UM PDU If the timer corresponding to the RLC sequence number has already been started even though the timer-triggering condition is satisfied, the corresponding segments simply stored in the buffer (if the complete RLC PDU cannot be reassembled although sequential segments (or lost segments) arrive, the timer may be updated and started again).

If the timer expires, the receiving side discards segments corresponding to all RLC sequence numbers related to the timer or all segments related to the timer from the buffer. Alternatively, if the timer expires, the receiving side attempts to reassemble the segments corresponding to all RLC sequence numbers related to the timer or all segments related to the timer, and if the complete RLC PDU cannot be configured, discard all the segments from the buffer (or if the timer expires, the buffer may be immediately emptied without, for example, attempting reassembly).

In the cases in which the timer is not started and the timer is started, if the RLC PDU is a segment, the receiving side may always attempt to reassemble the segment with segments of the corresponding RLC sequence number stored in the buffer, and if the complete RLC PDU cannot be configured through reassembly, directly transmit the segments to the higher layer.

The process is repeated whenever the RLC UM PDUs are received. If an RLC PDU segment arrives again, the receiving-side RLC layer identifies whether the timer is started according to the triggering condition, and, if the timer is not started, starts the timer again.

According to an embodiment, the operation of the transmitting side and the receiving side of the RLC UM RLC layer device corresponding to Embodiment 3-4 is described below. In Embodiment 3-4, the operation of the receiving side is performed on the basis of a plurality of timers (reassembly timers).

If a plurality of timers is started, each timer may be started for each RLC sequence number.

The transmitting side and the receiving side configure an entity for the RLC UM. The transmitting-side RLC UM device may manage a parameter of VT(S) (may be reused for another parameter or referred to by another name). The parameter VT(S) is an RLC sequence number value assigned by the transmitting side to each segment undergoing the segmentation operation, and segments segmented from one RLC PDU have different RLC sequence numbers, that is, different VT(S). If the segmentation operation is performed for the subsequent RLC PDU, the RLC sequence number is continuously sequentially increased and allocated. The receiving side may configure a timer configured by base station and a timer value. The VT(S) may be initially configured as 0.

If the transmitting side has data in the RLC UM, the transmitting side may configure an RLC UM PDU and also a MAC SDU and a MAC subheader. Thereafter, upon identifying transmission resources or receiving transmission resources, the transmitting side determines whether to segment and transmit RLC PDUs according to the size of the transmission resources. In the case of a complete RLC PDU for which segmentation transmission is not performed, the transmitting side configures a 1-byte RLC header having no RLC sequence number 1g-05 and maintains the VT(S). That is, no RLC sequence number is allocated. If it is determined to perform segmentation transmission for any RLC PDU, the header including the RLC sequence number is configured (the header 3j-05). When segmentation transmission is performed, a new RLC sequence number (VT(S)) is allocated to each segment generated through the segmentation transmission, and different RLC sequence numbers are sequentially allocated to respective segments by increasing the VT(S) by 1 whenever allocation is performed. If the VT(S) reaches a maximum value (2^(RLC sequence number length)−1), the VS(S) is reset to 0 and the process is repeated.

The receiving side may receive an RLC UM PDU, and the receiving-side RLC layer may identify an SI field. In the case of an RLC PDU for which the segmentation operation is not performed, the receiving-side RLC layer may process RLC layer data (remove a header) and directly transmit the RLC PDU to a higher layer. If the SI field indicates an RLC PDU for which the segmentation operation is performed, the receiving-side RLC layer may store the RLC PDU and drive the timer. If one complete RLC PDU can be configured through reassembly of the received segment and segments stored in the buffer, RLC layer data may be processed (the header may be removed) and the RLC PDU may be directly transmitted to the higher layer. If one complete RLC PDU cannot be configured through reassembly of the received segment and segments stored in the buffer, the segments may be stored in the buffer, a subsequently received RLC PDU may be identified, and the segments may be stored until reassembly is attempted. The timer may be individually started one by one for each RLC sequence number. That is, if segments corresponding to different RLC sequence numbers are sequentially received, each timer corresponding to each RLC sequence number may be started. The time point at which each timer is started may be one or a plurality of the following cases.

1. The case in which (a timer corresponding to the corresponding RLC sequence number is not currently started and) a lost packet is detected 2. The case in which (a timer corresponding to the corresponding RLC sequence number is not currently started and) a predetermined segment arrives through the received RLC UM PDU 3. The case in which (a timer corresponding to the corresponding RLC sequence number is not currently started and) a predetermined segment arrives within one RLC sequence number through the received RLC UM PDU 4. The case in which (a timer corresponding to the corresponding RLC sequence number is not currently started and) segments are not sequentially received within one RLC sequence number through the received RLC UM PDU and segment loss is detected or a gap is identified between segments within one RLC sequence number 5. The case in which (a timer corresponding to the corresponding RLC sequence number is not currently started and) the complete RLC PDU cannot be configured even though a second segment or a segment thereafter arrives, except for the case in which a first segment arrives within one RLC sequence number through the received RLC UM PDU (since it is not preferable to start the timer even though the second segment is not transmitted by the transmitting side)

6. The case in which (a timer corresponding to the corresponding RLC sequence number is not currently started and) there is a segment other than the first segment within one RLC sequence number through the received RLC UM PDU If the timer corresponding to the RLC sequence number has already been started even though the timer-triggering condition is satisfied, the corresponding segments simply stored in the buffer (if the complete RLC PDU cannot be reassembled although sequential segments (or lost segments) arrive, the timer may be updated and started again).

If each timer expires, the receiving side discards all segments corresponding to the RLC sequence number related to the timers or segments related to the timers from the buffer. Alternatively, if each timer expires, the receiving side attempts to reassemble segments corresponding to the RLC sequence number related to each timer or all segments related to the timer, and, if the complete RLC PDU cannot be configured, discard all the segments from the buffer (or if the timer expires, the buffer may be immediately emptied without attempting reassembly).

In the cases in which the timer is not started and the timer is started, if the RLC PDU is a segment, the receiving side may always attempt to reassemble the segment with segments of the corresponding RLC sequence number stored in the buffer, and if the complete RLC PDU cannot be configured through reassembly, directly transmit the segments to the higher layer.

The process is repeated whenever RLC UM PDUs are received. If an RLC PDU segment arrives again, the receiving-side RLC layer identifies whether the timer is started according to the triggering condition, and, if the timer is not started, starts the timer again.

In the embodiments, the timer values may be configured through the RRC message of step 3e-40 or 3e-75.

That is, the proposed method is a method of not allocating the RLC sequence number to the complete RLC PDU for which the segmentation operation is not performed and sequentially allocating different RLC sequence numbers only to segmented segments for which the segmentation operation is performed in the RLC UM, and configuring an SI field suitable for respective segments to allow the receiving side to successfully perform reassembly using the RLC sequence numbers and the SI fields, so as to reduce overhead.

Further, through the proposed method, it is possible to reduce the time taken to process data without any bad influence on a data pre-processing procedure of the next-generation mobile communication system.

Figure 3K:
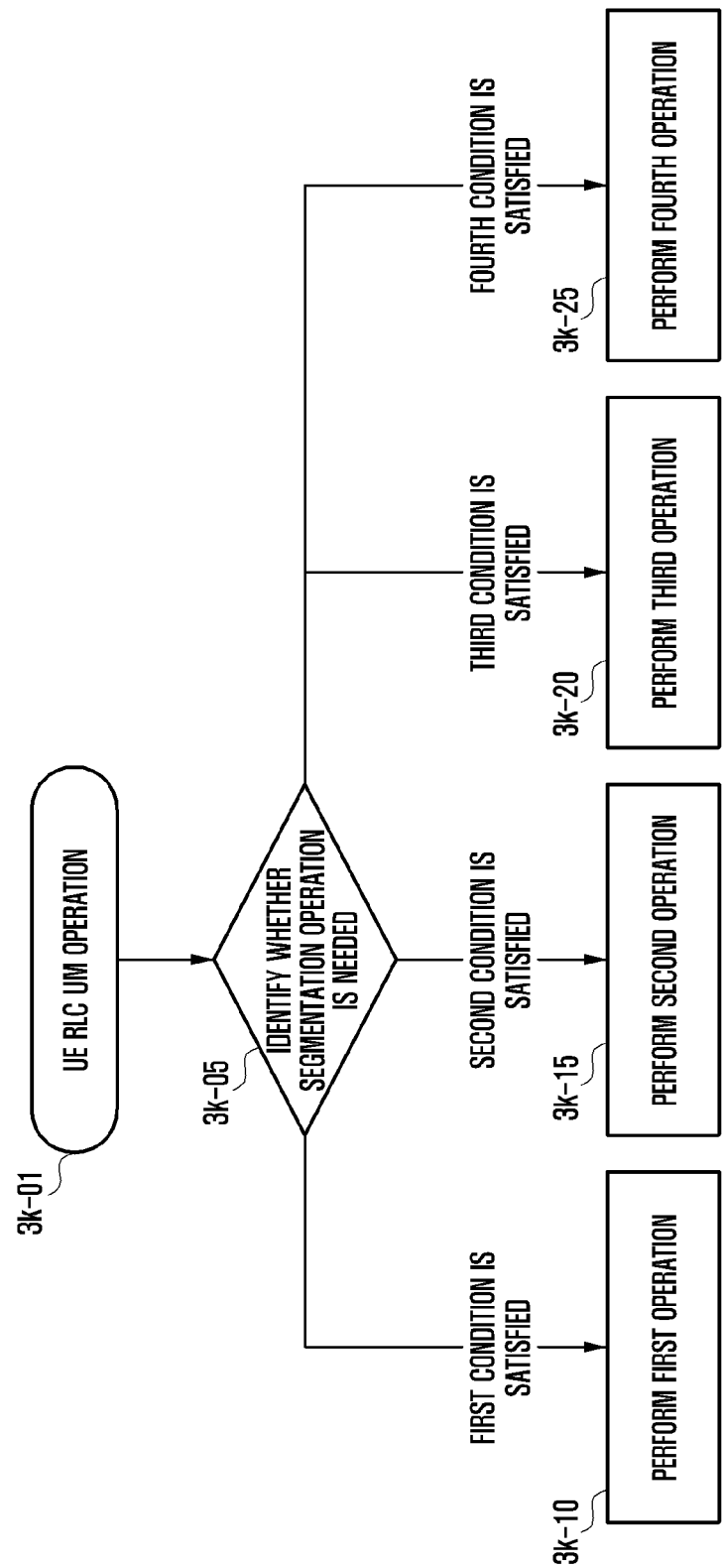
FIG. 3K illustrates a transmission operation of the RLC UM UE according to an embodiment of the disclosure.

FIG. 3K illustrates the transmission operation of the RLC UM UE according to an embodiment of the disclosure.

If a UE 3k-01 receives, from the lower layer, a request to perform the segmentation operation for the RLC SDU (PDCP PDU) received from the higher layer, the UE 3k-01 may perform the segmentation operation. Further, if a segmentation request is received from the lower layer even though the RLC header has already been configured and the RLC PDU has been transmitted to the lower layer, the UE may newly configure or update the RLC header and transmit the RLC header to the lower layer again. When configuring the RLC header for the RLC SDU, the UE first identifies the need for the segmentation operation in step 3k-05.

If a first condition is satisfied, the first operation is performed in step 3k-10, if a second condition is satisfied, the second operation is performed in step 3k-15, if a third condition is satisfied, the third operation is performed in step 3k-20, and if a fourth condition is satisfied, the fourth operation is performed in step 3k-25.

The first condition corresponds to the case in which the segmentation operation is not performed because the segmentation operation is not needed for the RLC SDU.

The second condition corresponds to the case in which the RCL header should be configured for a first RLC SDU segment after the segmentation operation because the segmentation operation is needed for the RLC The third condition corresponds to the case in which the RCL header should be configured for an intermediate RLC SDU segment, rather than first and last segments, after the segmentation operation because the segmentation operation is needed for the RLC SDU.

The fourth condition corresponds to the case in which the RCL header should be configured for a last RLC SDU segment after the segmentation operation because the segmentation operation is needed for the RLC SDU.

The first operation corresponds to an operation in which the UE configures a 1-byte RLC header without using the RLC sequence number and configures the SI field as 00. Further, the current VT(S) is maintained.

The second operation corresponds to an operation in which the UE configures the SI field as 01 when configuring the RLC header and allocates the current VT(S) as the RLC sequence number. Further, a new VT(S) is stored by increasing the current VT(S) by 1.

The third operation corresponds to an operation in which the UE configures the SI field as 11 when configuring the RLC header and allocates the current VT(S) as the RLC sequence number. Further, a new VT(S) is stored by increasing the current VT(S) by 1.

The fourth operation corresponds to an operation in which the UE configures the SI field as 10 when configuring the RLC header and allocates the current VT(S) as the RLC sequence number. Further, a new VT(S) is stored by increasing the current VT(S) by 1.

Figure 3L:
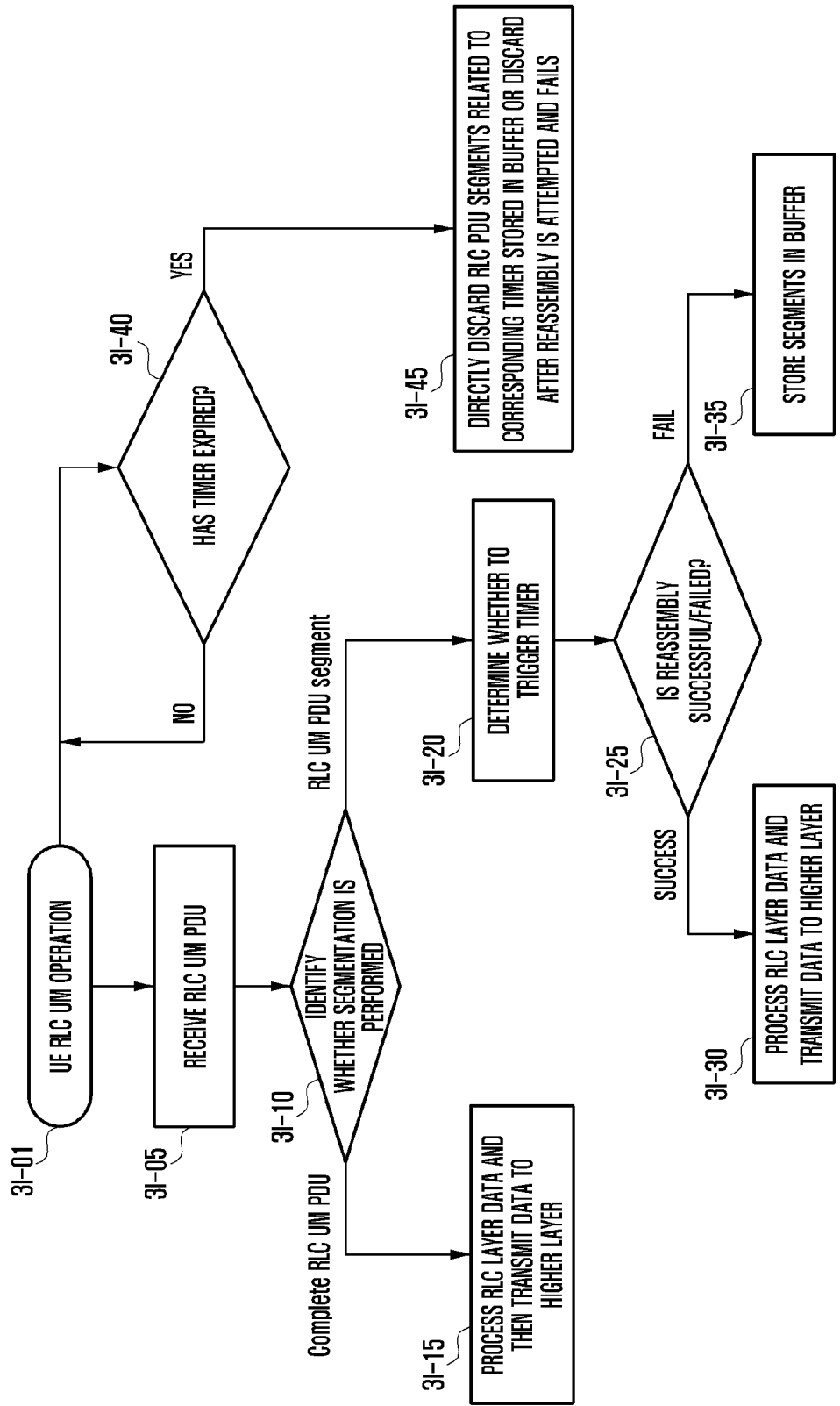
FIG. 3L illustrates a reception operation of the RLC UM UE corresponding to embodiments 3-3 and 3-4 according to an embodiment of the disclosure.

FIG. 3L illustrates a reception operation of the RLC UM UE corresponding to embodiment 3-3 and embodiment 3-4 according to the disclosure.

The UE may perform a receiving-side operation on the basis of one or a plurality of timers (reassembly timers). If a plurality of timers is started, each timer may be started for each RLC sequence number. The UE operates in the RLC UM in step 3*l*-01.

The UE may receive an RLC UM PDU in step 3*l*-05 and identify an SI field in step 3*l*-10. In the case of an RLC PDU for which the segmentation operation is not performed, the UE may process RLC layer data (remove a header) and directly transmit the RLC PDU to a higher layer in step 3*l*-15. If the SI field indicates an RLC PDU for which the segmentation operation is performed, the UE may store the received RLC UM PDU according to one or a plurality of the timer-triggering conditions and drive the timer in step 3*l*-20. If one complete RLC PDU can be configured through reassembly of the received segment and segments stored in the buffer, the UE or the RLC layer of the UE may process RLC layer data (remove the header) and directly transmit the RLC PDU to the higher layer in step 3*l*-30. If one complete RLC PDU cannot be configured through reassembly of the received segment and segments stored in the buffer, the UE or the RLC layer of the UE may store the segments in the buffer, identify a subsequently received RLC PDU, and store the segments until the reassembly is attempted in step 3*l*-35. If a plurality of timers is used, the timers may be individually started one by one for respective RLC sequence numbers. That is, if segments corresponding to different RLC sequence numbers are sequentially received, each timer, corresponding to an RLC sequence number, may be started. The time point at which each timer is started may be one or a plurality of the following cases.

1. The case in which (a timer corresponding to the corresponding RLC sequence number is not currently started and) a lost packet is detected 2. The case in which (a timer corresponding to the corresponding RLC sequence number is not currently started and) a predetermined segment arrives through the received RLC UM PDU 3. The case in which (a timer corresponding to the corresponding RLC sequence number is not currently started and) a predetermined segment arrives within one RLC sequence number through the received RLC UM PDU 4. The case in which (a timer corresponding to the corresponding RLC sequence number is not currently started and) segments are not sequentially received within one RLC sequence number through the received RLC UM PDU and segment loss is detected, or a gap is identified between segments within one RLC sequence number 5. The case in which (a timer corresponding to the corresponding RLC sequence number is not currently started and) the complete RLC PDU cannot be configured even though a second segment or a segment thereafter arrives, except for the case in which a first segment arrives within one RLC sequence number through the received RLC UM PDU (since it is not preferable to start the timer even though the second segment is not transmitted by the transmitting side)

6. The case in which (a timer corresponding to the corresponding RLC sequence number is not currently started and) there is a segment other than the first segment within one RLC sequence number through the received RLC UM PDU If the timer corresponding to the RLC sequence number has already been started even though the timer-triggering condition is satisfied, the corresponding segment is simply stored in the buffer (if the complete RLC PDU cannot be reassembled even though sequential segments (or lost segments) arrive, the timer may be updated and started again).

The receiving side determines whether the timer expires in step 3*l*-40. When each timer expires, the receiving side discards all segments corresponding to the RLC sequence number related to the timer or segments related to the timer from the buffer. Alternatively, when each timer expires, the receiving side attempts to reassemble segments corresponding to the RLC sequence number related to the timer or all segments related to the timer, and, if the complete RLC PDU cannot be configured, discard all the segments from the buffer in step 3*l*-45.

In the cases in which the timer is not started and the timer is started, if the RLC PDU is a segment, the receiving side may always attempt to reassemble the segment with segments of the corresponding RLC sequence number stored in the buffer, and if the complete RLC PDU can be configured through reassembly, directly transmit the RLC PDU to the higher layer.

Figure 3M:
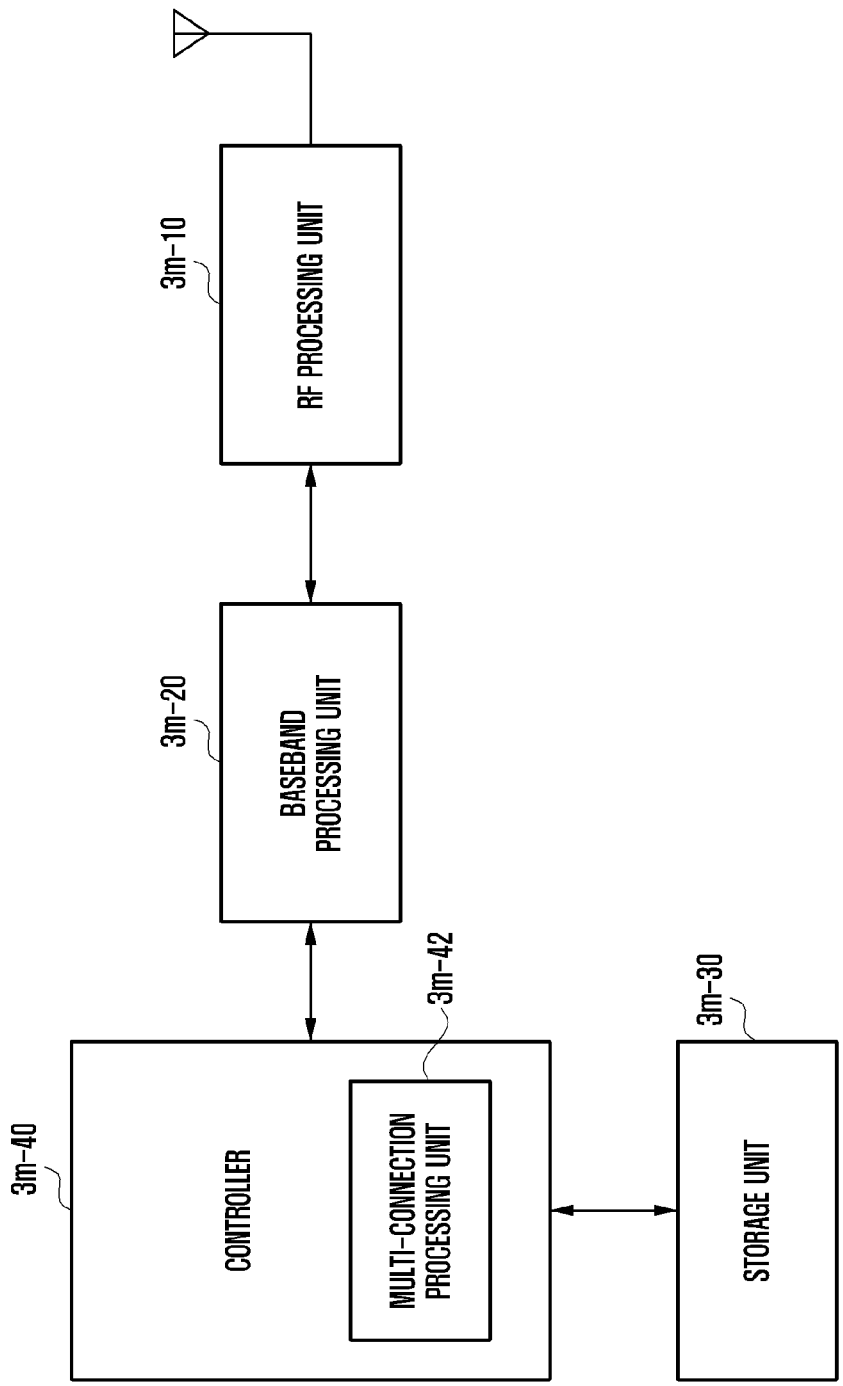
FIG. 3M illustrates the configuration of the UE according to an embodiment of the disclosure.

FIG. 3M illustrates the configuration of the UE according to an embodiment of the disclosure.

Referring to FIG. 3M, the UE includes a radio-frequency (RF) processing unit 3*m*-10, a baseband processing unit 3*m*-20, a storage unit 3*m*-30, and a controller 3*m*-40. The controller 3*m*-40 may further include a multi-connection processing unit 3*m*-42.

The RF processing unit 3*m*-10 performs a function for transmitting and receiving a signal through a wireless channel, such as band conversion and amplification of a signal. That is, the RF processing unit 3*m*-10 up-converts a baseband signal provided from the baseband processing unit 3*m*-20 into an RF band signal, transmits the RF band signal through an antenna, and then down-converts the RF band signal received through the antenna into a baseband signal. For example, the RF processing unit 3*m*-10 may include a transmission filter, a reception filter, an amplifier, a mixer, an oscillator, a digital-to-analog convertor (DAC), an analog-to-digital convertor (ADC), and the like. Although FIG. 3M illustrates only one antenna, the UE may include a plurality of antennas. In addition, the RF processing unit 3*m*-1.0 may include a plurality of RF chains. Moreover, the RF processing unit 3*m*-10 may perform beamforming. For the beamforming, the RF processing unit 3*m*-10 may control the phase and size of each signal transmitted/received through a plurality of antennas or antenna elements. The RF processing unit may perform MIMO and receive a plurality of layers when performing the MIMO operation. The RF processing unit 3*m*-10 may perform reception beam sweeping by appropriately configuring a plurality of antennas or antenna elements under the control of the controller, or may control the direction of the reception beam or the beam width such that the reception beam and the transmission beam operate together.

The baseband processing unit 3*m*-20 performs a function for conversion between a baseband signal and a bitstream according to a physical-layer standard of the system. For example, when data is transmitted, the baseband processing unit 3*m*-20 generates complex symbols by encoding and modulating a transmission bitstream. Further, when data is received, the baseband processing unit 3*m*-20 reconstructs a reception bitstream by demodulating and decoding a baseband signal provided from the RF processing unit 3*m*-10. For example, in an orthogonal frequency-division multiplexing (OFDM) scheme, when data is transmitted, the baseband processing unit 3*m*-20 generates complex symbols by encoding and modulating a transmission bitstream, maps the complex symbols to subcarriers, and then configures OFDM symbols through an IFFT (inverse fast Fourier transform) operation and a CP (cyclic prefix) insertion. Further, when data is received, the baseband processing unit 3*m*-20 divides the baseband signal provided from the RE processing unit 3*m*-10 in units of OFDM symbols, reconstructs the signals mapped to the subcarriers through a fast Fourier transform (FFT) operation, and then reconstructs a reception bitstream through demodulation and decoding.

The baseband processing unit 3*m*-20 and the RF processing unit 3*m*-10 transmit and receive a signal as described above. Accordingly, the baseband processing unit 3*m*-20 and the RE processing unit 3*m*-10 may be referred to as a transmitter, a receiver, a transceiver, or a communication unit. At least one of the baseband processing unit 3*m*-20 and the RF processing unit 3*m*-10 may include a plurality of communication modules for supporting a plurality of different radio access technologies. In addition, at least one of the baseband processing unit 3*m*-20 and the RF processing unit 3*m*-10 may include different communication modules to process signals in different frequency bands. For example, the different radio access technologies may include an LTE network and an NR network. Further, the different frequency bands may include a super-high frequency (SHF) (for example, 2.5 GHz and 5 GHz) band and a millimeter (mm)-wave (for example, 60 GHz) band.

The storage unit 3*m*-30 stores data such as a basic program, an application, and setting information for the operation of the UE. The storage unit 3*m*-30 provides the stored data in response to a request from the controller 3*m*-40.

The controller 3*m*-40 controls the overall operation of the UE. For example, the controller 3*m*-40 transmits and receives a signal through the baseband processing unit 3*m*-20 and the RF processing unit 3*m*-10. Further, the controller 3*m*-40 records data in the storage unit 3*m*-40 and reads the data. To this end, the controller 3*m*-40 may include at least one processor. For example, the controller 3*m*-40 may include a communication processor (CP) that performs control for communication, and an application processor (AP) that controls a higher layer such as an application.

Figure 3N:
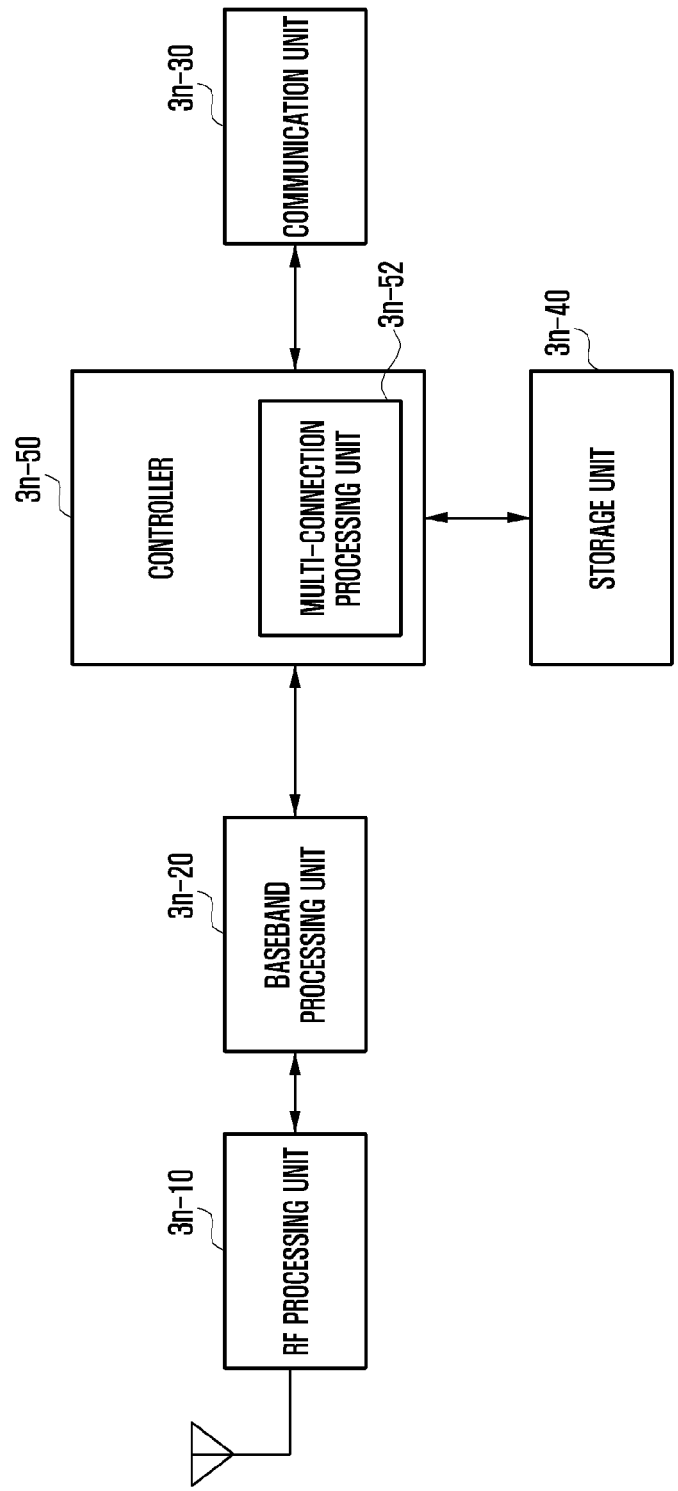
FIG. 3N illustrates the configuration of the base station according to an embodiment of the disclosure.

FIG. 3N illustrates the configuration of the base station according to an embodiment of the disclosure.

As illustrated in FIG. 3N, the base station may include an RF processing unit 3*n*-10, a baseband processing unit 3*n*-20, a backhaul communication unit 3*n*-30, a storage unit 3*n*-40, and a controller 3*n*-50. The controller 3*n*-50 may further include a multi-connection processing unit 3*n*-52.

The RE processing unit 3*n*-10 performs a function for transmitting and receiving a signal through a wireless channel, such as band conversion and amplification of a signal. That is, the RF processor 3*n*-10 up-converts a baseband signal provided from the baseband processor 3 into an RF band signal, transmits the RE band signal through an antenna, and then down-converts the RE band signal received through the antenna into a baseband signal. For example, the RF processing unit 3*n*-10 may include a transmission filter, a reception filter, an amplifier, a mixer, an oscillator, a DAC, and an ADC. Although FIG. 3N illustrates only one antenna, the first access node may include a plurality of antennas. The RF processing unit 3*n*-10 may include a plurality of RE chains. Further, the RF processing unit 3*n*-10 may perform beamforming. For the beamforming, the RF processing unit 3*n*-10 may control the phase and size of each of the signals transmitted and received through a plurality of antennas or antenna elements. The RE processing unit may perform a downlink MIMO operation by transmitting one or more layers.

The baseband processing unit 3*n*-20 performs a function of conversion between a baseband signal and a bitstream according to a physical-layer standard of the first radio-access technology. For example, when data is transmitted, the baseband processing unit 3*n*-20 generates complex symbols by encoding and modulating a transmission bitstream. Further, when data is received, the baseband processor 3*n*-20 reconstructs a reception bitstream by demodulating and decoding a baseband signal provided from the RE processing unit 3*n*-10. For example, in an OFDM scheme, when data is transmitted, the baseband processing unit 3*n*-20 may generate complex symbols by encoding and modulating the transmission bitstream, map the complex symbols to sub-carriers, and then configure OFDM symbols through an IFFT operation and CP insertion. In addition, when data is received, the baseband processing unit 3*n*-20 divides a baseband signal provided from the RF processing unit 3*n*-10 in units of OFDM symbols, recovers signals mapped with subcarriers through an FFT operation, and then recovers a reception bitstream through demodulation and decoding. The baseband processing unit 3*n*-20 and the RF processing unit 3*n*-10 transmit and receive the signal as described above. Accordingly, the baseband processing unit 3*n*-20 and the RF processing unit 3*n*-10 may be referred to as a transmitter, a receiver, a transceiver, a communication unit, or a wireless communication unit.

The communication unit 3*n*-30 provides an interface for communicating with other nodes within the network.

The storage unit 3*n*-40 stores data such as a basic program, an application, and configuration information for the operation of the MeNB. Particularly, the storage unit 3*n*-40 may store information on a bearer allocated to the accessed UE and a measurement result reported from the accessed UE. Further, the storage unit 3*n*-40 may store information which is a reference for determining whether or not to provide multiple connections to the UE. The storage unit 3*n*-40 provides stored data in response to a request from the controller 3*n*-50.

The controller 3*n*-50 controls the overall operation of the MeNB. For example, the controller 3*n*-50 transmits and receives a signal through the baseband processing unit 3*n*-20 and the RF processing unit 3*n*-10 or through the backhaul communication unit 3*n*-30. The controller 3*n*-50 records data in the storage unit 3*n*-40 and reads the data. To this end, the controller 3*n*-50 may include at least one processor.

Embodiment 4

Figure 4A:
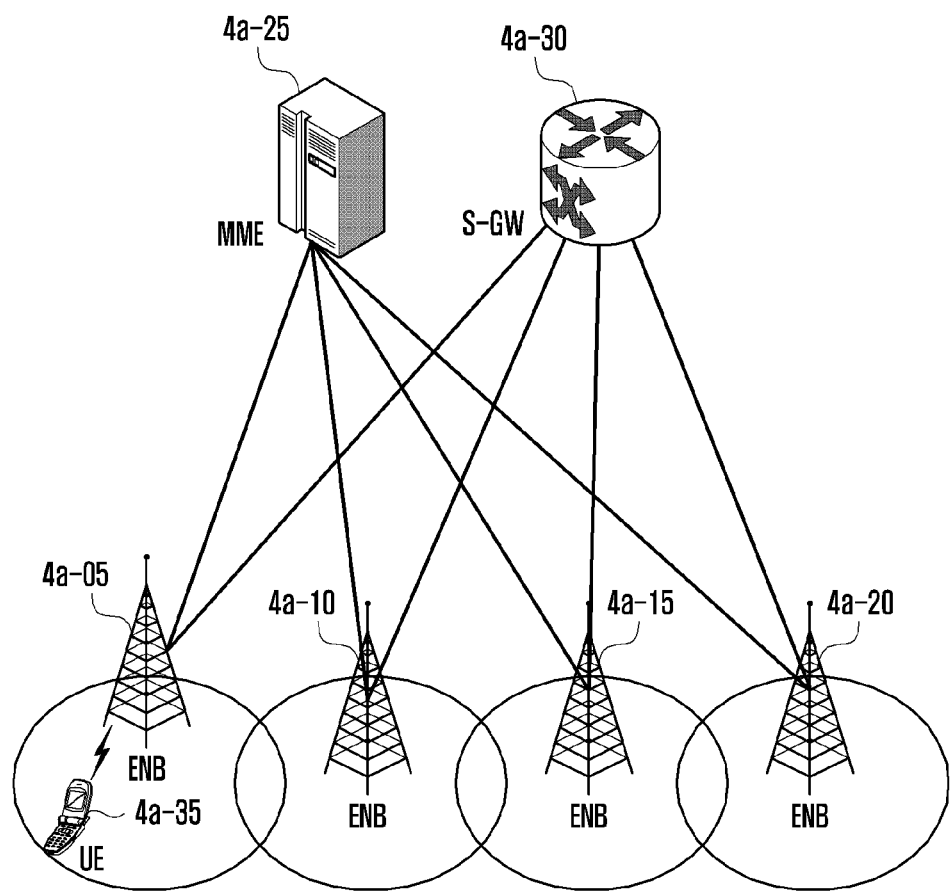
FIG. 4A illustrates the structure of an LTE system according to an embodiment of the disclosure.

FIG. 4A illustrates the structure of an LTE system according to an embodiment of the disclosure.

Referring to FIG. 4A, a radio access network of the LTE system includes next-generation base stations (hereinafter, referred to as evolved node Bs (ENBs), Node Bs, or base stations) 4*a*-05, 4*a*-10, 4*a*-15, and 4*a*-20, a mobility management entity (MIME) 4*a*-25, and a serving gateway (S-GW) 4*a*-30, as illustrated in FIG. 4. A User Equipment 4*a*-35 (hereinafter, referred to as a UE or a terminal) accesses an external network through the ENBs 4*a*-05, 4*a*-10, 4*a*-15, and 4*a*-20 and the S-GW 4*a*-30.

In FIG. 4A, the ENBs 4*a*-05, 4*a*-10, 4*a*-15, and 4*a*-20 correspond to the existing node Bs of the UMTS system. The ENB 4*a*-05 is connected to the UE 4*a*-35 through a radio channel, and performs a more complicated role than a conventional node B. In an UE system, since all user traffic including real-time service such as VoIP (Voice over IP) through an Internet protocol is served through a shared channel, an apparatus for collecting and scheduling status information on buffer statuses of UEs, available transmission power status, and channel statuses is required, and the ENBs 4a-05, 4a-10, 4a-15, and 4a-20 serve as this apparatus. One ENB generally controls a plurality of cells. For, example, in order to implement a transmission rate of 100 Mbps, the LTE system uses orthogonal frequency-division multiplexing (OFDM) as a wireless access technology in a bandwidth of 20 MHz. Further, an adaptive modulation and coding (AMC) scheme of determining a modulation scheme and a channel-coding rate is applied depending on the channel status of the UE. The S-GW 4a-30 is a device for providing a data bearer, and generates or removes the data bearer under the control of the MME 4a-25. The MME 4a-25 is a device for performing a function of managing the mobility of the UE and various control functions, and is connected to a plurality of base stations.

Figure 4B:
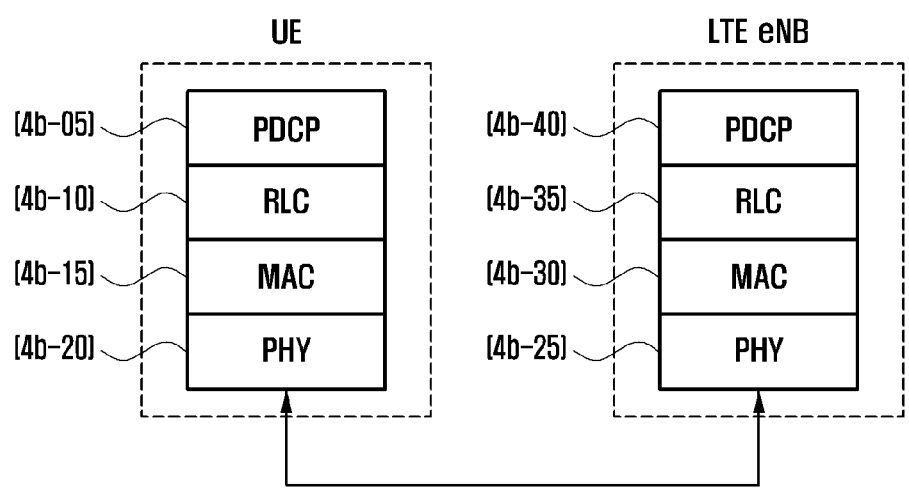
FIG. 4B illustrates a wireless protocol structure in the LTE system according to an embodiment of the disclosure.

FIG. 4B illustrates a wireless protocol structure in the LTE system according to an embodiment of the disclosure.

Referring to FIG. 4B, the UE and the ENB include packet data convergence protocols (PDCPs) 4b-05 and 4b-40, radio link controls (RLCs) 4b-10 and 4b-35, and medium access controls (MACS) 4b-15 and 4b-30, respectively, in the wireless protocol of the LTE system. The packet data convergence protocols (PDCPs) 4h-05 and 4b-40 perform an operation of compressing/reconstructing an IP header. The main functions of the PDCP are described below.

Header compression and decompression function (Header compression and decompression: ROHC only)

User data transmission function (Transfer of user data)

Sequential delivery function (In-sequence delivery of upper layer PDUs at PDCP re-establishment procedure for RLC AM)

Sequence re-arrangement function (For split bearers in DC (only support for RLC AM): PDCP PDU routing for transmission and PDCP PDU reordering for reception)

Duplicate detection function (Duplicate detection of lower layer SDUs at PDCP re-establishment procedure for RLC AM)

Retransmission function (Retransmission of PDCP SDUs at handover and, for split bearers in DC, of PDCP PDUs at PDCP data-recovery procedure, for RLC AM)

Ciphering and deciphering function (Ciphering and deciphering)

Timer-based SDU removal function (Timer-based SDU discard in uplink)

Radio link control (RLC) 4b-10 and 4b-35 reconfigures the PDCP Packet Data Unit (PDU) to be the proper size and performs an automatic repeat request (ARQ) operation. The main functions of the RLC are described below.

Data transmission function (Transfer of upper layer PDUs)

ARQ function (Error Correction through ARQ (only for AM data transfer))

Concatenation, segmentation, and reassembly function (Concatenation, segmentation and reassembly of RLC SDUs (only for UM and AM data transfer))

Re-segmentation function (Re-segmentation of RLC data PDUs (only for AM data transfer))

Reordering function (Reordering of LC data PDUs (only for UM and AM data transfer)

Duplication detection function (only for UM and AM data transfer)

Error detection function (Protocol error detection (only for AM data transfer))

RLC SDU deletion function (RLC SDU discard (only for UM and AM data transfer))

RLC re-establishment function (RLC re-establishment)

The MACs 4b-15 and 4b-30 are connected with various RLC layer devices included in one UE or base station, and perform an operation for multiplexing RLC PDUs to the MAC PDU and de-multiplexing the RLC PDUs from the MAC PDU. The main functions of the MAC are described below.

Mapping function (Mapping between logical channels and transport channels)

Multiplexing and demultiplexing function (Multiplexing/demultiplexing of MAC SDUs belonging to one or different logical channels into/from transport blocks (TB) delivered to/from the physical layer on transport channels)

Scheduling information report function (Scheduling information reporting)

HARQ function (Error correction through HARQ)

Logical channel priority control function (Priority handling between logical channels of one UE)

UE priority control function (Priority handling between UEs by means of dynamic scheduling)

MBMS service identification function (MBMS service identification)

Transport format selection function (Transport format selection)

Padding function (Padding)

The PHY layers 4b-20 and 4b-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 4C:
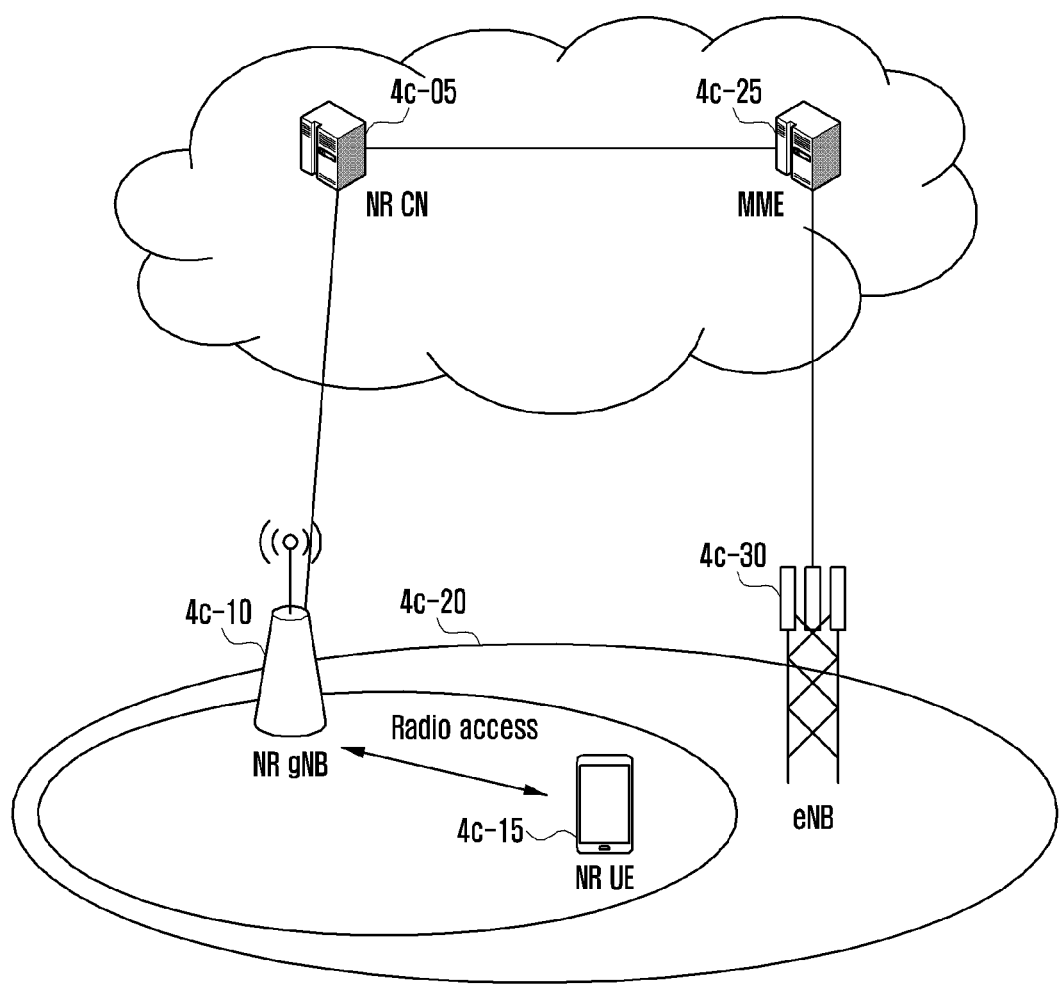
FIG. 4C illustrates the structure of a next-generation mobile communication system according to an embodiment of the disclosure.

FIG. 4C illustrates the structure of a next-generation mobile communication system according to an embodiment of the disclosure.

Referring to FIG. 4C, a radio access network of a next-generation mobile communication system (hereinafter, NR or 5G) includes a new radio node B 4c-10 (hereinafter, referred to as an NR gNB or an NR base station) and a new radio core network (NR CN) 4c-05. A user terminal (hereinafter, referred to as a new radio user equipment (NR UE) or a terminal) 4c-15 accesses an external network through the NR gNB 4c-10 and the NR CN 4c-05.

In FIG. 4C, the NR gNB 4c-10 corresponds to an evolved Node B (eNB) of a conventional LTE system. The NR gNB 4c-10 may be connected to an NR UE 4c-15 through a radio channel, and may provide better service than a conventional node B. Since all user traffic is served through a shared channel in the next-generation mobile communication system, a device for collecting and scheduling information of buffer statuses, available transmission power statuses, and channel statuses of UEs is required, which corresponds to the NR gNB 4c-10, One NR gNB generally controls a plurality of cells. The NR gNB may have a bandwidth wider than the conventional maximum bandwidth in order to implement super-high-speed data transmission compared to conventional LTE, may apply orthogonal frequency-division multiplexing (OFDM) through radio-access technology, and may further apply beamforming technology. Further, an adaptive modulation and coding (AMC) scheme of determining a modulation scheme and a channel-coding rate is applied depending on the channel status of the UE. The NR CN 4c-05 performs a function of supporting mobility, configuring a bearer, and configuring a QoS. The NR CN 4c-05 is a device for performing a function of managing the mobility of the UE and various control functions, and is connected to a plurality of base stations. Further, the next-generation mobile communication system may be linked to the conventional LTE system, and the NR CN4c-05 is connected to an MME 4c-25 through a network interface. The MME 4c-25 is connected to the eNB 4c-30, which is a conventional base station.

Figure 4D:
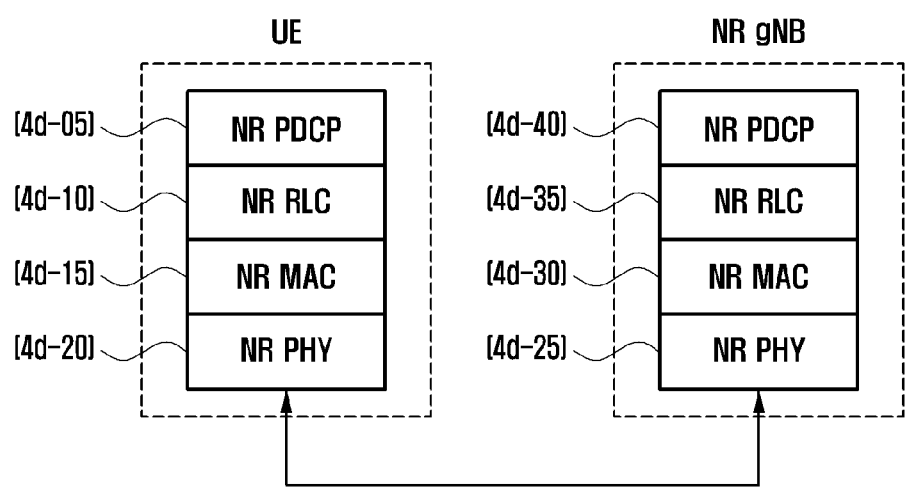
FIG. 4D illustrates a wireless protocol structure of the next-generation mobile communication system according to an embodiment of the disclosure.

FIG. 4D illustrates a wireless protocol structure of the next-generation mobile communication system according to an embodiment of the disclosure.

Referring to FIG. 4D, the wireless protocol of the next-generation mobile communication system includes NR PDCPs 4d-05 and 4d-40, NR RLCs 4d-10 and 4d-35, and NR MACs 4d-15 and 4d-30 in the UE and the NR gNB. The main functions of the NR PDCPs 4d-05 and 4d-40 may include some of the following functions.

Header compression and decompression function (Header compression and decompression: ROHC only)

User data transmission function (Transfer of user data)

Sequential delivery function (In-sequence delivery of upper layer PDUs)

Reordering function (PDCP PDU reordering for reception)

Duplicate detection function (Duplicate detection of lower layer SDUs)

Retransmission function (Retransmission of PDCP SDUs)

Ciphering and deciphering function (Ciphering and deciphering)

Timer-based SDU removal function (Timer-based SDU discard in uplink)

The reordering function of the NR PDCP device is a function of sequentially reordering PDCP PDUs received from a lower layer on the basis of a PDCP Sequence Number (SN), and may include a function of sequentially transferring the reordered data to a higher layer, a function of recording PDCP PDUs lost due to the reordering, a function of reporting statuses of the lost PDCP PDUs to a transmitting side, and a function of making a request for retransmitting the lost PDCP PDUs.

The main functions of the NR RLC 4d-10 or 4d-35 may include some of the following functions.

Data transmission function (Transfer of upper layer PDUs)

Sequential delivery function (in-sequence delivery of upper layer PDUs)

Non-sequential delivery function (Out-of-sequence delivery of upper layer PDUs)

ARQ function (Error correction through ARQ)

Concatenation, segmentation, and reassembly function (Concatenation, segmentation and reassembly of RLC SDUs)

Re-segmentation function (Re-segmentation of RLC data PDUs)

Reordering function (Reordering of RLC data PDUs)

Duplicate detection function (Duplicate detection)

Error detection function (Protocol error detection)

RLC SDU deletion function (RLC SDU discard)

RLC re-establishment function (RLC re-establishment)

The sequential delivery function (In-sequence delivery) of the NR RLC device is a function of sequentially transferring PDCP PDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC Sequence Number (SN) or a PDCP SN, a function of recording PDCP PDUs lost due to the reordering, a function of reporting statuses of the lost PDCP PDUs to a transmitting side, a function of making a request for retransmitting the lost PDCP PDUs, if there is a lost RLC SDU, a function of sequentially transferring only RLC SDUs preceding the lost RLC SDU to the higher layer, if a predetermined timer expires even though there is a lost RLC SDU, a function of sequentially transferring all RLC SDUs received before the timer starts to the higher layer, or if a predetermined timer expires even though there is a lost RLC SDU, a function of sequentially transferring all RLC SDUs received up to that point in time to the higher layer. Further, the NR RLC device may process the RLC PDUs sequentially in the reception order thereof (according to an arrival order regardless of a serial number or a sequence number) and may transfer the RLC PDUs to the PDCP device regardless of the sequence thereof (out-of-sequence delivery). In the case of segments, the NR RLC device may receive segments which are stored in the buffer or will be received in the future, reconfigure the segments to be one RLC PDU, process the RLC PDU, and then transmit the same to the PDCP device. The NR RLC layer may not include a concatenation function, or the function may be performed by the NR MAC layer or may be replaced with a multiplexing function of the NR MAC layer.

The non-sequential function (Out-of-sequence delivery) of the NR RLC device is a function of transferring RLC SDUs received from a lower layer directly to a higher layer regardless sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 4d-15 and 4d-30 may be connected to a plurality of NR RLC layer devices configured in one UE or base station, and the main functions of the NR MACs may include some of the following functions.

Mapping function (Mapping between logical channels and transport channels)

Multiplexing and demultiplexing function (Multiplexing/demultiplexing of MAC SDUs)

Scheduling information report function (Scheduling information reporting)

HARQ function (Error correction through HARQ)

Logical channel priority control function (Priority handling between logical channels of one UE)

UE priority control function (Priority handling between UEs by means of dynamic scheduling)

MBMS service identification function (MBMS service identification)

Transport format selection function (Transport format selection)

Padding function (Padding)

The PHY layers 4d-20 and 4d-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 4E:
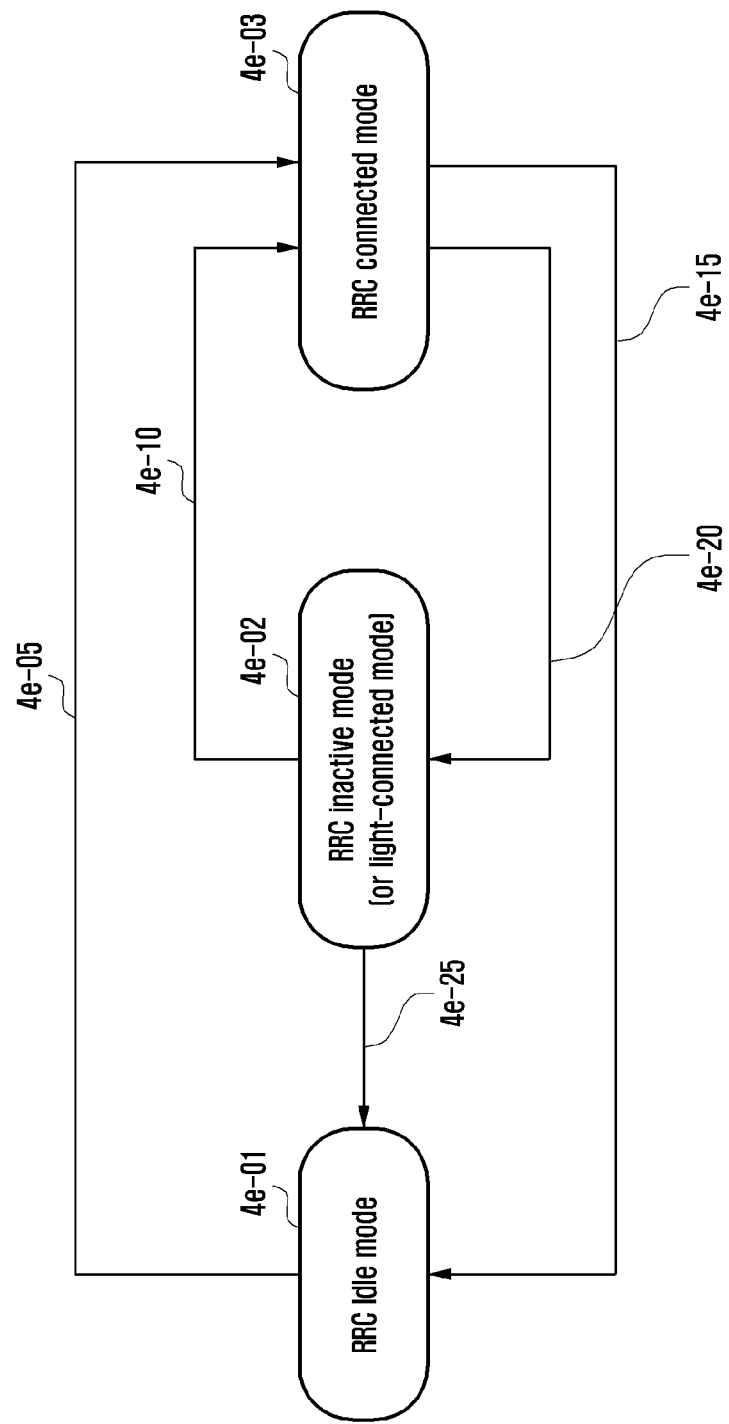
FIG. 4E illustrates modes in which the UE may operate in the next-generation mobile communication system according to an embodiment of the disclosure.

FIG. 4E illustrates modes in which the UE may operate in the next-generation mobile communication system according to the disclosure.

In FIG. 4E, the UE may operate in an RRC-connected mode 4e-03, an RRC-inactive mode or a lightly connected mode 4e-02, or an RRC-idle mode 4e-01 and pass through processes 4e-05, 4e-10, 4e-15, 4e-20, and 4e-25 for transition between the different modes. That is, if the LT in the RRC-idle mode 4e-01 has uplink data to be transmitted or receives a paging message because downlink data arrives, or in order to transmit and receive data by establishing the connection with the network to update a tracking area (periodically or if the UE escapes the tracking area), the UE may transition to the RRC-connected mode 4e-03 in step 4e-05.

If there no data generation for a predetermined time after data transmission and reception, the RRC-connected mode UE may be switched to the RRC-idle mode by the network in step 4e-15. Further, if there is no data generation for a predetermined time, the UE in the RRC-connected mode 4e-03 may transition to the RRC-inactive mode 4e-02 by switching the mode, either by itself or under the control of the network, in order to reduce battery consumption and support rapid access in step 4e-20. If the UE in the RRC-inactive mode 4e-03 has uplink data to be transmitted or receives a paging message because downlink data arrives, or in order to transmit and receive data by establishing the connection the network to update the tracking area (or RAN notification area) (periodically or if the UE escapes the tracking area (or RAN notification area), the UE may transition to the RRC-connected mode 4e-03 in step 4e-10.

The UE in the RRC-inactive mode 4e-03 may transition to the RRC-idle mode 4e-01 as directed by the network, according to a prearranged configuration, or by itself in step 4e-25. If there is a large number of UEs in the RRC-inactive mode, signaling overhead of the network may increase due to the frequent RAN notification area update procedure, so the operation should be supported. The UE having a predetermined goal may transmit data even in the RRC-inactive mode 4e-03 without transitioning to the RRC-connected mode, repeat transition between the RRC-inactive mode and the RRC-idle mode as directed by the network, and transition to the RRC-connected mode only as necessary.

In the procedure, the UE in the RRC-inactive mode may transmit data in the RRC-inactive mode and may thus have an advantage of a very short transmission delay and very small signaling overhead. The predetermined goal may correspond to the case in which the UE transmits only small data or the case in which the UE transmits data intermittently or periodically with a very long period. Further, the UE in the RRC-idle mode 4e-01 may be directly transitioned to the RRC-inactive mode 4e-03 by the network or may transition to the RRC-connected mode and then to the RRC-inactive mode in step 4e-03 or 4e-20.

In order to solve the problem of state mismatch between the UE mode during the transition between the modes and the UE mode recognized by the network, the UE may configure and drive an additional timer (inactive timer). Also, the base station may drive an additional timer.

In an embodiment of the disclosure, it is assumed that the RRC-inactive mode and the lightly connected mode are the same mode and the UE performs the operation therein. Further, it is assumed that, although the RRC-inactive mode and the lightly connected mode are considered to be the same mode, the UE may perform different operations therein. In addition, it is assumed that the RRC-inactive mode and the lightly connected mode are considered to be different modes from each other, and the UE may perform different operations therein. As described above, the RRC-inactive mode and the lightly connected mode have the same goal in that they are modes in which rapid access is possible and battery consumption is reduced through small signaling, but the two modes may be the same mode or different modes depending on the implementation in the UE and the network and the definition thereof. The UE operation in the RRC-inactive mode and the lightly connected mode may be the same as the operation in the RRC-idle mode, or may have an additional function or only some functions of the operation in the RRC-idle mode.

As described above, the RRC-inactive mode has an advantage in that battery consumption of the UE is reduced, signaling overhead is small when the UE accesses the network, and radio access is configured. However, the UE in the RRC-inactive mode is required to perform a procedure of updating the RAN notification area more frequently than the RRC-idle mode UE performing a procedure of updating the tracking area periodically. Accordingly, if there is a great number of UEs in the RRC-inactive mode in the network, signaling overhead may increase due to the procedure of periodically updating the RAN notification area, and thus the network should manage the UEs in the RRC-inactive mode and switch the UEs to the RRC-idle mode as necessary.

Figure 4F:
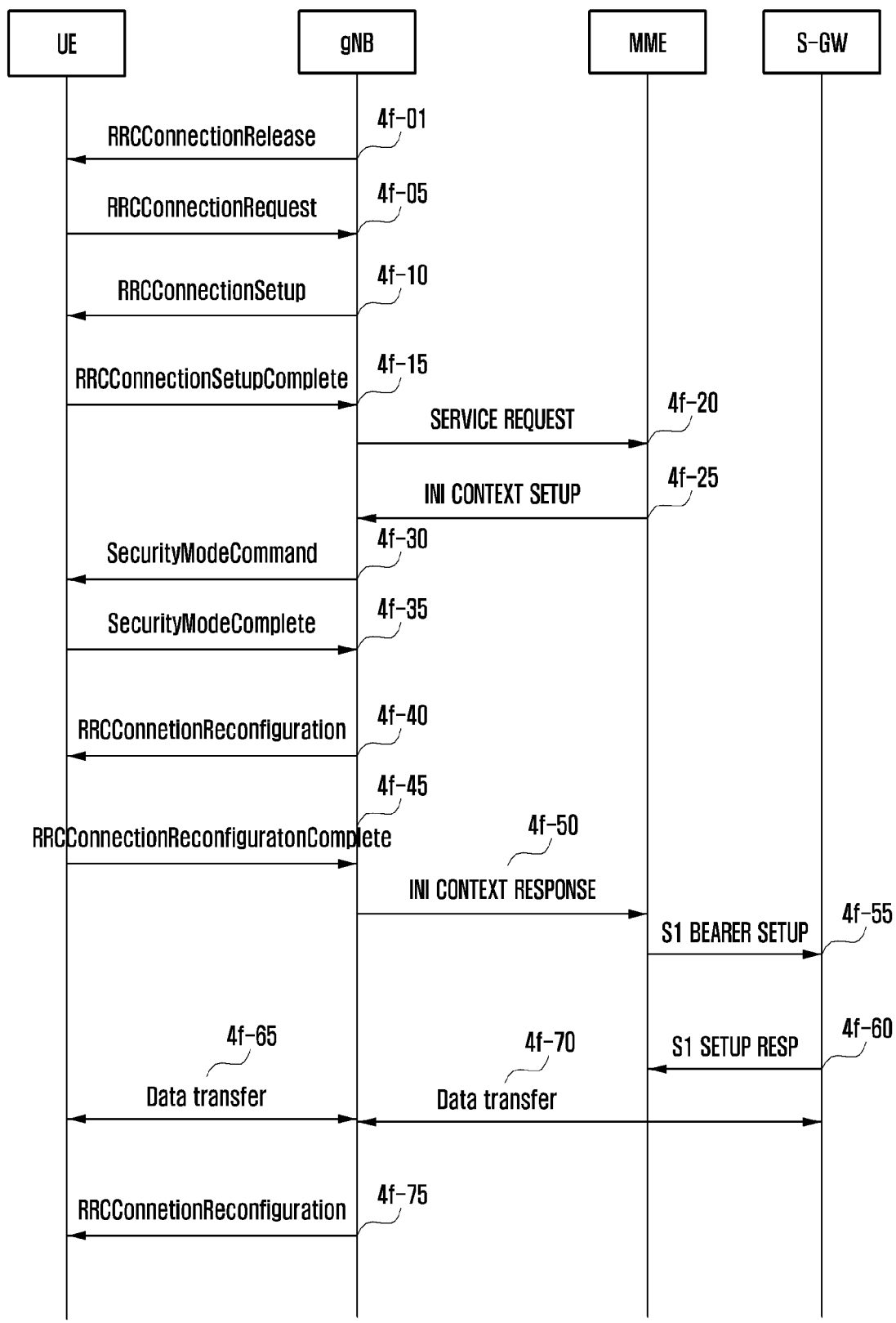
FIG. 4F illustrates a procedure in which the RRC-idle mode UE transitions to the RRC-connected mode according to an embodiment of the disclosure.

FIG. 4F illustrates a procedure in which the RRC-idle mode UE transitions to the RRC-connected mode according to an embodiment of the disclosure.

In FIG. 4F, if the UE currently having no configuration of the connection to the gNB (hereinafter, referred to as an idle mode UE) has data to be transmitted, the UE performs an RRC connection establishment process with the gNB. The UE establishes backward transmission synchronization with the gNB through a random-access process and transmits an RRCConnectionRequest message to the gNB in step 4f-05. The message includes a reason (establishmentCause) for establishing the connection with an identifier of the UE. The gNB transmits an RRCConnectionSetup message to allow the UE to configure the RRC connection in step 4f-10. The message includes RRC connection configuration information. The message may include information on whether data can be transmitted in an RRC-inactive mode (for example, information indicating whether data can be transmitted through a preamble, message 3, or message 5) and indication information of a bearer or a logical channel through which data can be transmitted in the RRC-inactive mode. (For example, data can be transmitted through the preamble, message 3 or message 5 in the RRC-inactive mode only for the indicated logical channel or bearer, and the configured logical channel or bearer may maintain the active state without stopping in the RRC-inactive mode. That is, it is ready to transmit data.) If data is transmitted in the RRC-inactive mode, available scheduling request (SR) transmission resources may be allocated through the message, in which case only one SR transmission resource may be allocated, or SR transmission resources may be allocated for each logical channel or each bearer. In order to make the UE indicate to the base station that the UE will transmit data in the RRC-inactive mode, the information indicating which preamble should be used (that is, if the RRC-inactive UE performs a random-access procedure using the configured preamble, the gNB may allocate more transmission resources) may be configured in the message.

The RRC connection is also referred to as a Signaling Radio Bearer (SRB), and is used for transmitting and receiving an RRC message, which is a control message between the UE and the gNB. The UE establishing the RRC connection transmits an RRCConnectionSetupComplete message to the gNB in s4f-15. The message may include a control message corresponding to a service request by which the UE makes a request for establishing a bearer for a predetermined service to the MME. The gNB transmits the SERVICE REQUEST message included in the RRCConnectionSetupComplete message to the MME or the AMF in step 4f-20, and the MME or the AMF determines whether to provide the service requested by the UE. If it is determined to provide the service requested by the UE on the basis of the determination result, the MME or the AMF transmits an INITIAL CONTEXT SETUP REQUEST message to the gNB in step 4f-25. The message includes Quality of Service (QoS) information to be applied to Data Radio Bearer (DRB) configuration and security-related information to be applied to the DRB (for example, a security key and a security algorithm). The gNB exchanges a SecurityModeCommand message in step 4f-30 and a SecurityModeComplete message in step 4f-35 in order to configure security with the UE.

If security has been completely set, the gNB transmits an RRCConnectionReconfiguration message to the UE in step 4f-40. The message may include information on whether data can be transmitted in an RRC-inactive mode (for example, information indicating whether data can be transmitted through a preamble, message 3, or message 5) and indication information of a bearer or a logical channel through which data can be transmitted. In the RRC-inactive mode. (For example, data can be transmitted through the preamble, message 3, or message 5 in the RRC-inactive mode only for the indicated logical channel or bearer, and the configured logical channel or bearer may maintain the active state without stopping in the RRC-inactive mode. That is, it is ready to transmit data.) The RRC message may include security configuration information to be used when the connection configuration is performed again in the future (for example, NexthopChainingCount (NCC) information). If data is transmitted in the RRC-inactive mode, available scheduling request (SR) transmission resources may be allocated through the message, in which case only one SR transmission resource may be allocated or SR transmission resources may be allocated for each logical channel or each bearer. In order to make the UE indicate to the base station that the UE will transmit data in the RRC-inactive mode, the information indicating which preamble should be used (that is, if the RRC-inactive UE performs a random-access procedure using the configured preamble, the gNB may allocate more transmission resources) may be configured in the message. The message includes configuration information of the DRB for processing user data, and the UE configures the DRB by applying the information and transmits an RRC-ConnectionReconfigurationComplete message to the gNB in step 4f-45.

The gNB, having completely established the DRB with the UE, transmits an initial context setup complete message to the MME in step 4f-50, and the MIME, having received the initial context setup complete message, exchanges an S1 BEARER SETUP message and an S1 BEARER SETUP RESPONSE message in order to establish an S1 bearer with the S-GW in steps 4f-55 and 4f-60. The S1 bearer is a connection for data transmission established between the S-GW and the gNB, and corresponds one-to-one to the DRB. When the process is completed, the UE transmits and receives data to and from the gNB through the S-GW in steps 4f-65 and 4f-70.

As described above, the general data transmission process broadly consists of three steps, namely RRC connection setup, security setup, and DRB setup. Further, the gNB may transmit an RRC Connection Reconfiguration message in order to provide a new configuration to the UE or add or change the configuration for a predetermined reason in step 4f-75. The message may include information on whether data can be transmitted in an RRC-inactive mode (for example, information indicating whether data can be transmitted through a preamble, message 3, or message 5) and indication information of a bearer or a logical channel through which data can be transmitted in the RRC-inactive mode. (For example, data can be transmitted through the preamble, message 3, or message 5 in the RRC-inactive mode only for the indicated logical channel or bearer, and the configured logical channel or bearer may maintain the active state without stopping in the RRC-inactive mode. That is, it is ready to transmit data.) The RRC message may include security configuration information to be used when the connection configuration is performed again in the future (for example, NexthopChainingCount (NCC) information). If data is transmitted in the RRC-inactive mode, available scheduling request (SR) transmission resources may be allocated through the message, in which case only one SR transmission resource may be allocated, or SR transmission resources may be allocated for each logical channel or each bearer. In order to make the UE indicate to the base station that the UE will transmit data in the RRC-inactive mode, the information indicating which preamble should be used (that is, if the RRC-inactive UE performs a random-access procedure using the configured preamble, the gNB may allocate more transmission resources) may be configured in the message.

As described above, for transition from the RRC-idle mode to the RRC-connected mode, many signaling procedures are needed. Accordingly, in the next-generation mobile communication system the RRC-inactive mode or the lightly connected mode may be newly defined, and since the LTE and the gNB store a UE context in the new mode and maintain the S1 bearer as necessary, more rapid access is possible through a smaller number of signaling procedures.

Figure 4G:
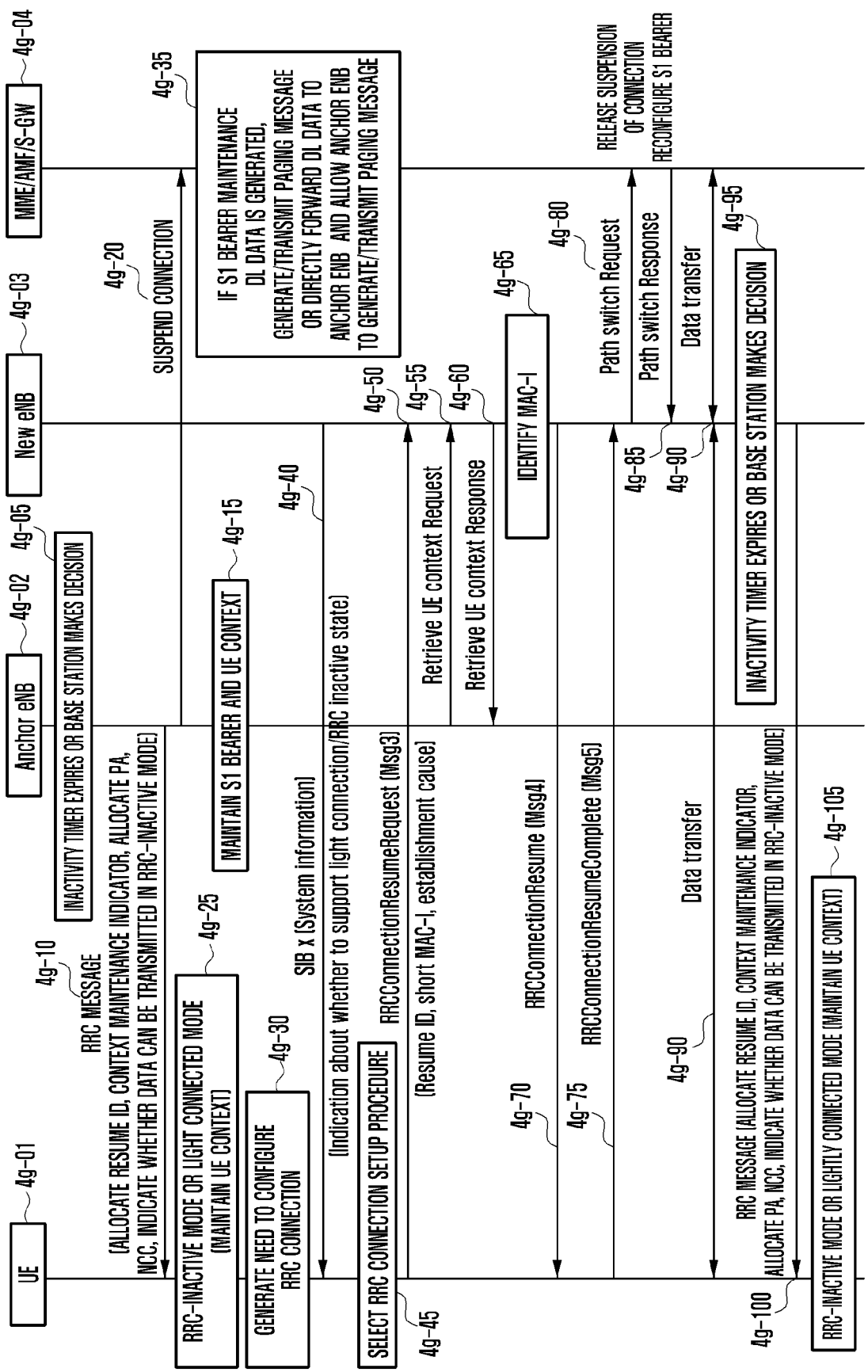
FIG. 4G illustrates a procedure in which the UE transitions from the RRC-connected mode to the RRC-inactive mode (or lightly connected mode) and a procedure in which the UE transitions from the RRC-inactive mode (or lightly connected mode) to the RRC-connected mode.

FIG. 4G illustrates a procedure in which the UE transitions from the RRC-connected mode to the RRC-inactive mode (or lightly connected mode) and a procedure in which the UE transitions from the RRC-inactive mode (or lightly connected mode) to the RRC-connected mode according to an embodiment of the disclosure.

FIG. 4G shows the overall flow between a LT 4g-01, an anchor gNB 4g-02, a new gNB 4g-03, and an MME/AMF/S-GW 4g-04 in order to perform a procedure in which the UE and the gNB reuse UE context and an S1 bearer. The UE 4g-01 in the RRC-connected state transmits and receives data to and from the gNB. If data transmission and reception are stopped, the anchor gNB 4g-02 may drive a predetermined timer, and may consider to release the RRC connection of the UE if data transmission and reception are not resumed before the timer expires in step 4g-05. The anchor gNB 4g-02 may determine whether to make the UE 4g-01 enter the RRC-idle mode or the RRC-inactive mode according to a predetermined condition. The predetermined condition may be the amount of network traffic, the amount of UE context that the network can maintain, and the number of UEs to which the network provides a service.

In step 4g-10, the anchor gNB 4g-02 may transmit the RRCConnectionRelease message, the RRCConnectionSuspend message, the RRC Connection Reconfiguration message, or a newly defined RRC message, or may reuse and transmit other conventional RRC messages in order to make the UE 4g-01 enter the RRC-inactive mode or the lightly connected mode. Through the message in step 4g-10, the anchor gNB 4g-02 may release the RRC connection of the UE 4g-01 according to a predetermined rule, store a UE context, transmit a control message indicating the release of the RRC connection to the UE 4g-01, allocate a resume ID, and then configure a paging area (PA) in which the UE 4g-01 reports mobility during the lightly connected mode. At this time, through the allocation of the resume ID, the UE 4g-01 may know that a UE context should be stored, or the anchor gNB 4g-02 may transmit a separate context maintenance indication instructing the UE 4g-01 to operate in the RRC-inactive mode/lightly connected mode and the UE 4g-01 to store a UE context through the message in step 4g-10. Further, the message may include security information for updating security settings required for the RRC connection resume procedure performed by the UE in the future. For example, the may receive NextHopChainingCount (NCC) in advance and calculate and configure a new security key (KeNB* or KgNB*) using the NCC. Further, the control message may include a period for which the anchor gNB 4g-02 maintains the context or a list of cells to which the procedure using the stored context can be applied when the UE 4g-01 desires to reconfigure the RRC connection within an expiration date. The message may include information on whether data can be transmitted in an RRC-inactive mode (for example, information indicating whether data can be transmitted through a preamble, message 3, or message 5) and indication information of a bearer or a logical channel through which data can be transmitted in the RRC-inactive mode. (For example, data can be transmitted through the preamble, message 3, or message 5 in the RRC-inactive mode only for the indicated logical channel or bearer, and the configured logical channel or bearer may maintain the active state without stopping in the RRC-inactive mode. That is, it is ready to transmit data.) Further, a plurality of paging areas may be configured in the message in order to indicate, to the UE 4g-01, whether data can be transmitted in the RRC-inactive mode through the RRC message (for example, indicate whether data can be transmitted through a preamble, message 3, or message 5). (For example, the gNB may indicate a paging area in which the data cannot be transmitted among the plurality of paging areas.) The RRC message may include security configuration information to be used when the connection configuration is performed again in the future (for example, NexthopChainingCount (NCC) information). If data is transmitted in the RRC-inactive mode, available scheduling request (SR) transmission resources may be allocated through the message, in which case only one SR transmission resource may be allocated, or SR transmission resources may be allocated for each logical channel or each bearer. In order to make the UE 4g-01, indicate to the anchor gNB 4g-02 that the UE 4g-01 will transmit data in the RRC-inactive mode, the information indicating which preamble should be used may be configured in the message (that is, if the RRC-inactive UE performs a random-access procedure using the configured preamble, the anchor gNB 4g-02 may allocate more transmission resources).

After releasing the RRC connection of the UE, the anchor gNB 4g-02 maintains the UE context and the S1 bearer in step 4g-15. The S1 bearer refers to an S1-control bearer used to exchange a control message between the anchor gNB 4g-02 and the MIME 4g-04 and an S1-use plane bearer used to exchange user data between the anchor gNB 4g-02 and the S-GW 4g-04. By maintaining the S1 bearer, a procedure for configuring the S1 bearer may be omitted when the UE 4g-01 configures the RRC connection in the same cell or the same anchor gNB 4g-02. When the data expires, the anchor gNB 4g-02 may delete the LTE context and release the S1 bearer. The LTE 4g-01 receiving the RRC connection release message in step 4g-10 transitions to the RRC-inactive mode/lightly connected mode.

The anchor gNB refers to the anchor gNB 4g-02 that maintains and manages the UE context (resume ID) of the UE in the RRC-inactive mode and manages a RAN paging area (or a RAN notification area) to manage the mobility of the UE in the RRC-inactive mode 4g-01. The role of the anchor gNB described above may be performed by the access and mobility management function (AMF) 4g-04 instead of the anchor gNB.

The anchor gNB 4g-02 transmits a control message that makes a request for suspending the connection to the MME 4g-04 or the AMF 4g-04 in step 4g-20. The 4g-04, having received the control message, may directly transmit downlink data to the anchor gNB 4g-02 when the S-GW 4g-04 has the downlink data for the UE 4g-01, and the anchor gNB 4g-02 may generate a paging message and transmit the paging message to a new gNB 4g-03 in step 4g-35. That is, the anchor gNB 4g-03 receiving the downlink data stores the data in the buffer and performs a paging procedure. The anchor gNB 4g-03 is a gNB that maintains the UE context of the UE 4g-01 and the S1-U bearer. Alternatively, if there is no response from the UE after the anchor gNB 4g-02 transmits the paging message, that is, if paging fails, the anchor gNB 4g-02 may make a request for a paging procedure to the MME 4g-04 or the AMF 4g-04. The downlink data for the LT generated by the S-GW 4g-04 is not transmitted to the gNB, a request for initiating the paging procedure may be made to the MME 4g-04, and the S-GW 4g-04 may operate according thereto in step 4g-35.

The LT 4g-01, having received the information indicating the maintenance of the context and the RRC connection release message including the resume ID in step 4g-10, may release the RRC connection, but may drive a timer corresponding to an expiration date, record a valid cell list in the memory, maintain the current LT context in the memory without deletion in step 4g-25, and transition to the lightly connected mode. The LT context refers to various pieces of information related to RRC configuration of the IT 4g-01, and includes SRB configuration information, DRB configuration information, and security key information.

Thereafter, for some reason, the need to configure the RRC connection arises in step 4g-30. The UE, which has not received the resume ID or an indication that the context is maintained during the RRC connection release process, initiates the general RRC connection setup process (FIG. 4F) illustrated in FIG. 4F. The RRC-inactive mode lightly connected mode UE receiving the resume ID during the previous RRC connection release process may attempt the RRC connection resume process using the stored UE context. The UE 4g-01 in the RRC-inactive mode/lightly connected mode may perform the general RRC connection setup process (FIG. 4F according to whether the network supports the RRC-inactive mode/lightly connected mode, and may perform the RRC connection resume process using the stored UE context. That is, the general RRC connection setup procedure (FIG. 4F) may be performed if the RRC-inactive mode/lightly connected mode is not supported, and the RRC connection resume procedure may be performed as follows if the RRC-inactive mode/lightly connected mode is supported.

The RRC-inactive mode may be always supported by the network (accordingly, the system information does not separately indicate whether the RRC-inactive mode is supported). Alternatively, each gNB or each cell may transmit system information including an indication indicating whether each gNB or each cell supports the lightly connected mode. Further, the system information may include information on whether data can be transmitted in an RRC-inactive mode (for example, information indicating whether data can be transmitted through a preamble, message 3, or message 5) and indication information of a bearer or a logical channel through which data can be transmitted in the RRC-inactive mode. (For example, data can be transmitted through the preamble, message 3, or message 5 in the RRC-inactive mode only for the indicated logical channel or bearer, and the configured logical channel or bearer may maintain the active state without stopping in the RRC-inactive mode. That is, it is ready to transmit data.) If data is transmitted in the RRC-inactive mode, available scheduling request (SR) transmission resources may be allocated through the system information, in which case only one SR transmission resource may be allocated, or SR transmission resources may be allocated for each logical channel or each bearer. In order to make the UE 4g-01 indicate to the base station that the UE will transmit data in the RRC-inactive mode, the information indicating which preamble should be used may be configured in the system information (that is, if the RRC-inactive UE performs a random-access procedure using the configured preamble, the base station may allocate more transmission resources).

The information may be included in a second block of the system information (system information block 2) or in blocks of other system information (system information blocks 1 to 19). Supporting the lightly connected mode means that the corresponding gNB or the corresponding cell may configure and support the following procedures in steps 4g-50, 4g-55, 4g-60, 4g-4g-70, 4g-75, 4g-80, 4g-85, and 4g-90. If the need to configure the RRC connection is generated, the lightly connected mode UE 4g-01 currently reads system information of the cell on which the UE currently camps. If the system information does not include the indication indicating that the new gNB 4g-03 or the cell supports the lightly connected mode (or RRC-inactive mode), the UE may perform the general RRC connection setup process (FIG. 4F) illustrated in FIG. 4F in step 4g-45. However, if the system information includes the indication indicating that the new gNB 4g-03 or the cell supports the lightly connected mode (or RRC-inactive mode), the UE 4g-01 may perform the RRC connection resume process using the stored UE context n step 4g-45. The RRC connection resume process using the stored. UE context s described below.

First, the UE 4g-01 transmits a preamble through message 1 in order to perform a random-access procedure. If resource allocation is possible according to the preamble received through message 1, the new gNB 4g-03 allocates uplink resources corresponding thereto to the UE 4g-01 through message 2. The UE 4g-01 transmits a resume request message including the resume ID received in step 4g-10 on the basis of the received uplink resource information in step 4g-50. The message may be a message modified from the RRCConnectionRequest message or a newly defined message (for example, RRCConnectionResumeRequest). If the lightly connected mode UE 4g-01, the connection of which is released by the conventional anchor gNB 4g-02, moves to and camps on a cell of another gNB, the new gNB 4g-03 may receive and identify the resume ID of the UE and recognize the gNB from which the corresponding UE 4g-01 previously received the service.

If the new gNB 4g-03 successfully receives and identifies the resume ID, the anchor gNB 4g-02 performs a procedure for retrieving the UE context (Context Retrieve Procedure) in steps 4g-55 and 4g-60. If the procedure for retrieving the UE context fails for a predetermined reason indicating that, for example, the anchor/source gNB cannot be found or there is no UE context, the new gNB 4g-03 may transmit the RRCConnectionSetup message as illustrated in FIG. 4F instead of the RRCConnectionResume message, perform fallback from the bearer setup procedure/security setup procedure to the RRC connection setup procedure illustrated in FIG. 4F, complete the security configuration, and make the UE 4g-01 enter the RRC-connected mode or transmit the RRCConnectionSuspend message along with a new UE ID (resume ID) and the RAN paging area to make the UE 4g-01 enter back the RRC-inactive mode. The UE context may be retrieved by the new gNB 4g-03 from the anchor gNB 4g-02 through an S1 or X2 interface (if the new gNB 4g-03 receives the resume ID but does not successfully identify the UE for predetermined reason, the new gNB 4g-03 may transmit the RRCConnectionSetup message to the UE 4g-01 and return to the general RRC connection setup procedure illustrated in FIG. 4F. That is, if the RRCConnectionSetup message is transmitted to the UE 4g-01 and the UE receives the message, the UE, may transmit the RRCConnectionSetupComplete message to the new gNB 4g-03 and configure the connection. Alternatively, if the new gNB 4g-03 receives the resume ID but does not successfully identify the UE (for example, if the new gNB fails in retrieving the UE context from the conventional anchor gNB 4g-02), the new gNB 4g-03 may transmit the RRCConnectionRelease message or the RRCConnectionReject message to the UE 4g-01 to reject the connection of the UE 4g-01 and make the UE attempt the general RRC connection setup procedure illustrated in FIG. 4F again from the beginning).

The new gNB 4g-03 identifies a MAC-I on the basis of the retrieved UE context in step 4g-65. The MAC-I is a message authentication code obtained by the UE 4g-01 for a control message by applying security information of the reconstructed UE context, that is, a security key and a security count. The new gNB 4g-03 identifies the integrity of the message on the basis of the MAC-I of the message and the security key and the security counter stored in the UE context. The new gNB 4g-03 determines the configuration to be applied to the RRC connection of the UE and transmits the configuration information to the UE 4g-01 through an RRC connection resume message (RRCConnectionResume) in step 4g-70. The RRC connection resume message may be transmitted after the new gNB 4g-03 identifies the UE ID (resume ID) of the UE 4g-01 and encrypts the message using a new security key (KeNB* or KgNB*), and the UE 4g-01 may normally receive the RRC connection resume message by decrypting the message using the new security key (KeNB* or KgNB*) obtained using NCC pre-allocated in step 4g-10. After the procedure for transmitting the RRC connection resume message, the RRC messages and data may be encrypted using a new security and then transmitted and received by the UE 4g-01 and the new gNB 4g-03.

The RRC connection resume message may be a control message including information indicating "RRC context reuse" (reuse indicator) in the general RRC connection request message. The RRC connection resume message may include various pieces of information related to the RRC connection setup of the UE 4g-01, like the RRC connection setup message. If the UE 4g-01 receives the general RRC connection setup (RRCConnectionSetup) message, the UE 4g-01 configures the RRC connection on the basis of the configuration information indicated by the RRC connection setup message. However, if the UE receives the RRC connection resume message, the UE configures the RRC connection in consideration of both the stored configuration information and the configuration information indicated by the control message (Delta configuration). For example, the UE 4g-01 may determine configuration information to be applied and update the configuration information or the UE context on the basis of the assumption that the indicated configuration information is delta information of the stored configuration information. For example, if the RRC connection resume message includes SRB configuration information, the UE 4g-01 may apply the indicated SRB configuration information to configure the SRB. If the RRC connection resume message does not include the SRB configuration information, the UE 4g-01 may apply SRB configuration information stored in the UE context to configure the SRB.

The UE 4g-01 applies the updated UE context and configuration information to configure the RRC connection and transmits the RRC connection resume complete message to the new gNB 4g-03 in step 4g-75. The new gNB 4g-03 transmits a control message that makes a request for releasing connection suspension to the MME 4g-04 or the ANT 4g-04 and makes a request for reconfiguring the S1 bearer to the new gNB 4g-03 in steps 4g-80 and 4g-85. Upon receiving the message, the MME 4g-04 or the AMF 4g-04 reconfigures the S1 bearer to the new gNB 4g-03 and instructs the S-GW 4g-04 to process data normally for the UE 4g-01. If the process is completed, the UE 4g-01 reinitiates data transmission and reception in the cell in step 4g-90.

In the procedure, if the lightly connected mode UE 4g-01, the connection of which is released by the conventional anchor gNB 4g-02, moves a little and camps again on the cell of the conventional anchor gNB 4g-02, the conventional anchor gNB 4g-02 may perform only the release of connection suspension of the S1 bearer instead of steps 4g-80 and 4g-85 without the procedures of steps 4g-55 and 4g-60, search a UE context of the UE with reference to the resume ID indicated by message 3, and reconfigure the connection through a method similar to the above procedures on the basis thereof.

If data transmission and reception are stopped, the new gNB 4g-03 drives a predetermined timer, and, if the data transmission and reception are not initiated until the timer expires in step 4g-95, the new gNB 4g-03 considers the release of the RRC connection of the UE 4g-01. In step 4g-100, the new gNB 4g-03 may transmit the RRC Connection Release message, the RRC Connection Suspend message, the RRC Connection Reconfiguration message, or a newly defined RRC message, or may reuse and transmit other conventional RRC messages in order to make the UE enter the RRC-inactive state or the lightly connected state. In step 4g-100, the new gNB 4g-03 releases the RRC connection of the UE 4g-01 according to a predetermined rule, stores a UE context, transmits a control message indicating the release of the RRC connection to the UE 4g-01, allocates a new UE ID (resume ID), and then configures a RAN paging area (or a RAN notification area) in which the UE 4g-01 reports mobility during the lightly connected mode. If the UE in the RRC-inactive mode escapes the configured RAN paging area, the UE performs a procedure for updating the RAN paging area in step 4g-105.

The message may include information on whether data can be transmitted in an RRC-inactive mode (for example, information indicating whether data can be transmitted through a preamble, message 3, or message 5) and indication information of a bearer or a logical channel through which data can be transmitted in the RRC-inactive mode. (For example, data can be transmitted through the preamble, message 3, or message 5 in the RRC-inactive mode only for the indicated logical channel or bearer, and the configured logical channel or bearer may maintain the active state without stopping in the RRC-inactive mode. That is, it is ready to transmit data.) Further, a plurality of paging areas may be configured in the message in order to indicate, to the UE, whether data can be transmitted in the RRC-inactive mode through the RRC message (for example, indicate whether data can be transmitted through a preamble, message 3, or message 5). (For example, the gNB may indicate a paging area in which the data cannot be transmitted among the plurality of paging areas.) The RRC message may include security configuration information to be used when the connection configuration is performed again in the future (for example, NexthopChainingCount (NCC) information). If data is transmitted in the RRC-inactive mode, available scheduling request (SR) transmission resources may be allocated through the message, in which case only one SR transmission resource may be allocated or SR transmission resources may be allocated for each logical channel or each bearer. In order to make the UE indicate to the base station that the UE will transmit data in the RRC-inactive mode, the information indicating which preamble should be used (that is, if the RRC-inactive UE performs a random-access procedure using the configured preamble, the gNB may allocate more transmission resources) be configured in the message.

In the next-generation mobile communication system, the gNB may configure a UE ID (resume ID) which can be used when the RRC connection is attempted in the future and a RAN paging area (or RAN notification area) in which the UE reports mobility while configuring the UE as in the RRC-inactive mode. Further, the gNB may configure a NexthopChainingCount (NCC) value for security configuration to be used in the future connection setup process.

In the next-generation mobile communication system, the RRC-inactive UE performs a tracking area update (TAU) procedure if the RRC-inactive UE escapes a tracking area (TA) (or TA list) configured by the network/MME/core network (CN), and performs a RAN paging area update procedure if the RRC-inactive UE escapes a RAN paging area (or RAN notification area) configured by access and mobility management function (AMF) or the anchor gNB. The network may provide a response through various messages according to the network state when the UE in the RRC-inactive mode performs the RAN paging area update procedure, and embodiments of the disclosure propose a message transmission/reception procedure considering various cases.

Figure 4H:
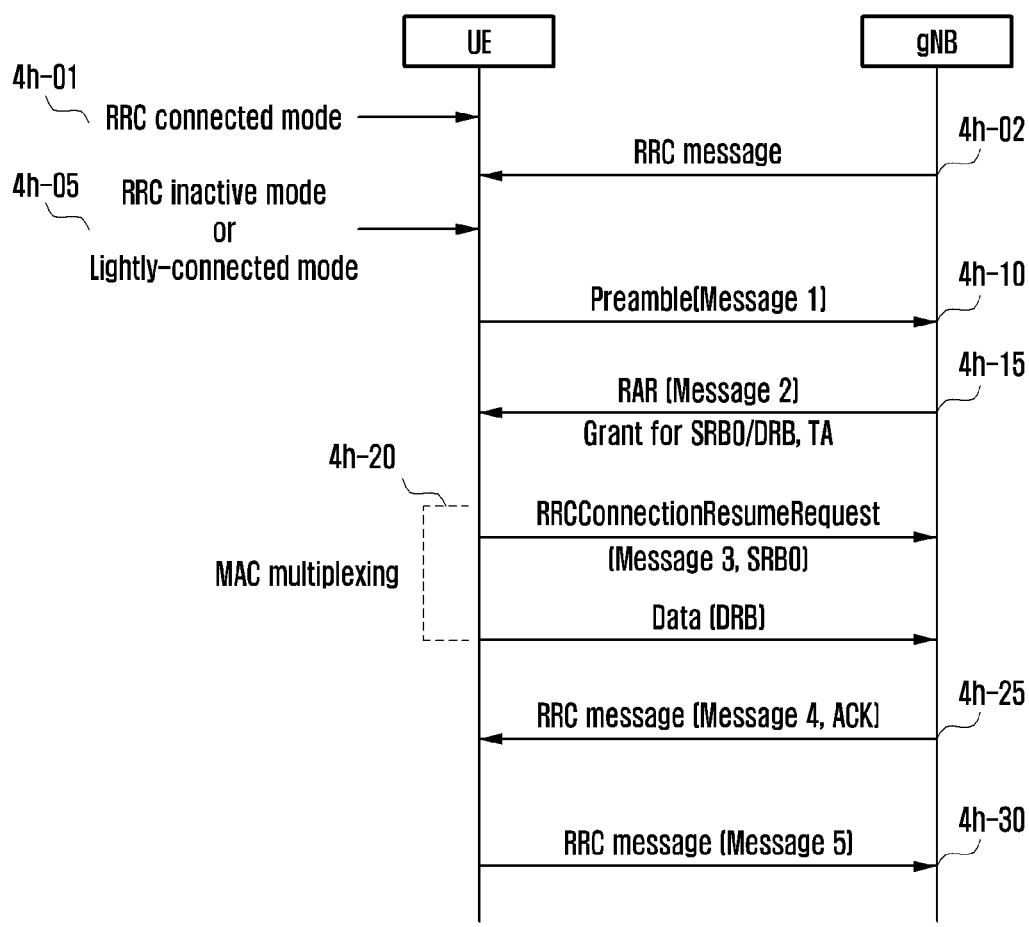
FIG. 4H illustrates Embodiment 4-1, in which the UE in the RRC-inactive mode transmits uplink data in the RRC-inactive mode before transitioning to the RRC-connected mode according to an embodiment of the disclosure.

FIG. 4H illustrates Embodiment 4-1, in which the RRC-connected mode UE transmits uplink data in the RRC-inactive mode before transitioning to the RRC-connected mode.

In FIG. 4H, the UE transmitting and receiving data in the RRC-connected mode 4h-01 may be transitioned to the RRC-inactive mode 4h-05 by the network for a predetermined reason. The predetermined reason may be non-transmission/reception of data between the UE and the network, or may correspond to a determination by the network. In operation 4h-02, the network may transition the UE from the RRC-connected mode to the RRC-inactive mode by transmitting an RRC message to the UE. The RRC message may reuse the RRC connection suspend message, the RRC connection reconfiguration message, the RRC connection release message, or other conventional RRC messages, or may define and use a new RRC message. The RRC message may include information on whether data can be transmitted in an RRC-inactive mode (for example, information indicating whether data can be transmitted through a preamble, message 3, or message 5) and indication information of a bearer or a logical channel through which data can be transmitted in the RRC-inactive mode. (For example, data can be transmitted through the preamble, message 5, or message 4 in the RRC-inactive mode only for the indicated logical channel or bearer, and the configured logical channel or bearer may maintain the active state without stopping in the RRC-inactive mode. That is, it is ready to transmit data.) Further, a plurality of paging areas may be configured in the message in order to indicate, to the UE, whether data can be transmitted in the RRC-inactive mode through the RRC message (for example, indicate whether data can be transmitted through a preamble, message 3, or message 5). (For example, the base station may indicate a paging area in which the data cannot be transmitted among the plurality of paging areas.) The RRC message may include security configuration information to be used when the connection configuration is performed again in the future (for example, NexthopChainingCount (NCC) information). If data is transmitted in the RRC-inactive mode, available scheduling request (SR) transmission resources may be allocated through the message, in which case only one SR transmission resource may be allocated, or SR transmission resources may be allocated for each logical channel or each bearer. In order to make the UE indicate to the base station that the UE will transmit data in the RRC-inactive mode, the information indicating which preamble should be used may be configured in the message (that is, if the RRC-inactive UE performs a random-access procedure using the configured preamble, the base station may allocate more transmission resources)

The UE receiving the RRC message and transitioning to the RRC-inactive mode (or the lightly connected mode) may have a UE context and uplink data to be transmitted. The UE context may include bearer configuration information such as a signaling radio bearer (SRB) or a data radio bearer (DRB) and also logical channel configuration information or security configuration information. Further, the UE may include PDCP device configuration information which is the same as that used in the RRC-connected state (for example, a PDCP COUNT value or PDCP sequence number). The UE may further include device configuration information that is the same as that used in the RRC-connected Mate. If a logical channel or a bearer through which data can be transmitted in the RRC-inactive mode is configured in the RRC message, the UE may maintain the active state to transmit data without deactivating or stopping the logical channel or the bearer.

If the UE has uplink data to be transmitted and the RRC message indicates that the UE can transmit data in the RRC-inactive mode, the UE prepares to transmit data in the RRC-inactive mode. The information indicating that the UE can transmit data in the RRC-inactive mode may be indicated by an indicator in the RRC message, or may correspond to the case in which the UE belongs to a paging area indicated by the RRC message, in which case the UE can transmit data in the RRC-inactive mode. If information indicating whether data can be transmitted in the RRC-inactive mode is indicated for each logical channel or each bearer, transmission of the data may be prepared only for the indicated logical channel or bearer.

If it is determined that the UE transmits data in the RRC-inactive mode, the UE synchronizes with a suitable cell and performs a random-access procedure (if the base station has already allocated SR transmission resources to be used for transmission of the data in the RRC-inactive mode to the UE, transmission resources may be requested using the SR transmission resources). The UE may transmit a preamble to the base station through a first message of the random access in step 4h-10. If the base station configures a preamble group to be used for transmission of the data in the RRC-inactive mode in the UE, the UE may select a preamble in the preamble group and transmit the selected preamble to the base station. Accordingly, the UE may make a request for allocating large transmission resources to the base station to transmit data through message 3. Groups of the preambles may be partitioned into a plurality of subgroups, and the subgroups may be categorized according to whether the UE transmits small data in the RRC-inactive mode/whether the UE makes a request for large transmission resources/the amount of transmission resources that are requested. That is, if the UE transmits a preamble belonging to a predetermined subgroup, the base station may identify the intent of the UE to transmit small data in the RRC-inactive state/the amount of transmission resources requested by the UE.

The base station, having received the preamble, identifies a subgroup to which the preamble belongs and allocates timing advance (TA) for proper timing and transmission resources through a random-access response (RAR) in order to allow the UE to transmit data in the RRC-inactive mode.

Upon receiving the RAR message, the UE may reestablish PDCP devices and RLC devices for SRBs/DRBs. If there is NexthopChainingCount (NCC) received through the RRC message when the UE transitions from the RRC-connected mode to the RRC-inactive mode, the UE may calculate new security keys (KeNB* or KgNB*) using the NCC and apply the security keys to perform encryption and integrity protection in the PDCP device. Further, the UE configures the MAC device and the PHY device according to the configuration stored in the HE context. If the procedure is completed, the UE generates an RRC Connection ResumeRequest message (or MAC CE), prepares to transmit the message through an SRB (or DRB), processes data, and prepares to transmit the data through the DRB. The MAC device multiplexes the RRC message to be transmitted through the SRB and the data to be transmitted through the DRB to configure the RRC message and the data into one MAC PDU and then transmits the MAC PDU within one TTI in step 4h-20.

After message 3 is transmitted, HARQ ACK/NACK transmission may be supported. The message may include a BSR indicating the amount of data remaining in the UE and an indication instructing the UE to continuously remain in the RRC-inactive state. Further, the message may include a UE ID (resume ID) for identifying the UE and short MAC-I for integrity protection. The base station, having successfully received the RRC message and the data, may identify the UE ID (resume ID), perform a procedure for retrieving a UE context from a fixed base station or a source base station (the base station having the UE context), complete PDCP/RLC/MAC/PHY device and security configuration on the basis of the UE context, inform the UE of successful reception of the data and the message by transmitting a newly defined RRC message or the conventional RRC message (RRC Connection Suspend, RRC Connection Resume, RRC Connection Release, or RRC Connection Reject) in response to the data and the message of the UE, and provide information on contention resolution of message 3 in step 4h-25. If the base station instructs the UE to be in the inactive mode, the base station may transmit the RRC Connection Resume message including an indicator therefor. If the base station instructs the UE to enter the idle mode, the base station may transmit the RRC Connection Resume message. If the base station instructs the UE to suspend transmission, the base station may transmit the RRC Connection Suspend message. If the base station instructs the UE to perform disconnection and then reconnection, the base station may transmit the RRC Connection Reject message. If there is a reserved or advance configuration, the base station may transmit the MAC CE. ACK of the data may be performed by ARQ of the RLC device. If the base station instructs the UE to enter the RRC-connected state, the base station may transmit the RRC Connection Resume message and transition the UE to the connected mode. If the UE receives the above RRC message through message 4, the UE may transmit an RRC Connection Resume Complete message or a newly defined RRC message to the base station through message 5 in response to the RRC Connection Resume Complete message in step 4h-30.

As illustrated in FIG. 4F or 4G, when the UE configures the initial connection, the bearer through which the UE can transmit data in the RRC-inactive mode may be configured through the RRC Connection Setup message or the RRC Connection Reconfiguration message. That is, some bearers may indicate that data can be transmitted in the RRC-inactive mode, and other bearers may indicate that data cannot be transmitted in the RRC-inactive node. In the case of the bearer through which the data can be transmitted in the RRC-inactive mode, the UE may itself activate the bearer before transmitting data in the RRC-inactive mode (since all bearers are suspended when the UE transitions to the RRC-inactive mode, the bearers should be activated for data transmission). For example, if the UE has data and receives resources for transmitting data through the bearer, if resources for transmitting data are prearranged with the network, if random access is successful, or if a preamble is transmitted and an RAR is received in a random-access procedure, the UE may itself activate the bearer. In the case of bearers through which the data cannot be transmitted in the RRC-inactive mode, the bearers may be activated only when the RRCConnectionResume message or the RRCConnectionSetup message is received.

If the UE in the RRC-inactive mode transmits data in the RRC-inactive mode without any procedure for transition to the RRC-connected mode, as described above, battery consumption of the UE may be reduced and signaling overhead of the network may be reduced.

The procedure in which the RRC-inactive mode transmits data along with message 3 without transitioning to the RRC-connected mode as described above may be determined based on a predetermined threshold. That is, the UE may transmit data along with message 3 before the procedure for transitioning to the RRC-connected mode if the UE has data smaller than a predetermined threshold, and may transition to the RRC-connected mode through the RRC connection resume procedure and transmit data as illustrated in FIG. 4G if the UE has data larger than the predetermined threshold. The threshold may be configured for each bearer or each logical channel in the message in step 4f-10, 4f-40, or 4f-75 of FIG. 4F.

In the procedure in which the UE transmits data in the RRC-inactive mode, the data may be transmitted along with message 1 or message 5 rather than message 3.

Figure 4I:
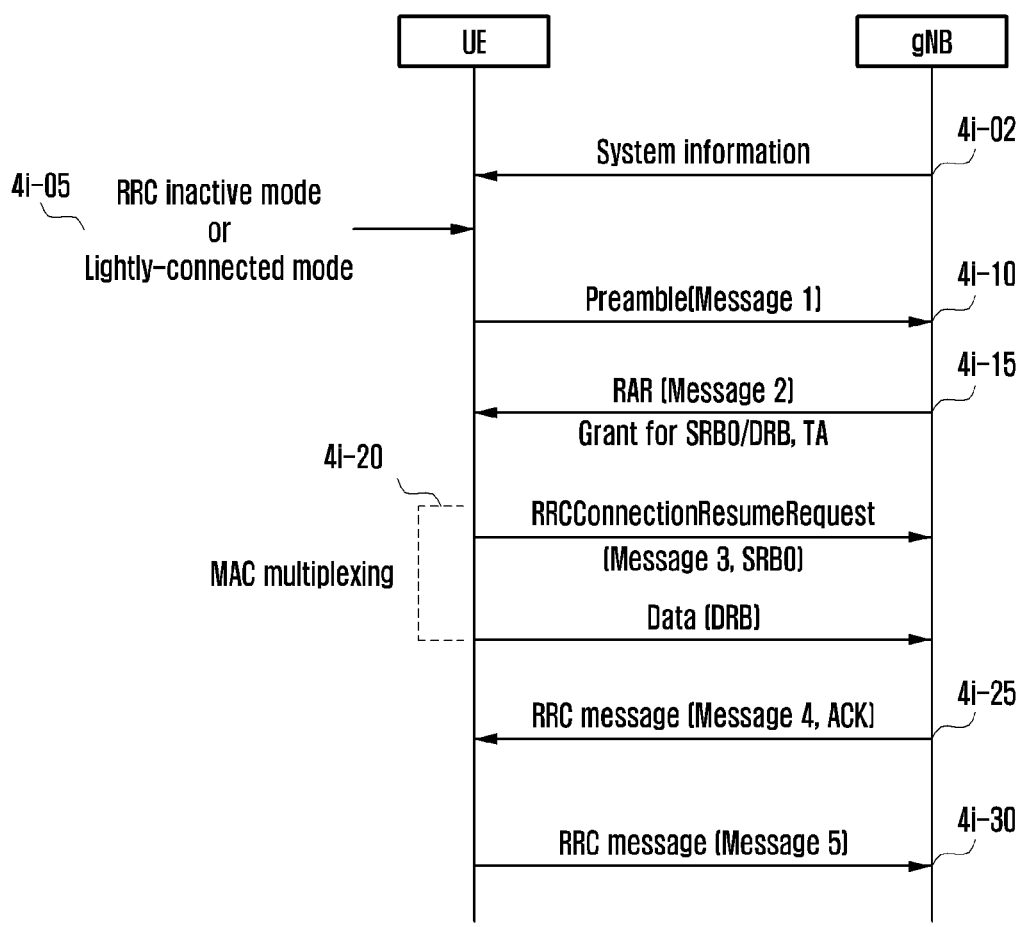
FIG. 4I illustrates Embodiment 4-2, in which the UE in the RRC-inactive mode transmits uplink data in the RRC-inactive mode before transitioning to the RRC-connected mode according to an embodiment of the disclosure.

FIG. 4I illustrates embodiment 4-2, in which the UE in the RRC-inactive mode transmits uplink data in the RRC-inactive mode before transitioning to the RRC-connected mode.

In FIG. 4I, if the UE in the RRC-inactive mode has uplink data to be transmitted, the UE may attempt to access the network in order to transmit the data. The UE may measure the intensity of neighboring cells to access the network, find a suitable cell, and read system information in step 4i-02. The system information may include information on whether data can be transmitted in an RRC-inactive mode (for example, information indicating whether data can be transmitted through a preamble, message 3, or message 5) and indication information of a bearer or a logical channel through which data can be transmitted in the RRC-inactive mode. (For example, data can be transmitted through the preamble, message 3, or message 5 in the RRC-inactive mode only for the indicated logical channel or bearer, and the configured logical channel or bearer may maintain the active state without stopping in the RRC-inactive mode. That is, it is ready to transmit data.) If data is transmitted in the RRC-inactive mode, available scheduling request (SR) transmission resources may be allocated through the system information, in which case only one SR transmission resource may be allocated, or SR transmission resources may be allocated for each logical channel or each bearer. In order to make the UE indicate to the base station that the UE will transmit data in the RRC-inactive mode, the information indicating which preamble should be used may be configured in the message (that is, if the RRC-inactive UE performs a random-access procedure using the configured preamble, the base station may allocate more transmission resources).

The UE transitioning to the RRC-inactive mode 4i-05 (or the lightly connected mode) may have a UE context and uplink data to be transmitted. The UE context may include bearer configuration information such as a signaling radio bearer (SRB) or a data radio bearer (DRB) and also logical channel configuration information or security configuration information. Further, the UE may include PDCP device configuration information that is the same as that used in the RRC-connected state (for example, PDCP COUNT value or PDCP sequence number). The UE may further include RLC device configuration information that is the same as that used in the RRC-connected state. If a logical channel or a bearer through which data can be transmitted in the RRC-inactive mode is configured in the RRC message, as illustrated in step 4g-10 of FIG. 4G, the UE may maintain the active state to transmit data without deactivating or stopping the logical channel or the bearer.

If the UE has uplink data to be transmitted and the RRC message indicates that the UE can transmit data in the RRC-inactive mode, the UE prepares to transmit the data in the RRC-inactive mode. The information indicating that the UE can transmit data in the RRC-inactive mode may be indicated by an indicator in the RRC message, or may correspond to the case in which the UE belongs to a paging area indicated by the RRC message, in which case the UE can transmit data in the RRC-inactive mode. If information indicating whether data can be transmitted in the RRC-inactive mode is indicated for each logical channel or each bearer, transmission of the data may be prepared only for the indicated logical channel or bearer.

If it is determined that the UE transmits data in the RRC-inactive mode, the UE synchronizes with a suitable cell and performs a random-access procedure (if the base station has already allocated SR transmission resources to be used for transmission of the data in the RRC-inactive mode to the UE, transmission resources may be requested using the SR transmission resources). The UE may transmit a preamble to the base station through a first message of the random access in step 4i-10. If the base station configures a preamble group to be used for transmission of the data in the RRC-inactive mode in the UE, the UE may select a preamble in the preamble group and transmit the selected preamble to the base station. Accordingly, the UE may make a request for allocating large transmission resources to the base station to transmit data through message 3. Groups of preambles may be partitioned into a plurality of subgroups, and the subgroups may be categorized according to whether the UE transmits small data in the RRC-inactive mode/whether the UE makes a request for large transmission resources/the amount of requested transmission resources. That is, if the UE transmits a preamble belonging to a predetermined subgroup, the base station may identify the intent of the UE to transmit small data in the RRC-inactive state/the amount of transmission resources that the UE requests. The base station receiving the preamble identifies a subgroup to which the preamble belongs and allocates a timing advance (TA) for proper timing and transmission resources through a random-access response (RAR) in order to allow the UE to transmit data in the RRC-inactive mode in step 4i-15.

Upon receiving the RAR message, the UE may reestablish PDCP devices and RLC devices for SRBs/DRBs. If NexthopChainingCount (NCC) is received through the RRC message when the UE transitions from the RRC-connected mode to the RRC-inactive mode, the UE may calculate new security keys (KeNB* or KgNB*) using the NCC and apply the security keys to perform encryption and integrity protection in the PDCP device. Further, the UE configures the MAC device and the device according to the configuration stored in UE context. If the procedure is completed, the UE generates an RRC Connection Resume Request message (or MAC CE), prepares to transmit the message through an SRB (or DRB), processes data, and prepares to transmit the data through the DRB. The MAC device multiplexes the RRC message to be transmitted through the SRB and the data to be transmitted through the DRB to configure the RRC message and the data into one MAC PDU and then transmits the MAC PDU within one TTI in step 4i-20.

After message 3 is transmitted, HARQ ACK/NACK transmission may be supported. The message may include a BSR indicating the amount of data left in the UE and an indication instructing the UE to continuously remain in the RRC-inactive state. Further, the message may include a UE ID (resume ID) for identifying the UE and short MAC-I for integrity protection. The base station, having successfully received the RRC message and the data, may identify the UE ID (resume ID), perform a procedure for retrieving a UE context from a fixed base station or a source base station (the base station having the UE context), complete PDCP/RLC/MAC/PHY device and security configuration on the basis of the UE context, informs the UE of successful reception of the data and the message by transmitting a newly defined RRC message or a conventional RRC message (RRC Connection Suspend, RRC Connection Resume, RRC Connection Release, or RRC Connection Reject) in response to the data and the message of the UE, and provide information on contention resolution of message 3 in step 4i-25. If the base station instructs the UE to be in the inactive mode, the base station may transmit the RRC Connection Resume message including an indicator therefor. If the base station instructs the UE to enter the idle mode, the base station may transmit the RRC Connection Resume message. If the base station instructs the UE to suspend transmission, the base station may transmit the RRC Connection Suspend message. If the base station instructs the UE to perform disconnection and then reconnection, the base station may transmit the RRC Connection Reject message. If there is a reserved or advance configuration, the base station may transmit the MAC CE. ACK of the data may be performed by ARQ of the RLC device. If the base station instructs the UE to enter the RRC-connected state, the base station may transmit the RRC Connection Resume message and transition the UE to the connected mode. If the UE receives the above RRC message through message 4, the UE may transmit an RRC Connection Resume Complete message or a newly defined RRC message to the base station through message 5 in response to the RRC Connection Resume Complete message in step 4i-30.

As illustrated in FIG. 4F or 4G, when the UE configures the initial connection, the bearer through which the UE can transmit data in the RRC-inactive mode may be configured through the RRC Connection Setup message or the RRC Connection Reconfiguration message. That is, some bearers may indicate that data can be transmitted in the RRC-inactive mode, and other bearers may indicate that data cannot be transmitted in the RRC-inactive mode. In the case of the bearer through which the data can be transmitted in the RRC-inactive mode, the UE may itself activate the bearer before transmitting data in the RRC-inactive mode (since all bearers are suspended when the UE transitions to the RRC-inactive mode, the bearers should be activated for data transmission). For example, if the UE has data and receives resources for transmitting data through the bearer, if resources for transmitting data are prearranged with the network, if random access is successful, or if a preamble is transmitted and an RAR is received in a random-access procedure, the UE may itself activate the bearer. In the case of bearers through which the data cannot be transmitted in the RRC-inactive mode, the bearers may be activated only when the RRCConnectionResume message or the RRCConnectionSetup message is received.

If the UE in the RRC-inactive mode transmits data in the RRC-inactive mode without any procedure for transition to the RRC-connected mode, as described above, battery consumption of the UE may be reduced and signaling overhead of the network may be reduced.

The procedure in which the RRC-inactive mode transmits data along with message 3 without transitioning to the RRC-connected mode as described above may be determined based on a predetermined threshold. That is, the UE may transmit data along with message 3 before the procedure for transitioning to the RRC-connected mode if the UE has data smaller than a predetermined threshold, and may transition to the RRC-connected mode through the RRC connection resume procedure and transmit data as illustrated in FIG. 4G if the UE has data larger than the predetermined threshold. The threshold may be configured for each hearer or each logical channel in the message in step 4f-10, 4f-40, or 4f-75 of FIG. 4F.

In the procedure in which the UE transmits data in the RRC-inactive mode, the data may be transmitted along with message 1 or message 5 rather than message 3.

Figure 4J:
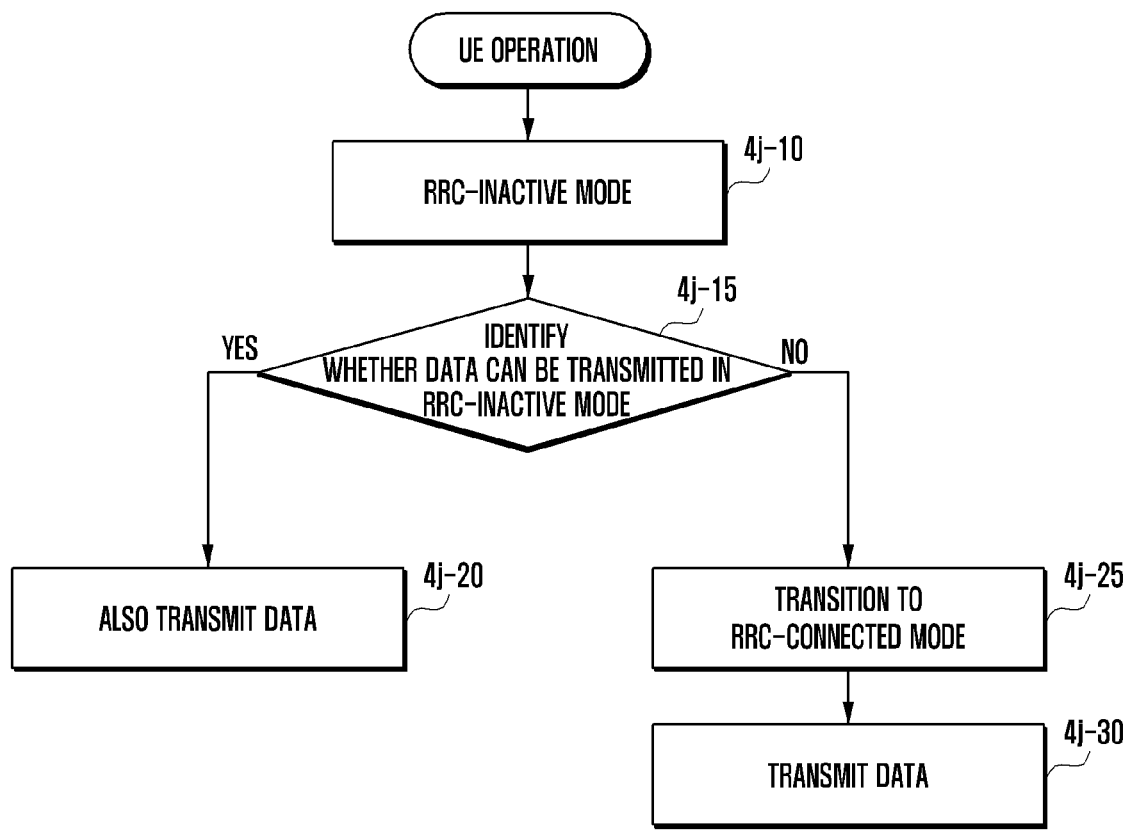
FIG. 4J illustrates the UE operation in which the UE in the RRC-inactive mode transmits data in the RRC-inactive mode according to an embodiment of the disclosure.

FIG. 4J illustrates the UE operation in which the UE in the RRC-inactive mode transmits data in the RRC-inactive mode according to an embodiment of the disclosure.

In FIG. 4J, the LTE may transition to the RRC-inactive mode by itself since an indication of the network or a predetermined condition is satisfied in step 4j-10. If uplink data to be transmitted in the RRC-inactive mode is generated, the UE may identify whether data can be transmitted in the RRC-inactive mode in step 4j-15. The UE may receive information on whether data can be transmitted in an RRC-inactive mode through an RRC message in step 4f-10, 4f-40, or 4f-75 of FIG. 4F or in step 4g-10 or 4g-40 of FIG. 4G (for example, information indicating whether data can be transmitted through a preamble, message 3, or message 5) and indication information of a bearer or a logical channel through which data can be transmitted in the RRC-inactive mode. (For example, data can be transmitted through the preamble, message 3, or message 5 in the RRC-inactive mode only for the indicated logical channel or bearer, and the configured logical channel or bearer may maintain the active state without stopping in the RRC-inactive mode. That is, it is ready to transmit data.) Further, the base station may configure a plurality of paging areas in order to indicate, to the UE, whether data can be transmitted in the RRC-inactive mode through the RRC message (for example, indicate whether data can be transmitted through a preamble, message 3, or message 5). (For example, the base station may indicate a paging area in which the data cannot be transmitted among the plurality of paging areas.) The RRC message may include security configuration information to be used when the connection configuration is performed again in the future (for example, NexthopChainingCount (NCC) information). If data is transmitted in the RRC-inactive mode through the RRC message, the base station may allocate available scheduling request (SR) transmission resources, in which case only one SR transmission resource may be allocated, or SR transmission resources may be allocated for each logical channel or each bearer. In order to make the UE indicate to the base station that the UE will transmit data in the RRC-inactive mode through the RRC message, the base station may configure information indicating which preamble should be used is, if the RRC-inactive UE performs a random-access procedure using the configured preamble, the base station may allocate more transmission resources). The UE may determine whether to transmit data in the RRC-inactive mode through the information. That is, if the UE receives an indication indicating whether data can be transmitted in the RRC-inactive mode, if the UE is in a paging area in which data can be transmitted in the RRC-inactive mode, or if the amount of data to be transmitted is smaller than a predetermined threshold value, it may be determined that data can be transmitted in the RRC-inactive mode. The threshold value may be configured for each bearer or each logical channel in the message in step 4$f$-10, 4$f$-40, or 4$f$-75 of FIG. 4F.

If it is determined that the UE can transmit data in the RRC-inactive mode in step 4$j$-15, the UE may also transmit data through the procedure described in FIGS. 4H and 4I (in a piggybacking manner) in step 4$j$-20. If it is determined that the UE cannot transmit data in the RRC-inactive mode, the UE may transition to the RRC-connected mode by performing the RRC reconnection procedure illustrated in FIG. 4G in step 4$j$-25 and transmit the data in step 4$j$-30, FIG. 4K illustrates the configuration of the UE according to an embodiment of the disclosure.

Figure 4K:
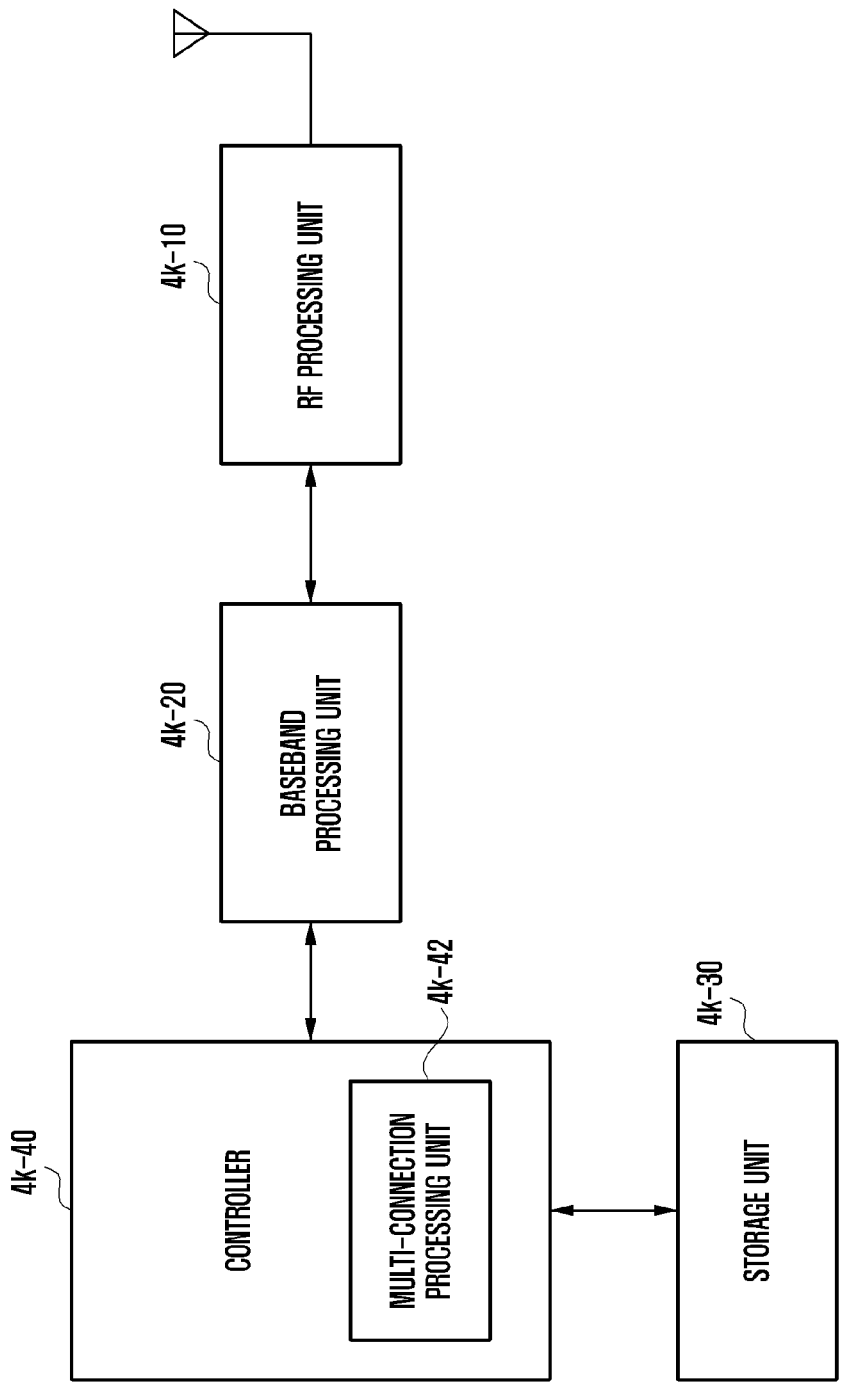
FIG. 4K illustrates the configuration of the UE according to an embodiment of the disclosure.

Referring to FIG. 4K, the UE includes a radio-frequency (RF) processing unit 4$k$-10, a baseband processing unit 4$k$-20, a storage unit 4$k$-30, and a controller 4$k$-40. The controller 4$k$-40 may further include a multi-connection processing unit 4$k$-42.

The RF processing unit 4$k$-10 performs a function for transmitting and receiving a signal through a wireless channel, such as band conversion and amplification of a signal. That is, the RF processor 4$k$-10 up-converts a baseband signal provided from the baseband processor 4$k$-20 into an RF band signal, transmits the RF band signal through an antenna, and then down-converts the RF band signal received through the antenna into a baseband signal. For example, the RF processing unit 4$k$-10 may include a transmission filter, a reception filter, an amplifier, a mixer, an oscillator, a digital-to-analog convertor (DAC), an analog-to-digital convertor (ADC), and the like. Although FIG. 4K illustrates only one antenna, the UE may include a plurality of antennas. Further, the RF processing unit 4$k$-10 may include a plurality of RF chains. Moreover, the RF processing unit 4$k$-10 may perform beamforming. For the beamforming, the RF processing unit 4$k$-10 may control the phase and size of each signal transmitted/received through a plurality of antennas or antenna elements. The RF processing unit may perform MIMO and receive a plurality of layers when performing the MIMO operation. The RF processing unit 4$k$-10 may perform reception beam sweeping by appropriately configuring a plurality of antennas or antenna elements according to the control of the controller, or may control the direction of the reception beam and a beam width such that the reception beam and the transmission beam operate together.

The baseband processing unit 4$k$-20 performs a function for conversion between a baseband signal and a bitstream according to a physical-layer standard of the system. For example, when data is transmitted, the baseband processing unit 4$k$-20 generates complex symbols by encoding and modulating a transmission bitstream. Further, when data is received, the baseband processing unit 4$k$-20 reconstructs a reception bitstream by demodulating and decoding a baseband signal provided from the RF processing unit 4$k$-10. For example, in an orthogonal frequency-division multiplexing (OFDM) scheme, when data is transmitted, the baseband processing unit 4$k$-20 generates complex symbols by encoding and modulating a transmission bitstream, maps the complex symbols to subcarriers, and then configures OFDM symbols through an IFFT (inverse fast Fourier transform) operation and a CP (cyclic prefix) insertion. Further, when data is received, the baseband processing unit 4$k$-20 divides the baseband signal provided from the RF processor 4$k$-10 in units of OFDM symbols, reconstructs the signals mapped to the subcarriers through a fast Fourier transform (FFT) operation, and then reconstructs a reception bitstream through demodulation and decoding.

The baseband processing unit 4$k$-20 and the RF processing unit 4$k$-10 transmit and receive a signal as described above. Accordingly, the baseband processing unit 4$k$-20 and the RF processing unit 4$k$-10 may be referred to as a transmitter, a receiver, a transceiver, or a communication unit. Further, at least one of the baseband processing unit 4$k$-20 and the RF processing unit 4$k$-10 may include a plurality of communication modules for supporting a plurality of different radio access technologies. In addition, at least one of the baseband processing unit 4$k$-20 and the RF processing unit 4$k$-10 may include different communication modules for supporting signals in different frequency bands. For example, the different radio access technologies may include an UE network and an NR network. Further, the different frequency bands may include a super-high frequency (SHF) (for example, 2.4 GHz or 4 GHz) band and a millimeter (mm)-wave (for example, 60 GHz) band.

The storage unit 4$k$-30 stores data such as a basic program, an application, and setting information for the operation of the UE. The storage unit 4$k$-30 provides the stored data in response to a request from the controller 4$k$-40.

The controller 4$k$-40 controls the overall operation of the UE. For example, the controller 4$k$-40 transmits and receives signals through the baseband processing unit 4$k$-20 and the RF processing unit 4$k$-10. Further, the controller 4$k$-40 records data in the storage unit 4$k$-40 and reads the data. To this end, the controller 4$k$-40 may include at least one processor. For example, the controller 4$k$-40 may include a communication processor (CP) that performs control for communication, and an application processor (AP) that controls a higher layer such as an application.

FIG. 4I, illustrates the configuration of the base station according to an embodiment of the disclosure.

Figure 4L:
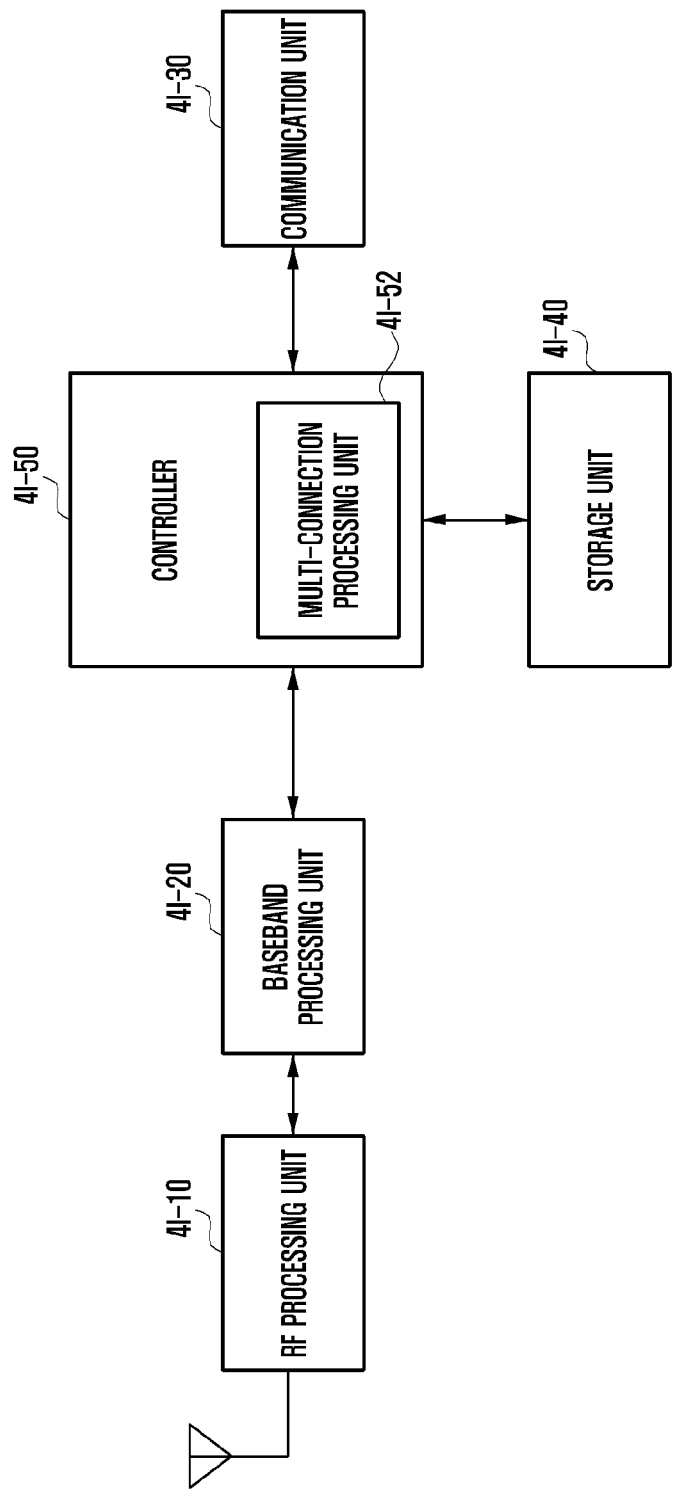
FIG. 4L illustrates the configuration of the base station according to an embodiment of the disclosure.

As illustrated in FIG. 4L, the base station includes an RF processing unit 4I-10, a baseband processing unit 4I-20, a backhaul communication unit 4I-30, a storage unit 4I-40, and a controller 4I-50. The controller 4I-50 may further include a multi-connection processing unit 4I-52.

The RF processing unit 4I-10 performs a function for transmitting and receiving a signal through a wireless channel, such as band conversion and amplification of a signal. That is, the RF processing unit 4I-10 up-converts a baseband signal provided from the baseband processing unit 4I-20 into an RE band signal and then transmits the converted signal through an antenna, and down-converts an RF band signal received through the antenna into a baseband signal. For example, the RF processing unit 4I-10 may include a transmission filter, a reception filter, an amplifier, a mixer, an oscillator, a DAC, and an ADC. Although FIG. 4L illustrates only one antenna, the first access node may include a plurality of antennas. In addition, the RF processing unit 4I-10 may include a plurality of RF chains. The RF processing unit 4I-10 may perform beamforming. For the beamforming, the RF processing unit 4I-10 may control the phase and size of each of the signals transmitted and received through a plurality of antennas or antenna elements. The RF processing unit may perform a downlink MIMO operation by transmitting one or more layers.

The baseband processing unit 4I-20 performs a function of performing conversion between a baseband signal and a bitstream according to a physical-layer standard of the first radio-access technology. For example, when data is transmitted, the baseband processing unit 4I-20 generates complex symbols by encoding and modulating a transmission bitstream. Further, when data is received, the baseband processing unit 4I-20 reconstructs a reception bitstream by demodulating and decoding a baseband signal provided from the RF processing unit 4I-10. For example, in an OFDM scheme, when data is transmitted, the baseband processing unit 4I-20 may generate complex symbols by encoding and modulating the transmission bitstream, map the complex symbols to subcarriers, and then configure OFDM symbols through an IFFT operation and CP insertion. In addition, when data is received, the baseband processing unit 4I-20 divides a baseband signal provided from the RE processing unit 3710 in units of OFDM symbols, recovers signals mapped with subcarriers through an FFT operation, and then recovers a reception bit string through demodulation and decoding. The baseband processing unit 4I-20 and the RE processing unit 4I-10 transmit and receive a signal as described above. Accordingly, the baseband processing unit 4I-20 and the RE processing unit 4I-10 may be referred to as a transmitter, a receiver, a transceiver, a communication unit, or a wireless communication unit.

The communication unit 4I-30 provides an interface for communicating with other nodes within the network.

The storage unit 4I-40 stores data such as a basic program, an application, and setting information for the operation of the MeNB. Particularly, the storage unit 4I-40 may store information on a bearer allocated to the accessed UE and a measurement result reported from the accessed UE. Further, the storage unit 4I-40 may store information which is a reference for determining whether to allow or interrupt multiple accesses to the UE. The storage unit 4I-40 provides stored data in response to a request from the controller 4I-50.

The controller 4I-50 controls the overall operation of the MeNB. For example, the controller 4I-50 transmits and receives a signal through the baseband processing unit 4I-20 and the RF processing unit 4I-10 or through the backhaul communication unit 4I-30. Further, the controller 4I-50 records data in the storage unit 4I-40 and reads the data. To this end, the controller 4I-50 may include at least one processor.

The embodiments disclosed in the specifications and drawings are provided merely to readily describe and to help a thorough understanding of the disclosure but are not intended to limit the scope of the disclosure. Therefore, it should be construed that, in addition to the embodiments disclosed herein, all modifications and changes or modified and changed forms derived from the technical idea of the disclosure fall within the scope of the disclosure.

The invention claimed is:

1. A method performed by a terminal in a wireless communication system, the method comprising:
   receiving, from a base station, a radio resource control (RRC) message for an RRC connection;
   identifying whether the RRC message includes information associated with a pathloss reference;
   determining a pathloss based on the information associated with the pathloss reference, in case that the RRC message includes the information associated with the pathloss reference;
   determining the pathloss based on a synchronization signal (SS) block, in case that the RRC message does not include the information associated with the pathloss reference;
   obtaining a power headroom (PH) based on the pathloss; and
   transmitting, to the base station, a power headroom report (PHR) including the PH.

2. The method of claim 1, wherein the information associated with the pathloss reference includes at least one of a beam type or information associated with a channel state information-reference signal (CSI-RS).

3. A terminal in a wireless communication system, the terminal comprising:
   a transceiver; and
   a controller configured to:
      receive, from a base station via the transceiver, a radio resource control (RRC) message for an RRC connection,
      identify whether the RRC message includes information associated with a pathloss reference,
      determine a pathloss based on the information associated with the pathloss reference, in case that the RRC message includes the information associated with the pathloss reference,
      determine the pathloss based on a synchronization signal (SS) block, in case that the RRC message does not include the information associated with the pathloss reference,
      obtain a power headroom (PH) based on the pathloss, and transmit, to the base station via the transceiver, a power headroom report (PHR) including the PH.

4. The terminal of claim 3, wherein the information associated with the pathloss reference includes at least one of a beam type or information associated with a channel state information-reference signal (CSI-RS).

5. A method performed by a base station in a wireless communication system, the method comprising:
- identifying whether information associated with a pathloss reference is included in a radio resource control (RRC) message;
- transmitting, to a terminal, the RRC message for an RRC connection;
- receiving, from the terminal, a power headroom report (PHR) including a power headroom (PH); and
- identifying the PH of the terminal based on the PHR,
- wherein the PH is based on a pathloss,
- wherein the pathloss is based on the information associated with the pathloss reference, in case that the information associated with the pathloss reference is included in the RRC message, and
- wherein the pathloss is based on a synchronization signal (SS) block, in case that the information associated with the pathloss reference is not included in the RRC message.

6. The method of claim 5, wherein the information associated with the pathloss reference includes at least one of a beam type or information associated with a channel state information-reference signal (CSI-RS).

7. A base station in a wireless communication system, the base station comprising:
- a transceiver; and
- a controller configured to:
  - identify whether information associated with a pathloss reference is included in a radio resource control (RRC) message,
  - transmit, to a terminal via the transceiver, the RRC message for an RRC connection,
  - receive, from the terminal via the transceiver, a power headroom report (PHR) including a power headroom (PH), and
  - identify the PH of the terminal based on the PHR,
- wherein the PH is based on a pathloss,
- wherein the pathloss is based on the information associated with the pathloss reference, in case that the information associated with the pathloss reference is included in the RRC message, and
- wherein the pathloss is based on a synchronization signal (SS) block, in case that the information associated with the pathloss reference is not included in the RRC message.

8. The base station of claim 7, wherein the information associated with the pathloss reference includes at least one of a beam type or information associated with a channel state information-reference signal (CSI-RS).

* * * * *